(12) United States Patent
Caldwell et al.

(10) Patent No.: US 12,460,217 B2
(45) Date of Patent: Nov. 4, 2025

(54) ENHANCED RECOMBINATION OF GENOMIC LOCI

(71) Applicant: MONSANTO TECHNOLOGY LLC, St. Louis, MO (US)

(72) Inventors: David G. Caldwell, St. Louis, MO (US); Ervin D. Nagy, Lake Saint Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 15/753,928

(22) PCT Filed: Aug. 19, 2016

(86) PCT No.: PCT/US2016/047748
§ 371 (c)(1),
(2) Date: Feb. 20, 2018

(87) PCT Pub. No.: WO2017/034971
PCT Pub. Date: Mar. 2, 2017

(65) Prior Publication Data
US 2018/0245091 A1    Aug. 30, 2018

Related U.S. Application Data

(60) Provisional application No. 62/208,405, filed on Aug. 21, 2015.

(51) Int. Cl.
*C12N 15/82*    (2006.01)

(52) U.S. Cl.
CPC ..... *C12N 15/8213* (2013.01); *C12N 15/8271* (2013.01)

(58) Field of Classification Search
None
See application file for complete search history.

(56) References Cited

U.S. PATENT DOCUMENTS

| | | | |
|---|---|---|---|
| 8,912,392 B2 | 12/2014 | Lyznik et al. | |
| 9,499,837 B2 | 11/2016 | Bidney et al. | |
| 9,551,007 B2 | 1/2017 | Vossen et al. | |
| 2005/0124010 A1* | 6/2005 | Short | C12N 15/102 435/7.23 |
| 2009/0217400 A1 | 8/2009 | Carmi et al. | |
| 2010/0086532 A1 | 4/2010 | Barbas, III et al. | |
| 2013/0340115 A1* | 12/2013 | Daines | C07K 14/415 800/302 |

FOREIGN PATENT DOCUMENTS

| | | |
|---|---|---|
| CN | 101484462 A | 7/2009 |
| CN | 101849010 A | 9/2010 |
| CN | 102666572 A | 9/2012 |
| CN | 103045637 A | 4/2013 |
| CN | 104080914 A | 10/2014 |
| WO | WO 2014/104878 A1 | 7/2014 |

OTHER PUBLICATIONS

Webb et al (2002 Genetics 162:381-394 (Year: 2002).*
Wright et al (2005 The Plant Journal 44:693-705, provided by Applicant (Year: 2005).*
Jian-Zhong et al 2015 Briefings in Functional Genomics 283-290 (Year: 2015).*
Jacobs et al BMC Biotechnology 15:16 1-10 (Year: 2015).*
JinHuan et al 2015 Journal of Molecular Cell Biology 7:284-298, published online Mar. 10, 2015 (Year: 2015).*
Cook et al Copy Number Variation of Multiple Genes at Rhg1 Mediates Nematode Resistance in Soybean Science 338:1206-1209 (Year: 2012), provided by Applicant.*
Bent, "Plant Disease Resistance Genes: Function Meets Structure," *The Plant Cell*, 8:1760-1766 (1996).
Beurdeley et al., "Compact designer TALENs for efficient genome engineering," *Nature Communications*, 4:1762, 8 pages (2013).
Cermak et al., "Efficient design and assembly of custom TALEN and other TAL effector-based constructs for DNA targeting," *Nucleic Acids Res*.39(12):e82, 11 pages (2011).
Cook et al., "Copy Number Variation of Multiple Genes at *Rhg*1 Mediates Nematode Resistance in Soybean," *Science*, 338(6111):1206-1209 (2012).
Doyle et al., "TAL Effector-Nucleotide Targeter (TALE-NT) 2.0: tools for TAL effector design and target prediction," *Nucleic Acids Res.*, 40(W1):W117-W122 (2012).
Gabsalilow et al., "Site-and strand-specific nicking of DNA by fusion proteins derived from MutH and I-SceI or TALE repeats," *Nucleic Acids Research*. 41:e83, 11 pages (2013).
Gao et al., "DNA-guided genome editing using the *Natronobacterium gregoryi* Argonaute," *Nature Biotechnology*, 34:768-773 (2016).
International Search Report mailed on Nov. 14, 2016, in International Patent Application No. PCT/US2016/47748.
Kim et al., "Molecular mapping of soybean rust resistance in soybean accession PI 561356 and SNP haplotype analysis of the *Rpp*1 region in diverse germplasm," *Theor. Appl. Genet.*, 125:1339-1352 (2012).
Thompson et al., "CLUSTAL W: improving the sensitivity of progressive multiple sequence alignment through sequence weighting, position-specific gap penalties and weight matrix choice," *Nucl. Acids Res.*, 22:4673-4680 (1994).
Wright et al., "High-frequency homologous recombination in plants mediated by zinc-finger nucleases," *The Plant Journal*, 44:693-705 (2005).

(Continued)

*Primary Examiner* — Brent T Page
(74) *Attorney, Agent, or Firm* — Morrison & Foerster LLP

(57) ABSTRACT

The present disclosure provides methods to accelerate recombination at selected genomic loci, allowing recombination to occur, and selecting events with molecular variation within the selected loci. The accelerated recombination generates novel variations in gene clusters that are present in the plant or mammalian genomes.

9 Claims, 8 Drawing Sheets

Specification includes a Sequence Listing.

(56) References Cited

OTHER PUBLICATIONS

Yanik et al., "TALE-PvuII Fusion Proteins—Novel Tools for Gene Targeting," *PLoS One.* 8:e82539, 13 pages (2013).
Extended European Search Report dated Dec. 17, 2018, in European Patent Application No. 16839873.3.
Fauser et al., "In *Planta* gene targeting," *PNAS*, 109(19):7535-7540 (2012).
Puchta et al., "From centiMorgans to base pairs: homologous recombination in plants," *Trends in Plant Science*, (10):340-348 (1996).
Voytas, "Plant Genome Engineering with Sequence-Specific Nucleases," *Annu. Rev. Plant Biol.*, 64:327-350 (2013).
Dong J. et al. (Jan. 25, 2015). "Advance in Research of Homologous Recombination Repair in DNA Double Strands Breakage," Medical Innovation of China 12(3): 143-146. English Abstract only.
Gao, H. et al. (Mar. 19, 2008). "The Soybean-Phytophthora Resistance Locus Rps1-k Encompasses Coiled Coil-nucleotide Binding-leucine Rich Repeat-like Genes and Repetitive Sequences," BMC Plant Biology, 8(29): 1-14.
Zhang, B. et al. (Aug. 25, 2015). "Advances in Genetic Modification Technologies," Chinese Journal of Biotechnology 31(8): 1162-1174. English Abstract only.
Bennetzen, J. L. et al. (Mar. 24, 1988). "Allele-specific and Mutator-associated Instability at the Rp1 Disease-Resistance Locus of Maize," Nature 332:369-370.
Michelmore, R. W. et al. (Nov. 1998). "Clusters of Resistance Genes in Plants Evolve by Divergent Selection and a Birth-and-Death Process," Genome Res. 8(11):1113-1130.
Nagy, E. D. et al. (Jun. 2021, e-pub. Mar. 11, 2021). "Novel Disease Resistance Gene Paralogs Created by CRISPR/Cas9 in Soy," Plant Cell Rep 40(6):1047-1058.
Richter, T. E. et al. (Sep. 1995). "New Rust Resistance Specificities Associated with Recombination in the Rp1 Complex in Maize," Genetics 141(1):373-381.
Curtain, S. J. et al. (Jul. 2012). "Genome Engineering of Crops with Designer Nucleases," The Plant Genome 5(2):42-50.
Usdin, K. et al. (Jul. 2008). "The Biological Effects of Simple Tandem Repeats: Lessons from the Repeat Expansion Diseases," Genome Res. 18(7):1011-1019.

\* cited by examiner

ENHANCED RECOMBINATION OF GENOMIC LOCI

CROSS-REFERENCE TO RELATED APPLICATIONS

This application is a U.S. National Stage of International Application No. PCT/US2016/047748, filed Aug. 19, 2016, which claims priority to U.S. Provisional Application No. 62/208,405 filed Aug. 21, 2015, both of which are incorporated by reference in their entirety herein.

INCORPORATION OF SEQUENCE LISTING

This application contains a sequence listing, submitted herewith electronically, containing the file named "P34266US01_SEQ.txt" which is 92.476 bytes in size (measured in MS-Windows®) which was created on Feb. 20, 2018, and which is herein incorporated by reference in its entirety.

FIELD

The present disclosure provides compositions and methods for enhancing recombination at preselected genomic loci by introducing site-specific genome modifications, allowing recombination to occur, and selecting events with molecular variation within the selected genomic loci.

BACKGROUND

Genetic diversity underlies environmental adaptation. Currently, plant breeders are dependent on natural mechanisms of producing genetic diversity that rely on rare random mutation or recombination events for production of plants with desirable traits, such as resistance to new plant pathogen biotypes. Standard plant breeding is then used to integrate the desirable traits into select elite germplasm lines, though this is a slow and costly process involving multiple rounds of back crossing and selection. In some instances standard breeding techniques cannot overcome certain genetic linkages associated with unfavorable traits.

Therefore, there is a need for methods that will facilitate accelerated development of new loci for development of plants with improved environmental adaptation and agronomic traits. There is also a need in breeding programs to have methods to stimulate cis-chromosome exchange, sister chromosome exchange, or multiple chromosome exchange events within a single cell.

BRIEF SUMMARY

Several embodiments relate to a method of generating a plant having a new array of tandemly duplicated genes, comprising contacting a plant cell with a first site-specific genome modification enzyme that introduces a genome modification in at least one target sequence of a first array of tandemly duplicated genes, thereby inducing recombination with a second array of tandemly duplicated genes, and selecting at least one plant comprising a new array of tandemly duplicated genes. In some embodiments, two new arrays of tandemly duplicated genes loci are generated. In some embodiments, the first array of tandemly duplicated genes and the second array of tandemly duplicated genes are on homologous chromosomes. In some embodiments, the first array of tandemly duplicated genes and the second array of tandemly duplicated genes are on non-homologous chromosomes. In some embodiments, the first array of tandemly duplicated genes and the second array of tandemly duplicated genes are on homoeologous chromosomes. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombination is asymmetric and the new array of tandemly duplicated genes has an increased number of genes compared to the first array of tandemly duplicated genes or the second array of tandemly duplicated genes. In some embodiments, the recombination is asymmetric and the new array of tandemly duplicated genes has a reduced number of genes compared to the first array of tandemly duplicated genes or the second array of tandemly duplicated genes. In some embodiments, the recombination is symmetric. In some embodiments, the recombination is symmetric, the first array of tandemly duplicated genes and second array of tandemly duplicated genes are heterologous and the new array of tandemly duplicated genes comprises a new combination of genes. In some embodiments, the target sequence is within a gene of the first array of tandemly duplicated genes. In some embodiments, the target sequence is within an intergenic region. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second array. In some embodiments, the target sequence is in a genomic locus of the first array that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second array, where the genomic locus of the first array and the genomic locus of the first array are in corresponding positions in the genome. In some embodiments, the target sequence is in a genomic locus of the first array that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second array, where the genomic locus of the first array and the genomic locus of the first array are not in corresponding positions in the genome. In some embodiments, the first array of tandemly duplicated genes and the second array of tandemly duplicated genes are homologous. In some embodiments, the first array of tandemly duplicated genes and second array of tandemly duplicated genes are heterologous. In some embodiments, the first array of tandemly duplicated genes and second array of tandemly duplicated genes are homoeologous. In some embodiments, the first array of tandemly duplicated genes and second array of tandemly duplicated genes are paralogous. In some embodiments, the first array of tandemly duplicated genes and second array of tandemly duplicated genes are identical. In some embodiments, the first array of tandemly duplicated genes and the second array of tandemly duplicated genes are not identical. In some embodiments, the first array of tandemly duplicated genes is located in a first parental genome and the second array of tandemly duplicated genes is located in a second parental genome. In some embodiments, the first parental genome and the second parental genome are not sexually compatible. In some embodiments, the first parental genome and the second parental genome are different species. In some embodiments, the first parental genome is *Triticum aestivum* (wheat) and the second parental genome is selected from *Aegilops ovate, Ae. biuncialis, Ae. triuncialis, Ae. quarrosa, Secale cereal, Triticum dicoccoides, Triticum dicoccum* and *Triticum durum*. In some embodiments, the first parental genome is selected from *Aegilops ovate, Ae. biuncialis, Ae. triuncialis, Ae. quarrosa, Secale cereal, Triticum dicoccoides, Triticum dicoccum* and *Triticum durum* and the second parental genome is *Triticum aestivum* (wheat). In some embodiments, the first parental genome is *Gossypium hirsutum* (cotton) and the second parental genome is selected from *G. sturtii, G. davidsonii, G. arboretum* and *G. raimondii*. In some embodiments, the first parental genome is selected from *G. sturtii, G. davidsonii, G. arboretum* and *G. raimondii* and the second parental genome is *Gossypium hirsutum* (cotton). In some embodiments, the first parental genome and/or the second parental genome are haploid. In some embodiments, the first parental genome and/or the second parental genome are diploid. In some embodiments, the first array of tandemly duplicated genes, the second array of tandemly duplicated genes and the new array of tandemly duplicated genes encode NBS-LRR disease resistance proteins, pathogen recognition receptor (PRR) proteins, seed storage proteins, cell wall component extension proteins, F-box proteins, ABC transporters, or serine-threonine/tyrosine protein kinases. In some embodiments, the first array of tandemly duplicated genes, the second array of tandemly duplicated genes and the new array of tandemly duplicated genes encode ribosomal RNAs. In some embodiments, the at least one progeny comprising the new array of tandemly duplicated genes exhibits improved disease resistance compared to a plant comprising the first array of tandemly duplicated genes, a plant comprising the second array of tandemly duplicated genes, or a plant comprising the first array of tandemly duplicated genes and the second array of tandemly duplicated genes. In some embodiments, the new array of tandemly duplicated genes confers resistance to one or more diseases selected from Anthracnose Stalk Rot (*Colletotrichum graminicola*), Fusarium Ear Rot (*Fusarium verticillioides*), Fusarium Stalk Rot (*Fusarium* spp.), Gibberella Ear Rot (*Gibberella moniliformis*), Gibberella Stalk Rot (*Gibberella zeae*), Goss's Wilt and Leaf Blight (*Clavibacter michiganensis*), Gray Leaf Spot (*Cercospora zeae-maydis, C. zeina*), Northern Corn Leaf Blight (*Exserohilum turcicum*), Sudden death syndrome (*Fusarium solani* f. sp. *glycines*), Asian soybean rust (*Phakopsora pachyrhizi*), *Phytophthora* root and stem rot (*Phytophthora sojae*), Root-knot Nematode (*Meloidogyne* spp.), Soybean Cyst Nematode (*Heterodera glycines*), Reniform nematode (*Rotylenchulus reniformis*), Root-knot nematode (*Meloidogyne incognita*), Fusarium wilt (*Fusarium oxysporurn* f. sp. *vasinfectum*), Verticillium wilt (*Verticillium dahlia*), Fusarium head blight (*Fusarium graminearum*), Fusarium seedling blight (*Fusarium* spp., *Septoria nodorum*), Fusarium Leaf Blotch (*Monographella nivalis*), and Stem Rust (*Puccinia graminis*). In some embodiments, the plant is a maize plant. In some embodiments, the plant is a soybean plant. In some embodiments, the plant is a cotton plant. In some embodiments, the plant is a wheat plant. In some embodiments, the plant is a sorghum plant. In some embodiments, the plant is a canola plant. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of generating a plant having a new array of tandemly duplicated genes, comprising contacting a plant cell with a first site-specific genome modification enzyme that introduces a genome modification in at least one target sequence of a first array of tandemly duplicated genes and in at least one target sequence of a second array of tandemly duplicated genes, thereby inducing recombination between the first and second array of tandemly duplicated genes, and selecting at least one plant comprising a new array of tandemly duplicated genes. In some embodiments, two new arrays of tandemly duplicated genes loci are generated. In some embodiments, the first array of tandemly duplicated genes and the second array of tandemly duplicated genes are on homologous chromosomes. In some embodiments, the first array of tandemly duplicated genes and the second array of tandemly duplicated genes are on non-homologous chromosomes. In some embodiments, the first array of tandemly duplicated genes and the second array of tandemly duplicated genes are on homoeologous chromosomes. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombination is asymmetric and the new array of tandemly duplicated genes has an increased number of genes compared to the first array of tandemly duplicated genes or the second array of tandemly duplicated genes. In some embodiments, the recombination is asymmetric and the new array of tandemly duplicated genes has a reduced number of genes compared to the first array of tandemly duplicated genes or the second array of tandemly duplicated genes. In some embodiments, the recombination is symmetric. In some embodiments, the recombination is symmetric, the first array of tandemly duplicated genes and second array of tandemly duplicated genes are heterologous and the new array of tandemly duplicated genes comprises a new combination of genes. In some embodiments, the target sequence is genic. In some embodiments, the target sequence is within an intergenic region. In some embodiments, the target sequence in the first array of tandemly duplicated genes is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second array. In some embodiments, the target sequence in the first array of tandemly duplicated genes is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second array, where the genomic locus of the first array and the genomic locus of the first array are in corresponding positions in the genome. In some embodiments, the target sequence in the first array of tandemly duplicated genes is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second array, where the genomic locus of the first array and the genomic locus of the first array are not in corresponding positions in the genome. In some embodiments, the target sequence in the first array of tandemly duplicated genes has at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 9'7%, at least 98%, at least 99%, or 100% sequence identity to the target sequence in the second array of tandemly duplicated genes. In some embodiments, the first array of tandemly duplicated genes and the second array of tandemly duplicated genes are homologous. In some embodiments, the first array of tandemly duplicated genes and second array of tandemly duplicated genes are heterologous. In some embodiments, the first array of tandemly duplicated genes and second array of tandemly duplicated genes are homoeologous. In some embodiments, the first array of tandemly duplicated genes and second array of tandemly duplicated genes are paralogous. In some embodiments, the first array of tandemly duplicated genes and second array of tandemly duplicated genes are identical. In some embodiments, the first array of tandemly duplicated genes and the second array of tandemly duplicated genes are not identical. In some embodiments, the first array of tandemly duplicated genes is located in a first parental genome and the second array of tandemly duplicated genes is located in a second parental genome. In some embodiments, the first parental genome and the second parental genome are not sexually compatible. In some embodiments, the first parental genome and the second parental genome are different species. In some embodiments, the first parental genome is *Triticum aestivum* (wheat) and the second parental genome is selected from *Aegilops ovate, Ae. biuncialis, Ae. triuncialis, Ae. quarrosa, Secale cereal, Triticum dicoccoides, Triticum dicoccum* and *Triticum durum*. In some embodiments, the first parental genome is selected from *Aegilops ovate, Ae. biuncialis, Ae. triuncialis, Ae. quarrosa, Secale cereal, Triticum dicoccoides, Triticum dicoccum* and *Triticum durum* and the second parental genome is *Triticum aestivum* (wheat). In some embodiments, the first parental genome is *Gossypium hirsutum* (cotton) and the second parental genome is selected from *G. sturtii, G. davidsonii, G. arboretum* and *G. raimondii*. In some embodiments, the first parental genome is selected from *G. sturtii, G. davidsonii, G. arboretum* and *G. raimondii* and the second parental genome is *Gossypium hirsutum* (cotton). In some embodiments, the first parental genome and/or the second parental genome are haploid. In some embodiments, the first parental genome and/or the second parental genome are diploid. In some embodiments, the first array of tandemly duplicated genes, the second array of tandemly duplicated genes and the new array of tandemly duplicated genes encode NBS-LRR disease resistance proteins, pathogen recognition receptor (PRR) proteins, seed storage proteins, cell wall component extension proteins, F-box proteins, ABC transporters, or serine-threonine/tyrosine protein kinases. In some embodiments, the first array of tandemly duplicated genes, the second array of tandemly duplicated genes and the new array of tandemly duplicated genes encode ribosomal RNAs. In some embodiments, the at least one progeny comprising the new array of tandemly duplicated genes exhibits improved disease resistance compared to a plant comprising the first array of tandemly duplicated genes, a plant comprising the second array of tandemly duplicated genes, or a plant comprising the first array of tandemly duplicated genes and the second array of tandemly duplicated genes. In some embodiments, the new array of tandemly duplicated genes confers resistance to one or more diseases selected from Anthracnose Stalk Rot (*Colletotrichum graminicola*), Fusarium Ear Rot (*Fusarium verticillioides*), Fusarium Stalk Rot (*Fusarium spp.*), Gibberella Ear Rot (*Gibberella moniliformis*), Gibberella Stalk Rot (*Gibberella zeae*), Goss's Wilt and Leaf Blight (*Clavibacter michiganensis*), Gray Leaf Spot (*Cercospora zeae-maydis, C. zeina*), Northern Corn Leaf Blight (*Exserohilum turcicum*), Sudden death syndrome (*Fusarium solani* f. sp. *glycines*), Asian soybean rust (*Phakopsora pachyrhizi*), Phytophthora root and stem rot (*Phytophthora sojae*), Root-knot Nematode (*Meloidogyne* spp.), Soybean Cyst Nematode (*Heterodera glycines*), Reniform nematode (*Rotylenchulus reniformis*), Root-knot nematode (*Meloidogyne incognita*), Fusarium wilt (*Fusarium oxysporurn* f. sp. *vasinfectum*), Verticillium wilt (*Verticillium dahlia*), Fusarium head blight (*Fusarium graminearum*), Fusarium seedling blight (*Fusarium* spp., *Septoria nodorum*), Fusarium Leaf Blotch (*Monographella nivalis*), and Stem Rust (*Puccinia graminis*). In some embodiments, the plant is a maize plant. In some embodiments, the plant is a soybean plant. In some embodiments, the plant is a cotton plant. In some embodiments, the plant is a wheat plant. In some embodiments, the plant is a sorghum plant. In some embodiments, the plant is a canola plant. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of generating a plant having a new array of tandemly duplicated genes, comprising contacting a plant cell with a first site-specific genome modification enzyme that introduces a genome modification in at least one target sequence of a first array of tandemly duplicated genes and a second site-specific genome modification enzyme that introduces a genome modification in at least one target sequence of a second array of tandemly duplicated genes, thereby inducing recombination between the first and second array of tandemly duplicated genes, and selecting at least one plant comprising a new array of tandemly duplicated genes. In some embodiments, two new arrays of tandemly duplicated genes loci are generated. In some embodiments, the first array of tandemly duplicated genes and the second array of tandemly duplicated genes are on homologous chromosomes. In some embodiments, the first array of tandemly duplicated genes and the second array of tandemly duplicated genes are on non-homologous chromosomes. In some embodiments, the first array of tandemly duplicated genes and the second array of tandemly duplicated genes are on homoeologous chromosomes. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombination is asymmetric and the new array of tandemly duplicated genes has an increased number of genes compared to the first array of tandemly duplicated genes or the second array of tandemly duplicated genes. In some embodiments, the recombination is asymmetric and the new array of tandemly duplicated genes has a reduced number of genes compared to the first array of tandemly duplicated genes or the second array of tandemly duplicated genes. In some embodiments, the recombination is symmetric. In some embodiments, the recombination is symmetric, the first array of tandemly duplicated genes and second array of tandemly duplicated genes are heterologous and the new array of tandemly duplicated genes comprises a new combination of genes. In some embodiments, the target sequence is genic. In some embodiments, the target sequence is within an intergenic region. In some embodiments, the target sequence in the first array of tandemly duplicated genes is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second array. In some embodiments, the target sequence in the first array of tandemly duplicated genes is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second array, where the genomic locus of the first array and the genomic locus of the first array are in corresponding positions in the genome. In some embodiments, the target sequence in the first array of tandemly duplicated genes is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second array, where the genomic locus of the first array and the genomic locus of the first array are not in corresponding positions in the genome. In some embodiments, the target sequence in the first array of tandemly duplicated genes has at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the target sequence in the second array of tandemly duplicated genes. In some embodiments, the first array of tandemly duplicated genes and the second array of tandemly duplicated genes are homologous. In some embodiments, the first array of tandemly duplicated genes and second array of tandemly duplicated genes are heterologous. In some embodiments, the first array of tandemly duplicated genes and second array of tandemly duplicated genes are homoeologous. In some embodiments, the first array of tandemly duplicated genes and second array of tandemly duplicated genes are paraologous. In some embodiments, the first array of tandemly duplicated genes and second array of tandemly duplicated genes are identical. In some embodiments, the first array of tandemly duplicated genes and the second array of tandemly duplicated genes are not identical. In some embodiments, the first array of tandemly duplicated genes is located in a first parental genome and the second array of tandemly duplicated genes is located in a second parental genome. In some embodiments, the first parental genome and the second parental genome are not sexually compatible. In some embodiments, the first parental genome and the second parental genome are different species. In some embodiments, the first parental genome is *Triticum aestivum* (wheat) and the second parental genome is selected from *Aegilops ovate, Ae. biuncialis, Ae. triuncialis, Ae. quarrosa, Secale cereal, Triticum dicoccoides, Triticum dicoccum* and *Triticum durum*. In some embodiments, the first parental genome is selected from *Aegilops ovate, Ae. biuncialis, Ae. triuncialis, Ae. quarrosa,*

*Secale cereal, Triticum dicoccoides, Triticum dicoccum* and *Triticum durum* and the second parental genome is *Triticum aestivum* (wheat). In some embodiments, the first parental genome is *Gossypium hirsutum* (cotton) and the second parental genome is selected from *G. sturtii, G. davidsonii, G. arboretum* and *G. raimondii*. In some embodiments, the first parental genome is selected from *G. sturtii, G. davidsonii, G. arboretum* and *G. raimondii* and the second parental genome is *Gossypium hirsutum* (cotton). In some embodiments, the first parental genome and/or the second parental genome are haploid. In some embodiments, the first parental genome and/or the second parental genome are diploid. In some embodiments, the first array of tandemly duplicated genes, the second array of tandemly duplicated genes and the new array of tandemly duplicated genes encode NBS-LRR disease resistance proteins, pathogen recognition receptor (PRR) proteins, seed storage proteins, cell wall component extension proteins, F-box proteins, ABC transporters, or serine-threonine/tyrosine protein kinases. In some embodiments, the first array of tandemly duplicated genes, the second array of tandemly duplicated genes and the new array of tandemly duplicated genes encode ribosomal RNAs. In some embodiments, the at least one progeny comprising the new array of tandemly duplicated genes exhibits improved disease resistance compared to a plant comprising the first array of tandemly duplicated genes, a plant comprising the second array of tandemly duplicated genes, or a plant comprising the first array of tandemly duplicated genes and the second array of tandemly duplicated genes. In some embodiments, the new array of tandemly duplicated genes confers resistance to one or more diseases selected from Anthracnose Stalk Rot (*Colletotrichum graminicola*), *Fusarium* Ear Rot (*Fusarium verticillioides*), *Fusarium* Stalk Rot (*Fusarium* spp.), *Gibberella* Ear Rot (*Gibberella moniliformis*), *Gibberella* Stalk Rot (*Gibberella zeae*), Goss's Wilt and Leaf Blight (*Clavibacter michiganensis*), Gray Leaf Spot (*Cercospora zeae-maydis, C. zeina*), Northern Corn Leaf Blight (*Exserohilum turcicum*), Sudden death syndrome (*Fusarium solani* f. sp. *glycines*), Asian soybean rust (*Phakopsora pachyrhizi*), *Phytophthora* root and stem rot (*Phytophthora sojae*), Root-knot Nematode (*Meloidogyne* spp.), Soybean Cyst Nematode (*Heterodera glycines*), Reniform nematode (*Rotylenchulus reniformis*), Root-knot nematode (*Meloidogyne incognita*), *Fusarium* wilt (*Fusarium oxysporurn* f. sp. *vasinfectum*), *Verticillium* wilt (*Verticillium dahlia*), *Fusarium* head blight (*Fusarium graminearum*), *Fusarium* seedling blight (*Fusarium* spp., *Septoria nodorum*), *Fusarium* Leaf Blotch (*Monographella nivalis*), and Stem Rust (*Puccinia graminis*). In some embodiments, the plant is a maize plant. In some embodiments, the plant is a soybean plant. In some embodiments, the plant is a cotton plant. In some embodiments, the plant is a wheat plant. In some embodiments, the plant is a sorghum plant. In some embodiments, the plant is a canola plant. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of generating a corn plant having a new allele of an Rp1 disease resistance locus, comprising contacting a corn cell with a first site-specific genome modification enzyme that introduces a genome modification in at least one target sequence of a first Rp1 disease resistance locus, thereby inducing recombination with a second Rp1 disease resistance locus, and selecting at least one corn plant comprising a new allele of the Rp1 disease resistance locus. Several embodiments relate to a method of generating a corn plant having a new allele of an Rp1 disease resistance locus, comprising contacting a corn cell with a first site-specific genome modification enzyme that introduces a genome modification in at least one target sequence of a first Rp1 disease resistance locus and in at least one target sequence of a first Rp1 disease resistance locus, thereby inducing recombination between the first Rp1 disease resistance locus and the second Rp1 disease resistance locus, and selecting at least one corn plant comprising a new allele of the Rp1 disease resistance locus. Several embodiments relate to a method of generating a corn plant having a new allele of an Rp1 disease resistance locus, comprising contacting a corn cell with a first site-specific genome modification enzyme that introduces a genome modification in at least one target sequence of a first Rp1 disease resistance locus and contacting the corn cell with a second site-specific genome modification enzyme that introduces a genome modification in at least one target sequence of a second Rp1 disease resistance locus, thereby inducing recombination between the first Rp1 disease resistance locus and the second Rp1 disease resistance locus, and selecting at least one corn plant comprising a new allele of the Rp1 disease resistance locus. In some embodiments, two new alleles of the Rp1 disease resistance locus are generated. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombination is asymmetric and the new allele of the Rp1 disease resistance locus has an increased number of Rp1 genes compared to the first Rp1 disease resistance locus or the second Rp1 disease resistance locus. In some embodiments, the recombination is asymmetric and the new allele of the Rp1 disease resistance locus has a reduced number of RP1 genes compared to the first Rp1 disease resistance locus or the second Rp1 disease resistance locus. In some embodiments, the recombination is symmetric. In some embodiments, the recombination is symmetric, the first Rp1 disease resistance locus and second Rp1 disease resistance locus are heterologous and the new allele of the Rp1 disease resistance locus comprises a new combination of Rp1 genes. In some embodiments, the target sequence is within a gene. In some embodiments, the target sequence is within an intergenic region. In some embodiments, the target sequence is selected from one or more of the group comprising SEQ ID NO: 3, SEQ ID NO: 4, SEQ ID NO: 5, SEQ ID NO: 6, SEQ ID NO: 7, SEQ ID NO: 8, and SEQ ID NO: 9. In some embodiments, the target sequence in the first Rp1 disease resistance locus is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of the second Rp1 disease resistance locus. In some embodiments, the first Rp1 disease resistance locus and the second Rp1 disease resistance locus are homologous. In some embodiments, the first Rp1 disease resistance locus and second Rp1 disease resistance locus are heterologous. In some embodiments, the first Rp1 disease resistance locus and second Rp1 disease resistance locus are homoeologous. In some embodiments, the first Rp1 disease resistance locus and second Rp1 disease resistance locus are identical. In some embodiments, the first Rp1 disease resistance locus and second Rp1 disease resistance locus are not identical. In some embodiments, the first Rp1 disease resistance locus is located in a first parental genome and the second Rp1 disease resistance locus is located in a second parental genome. In some embodiments, the new allele of an Rp1 disease resistance locus confers resistance to one or more diseases selected from Anthracnose Stalk Rot (*Colletotrichum graminicola*), *Fusarium* Ear Rot (*Fusarium verticillioides*), *Fusarium* Stalk Rot (*Fusarium* spp.), Gibberella Ear Rot (*Gibberella moniliformis*), Gibberella Stalk Rot (*Gibberella zeae*), Goss's Wilt and Leaf Blight (*Clavibacter michiganensis*), Gray Leaf Spot (*Cercospora zeae-maydis, C. zeina*), and Northern Corn Leaf Blight (*Exserohilum turcicum*). In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of generating a soy plant having a new allele of an Rpp1 disease resistance locus, comprising contacting a soy cell with a first site-specific genome modification enzyme that introduces a genome modification in at least one target sequence of a first Rpp1 disease resistance locus, thereby inducing recombination with a second Rpp1 disease resistance locus, and selecting at least one soy plant comprising a new allele of the Rpp1 disease resistance locus. Several embodiments relate to a method of generating a soy plant having a new allele of an Rpp1 disease resistance locus, comprising contacting a soy cell with a first site-specific genome modification enzyme that introduces a genome modification in at least one target sequence of a first Rpp1 disease resistance locus and in at least one target sequence of a first Rpp1 disease resistance locus, thereby inducing recombination between the first Rpp1 disease resistance locus and the second Rpp1 disease resistance locus, and selecting at least one soy plant comprising a new allele of the Rpp1 disease resistance locus. Several embodiments relate to a method of generating a soy plant having a new allele of an Rpp1 disease resistance locus, comprising contacting a soy cell with a first site-specific genome modification enzyme that introduces a genome modification in at least one target sequence of a first Rpp1 disease resistance locus and contacting the soy cell with a second site-specific genome modification enzyme that introduces a genome modification in at least one target sequence of a second Rpp1 disease resistance locus, thereby inducing recombination between the first Rpp1 disease resistance locus and the second Rpp1 disease resistance locus, and selecting at least one soy plant comprising a new allele of the Rpp1 disease resistance locus. In some embodiments, two new alleles of the Rpp1 disease resistance locus are generated. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombination is asymmetric and the new allele of the Rpp1 disease resistance locus has an increased number of Rpp1 genes compared to the first Rpp1 disease resistance locus or the second Rpp1 disease resistance locus. In some embodiments, the recombination is asymmetric and the new allele of the Rpp1 disease resistance locus has a reduced number of RPP1 genes compared to the first Rpp1 disease resistance locus or the second Rpp1 disease resistance locus. In some embodiments, the recombination is symmetric. In some embodiments, the recombination is symmetric, the first Rpp1 disease resistance locus and second Rpp1 disease resistance locus are heterologous and the new allele of the Rpp1 disease resistance locus comprises a new combination of Rpp1 genes. In some embodiments, the target sequence is within a gene. In some embodiments, the target sequence is within an intergenic region. In some embodiments, the target sequence is selected from one or more of the group comprising SEQ ID NO: 12, SEQ ID NO: 13, SEQ ID NO: 14, SEQ ID NO: 15, SEQ ID NO: 16, SEQ ID NO: 17, and SEQ ID NO: 18. In some embodiments, the target sequence in the first Rpp1 disease resistance locus is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of the second Rpp1 disease resistance locus. In some embodiments, the first Rpp1 disease resistance locus and the second Rpp1 disease resistance locus are homologous. In some embodiments, the first Rpp1 disease resistance locus and second Rpp1 disease resistance locus are heterologous. In some embodiments, the first Rpp1 disease resistance locus and second Rpp1 disease resistance locus are homoeologous. In some embodiments, the first Rpp1 disease resistance locus and second Rpp1 disease resistance locus are identical. In some embodiments, the first Rpp1 disease resistance locus and second Rpp1 disease resistance locus are not identical. In some embodiments, the first Rpp1 disease resistance locus is located in a first parental genome and the second Rpp1 disease resistance locus is located in a second parental genome. In some embodiments, the new allele of an Rpp1 disease resistance locus confers resistance to one or more diseases selected from Sudden Death Syndrome (SDS), *Phytophthora* Root Rot, *Phytophthora* Stem Rot, *Fusarium* Root Rot, *Rhizoctonia* Root Rot, Charcoal Rot, Soybean Cyst Nematode (SCN), *Sclerotinia* Stem Rot (White Mold), Brown Stem Rot (BSR), Pod and Stem Blight, Stem Canker, Anthracnose, Green Stem Syndrome, Soybean Rust, *Septoria* Brown Spot, Bacterial Blight, Downy Mildew, *Cercospora* Leaf Blight, Frogeye Leaf Spot, Powdery Mildew, Soybean Mosaic Virus and Bean Pod Mottle Virus. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of generating a soy plant having a new allele of an Rps1 disease resistance locus, comprising contacting a soy cell with a first site-specific genome modification enzyme that introduces a genome modification in at least one target sequence of a first Rps1 disease resistance locus, thereby inducing recombination with a second Rps1 disease resistance locus, and selecting at least one soy plant comprising a new allele of the Rps1 disease resistance locus. Several embodiments relate to a method of generating a soy plant having a new allele of an Rps1 disease resistance locus, comprising contacting a soy cell with a first site-specific genome modification enzyme that introduces a genome modification in at least one target sequence of a first Rps1 disease resistance locus and in at least one target sequence of a first Rps1 disease resistance locus, thereby inducing recombination between the first Rps1 disease resistance locus and the second Rps1 disease resistance locus, and selecting at least one soy plant comprising a new allele of the Rps1 disease resistance locus. Several embodiments relate to a method of generating a soy plant having a new allele of an Rps1 disease resistance locus, comprising contacting a soy cell with a first site-specific genome modification enzyme that introduces a genome modification in at least one target sequence of a first Rps1 disease resistance locus and contacting the soy cell with a second site-specific genome modification enzyme that introduces a genome modification in at least one target sequence of a second Rps1 disease resistance locus, thereby inducing recombination between the first Rps1 disease resistance locus and the second Rps1 disease resistance locus, and selecting at least one soy plant comprising a new allele of the Rps1 disease resistance locus. In some embodiments, two new alleles of the Rps1 disease resistance locus are generated. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombination is asymmetric and the new allele of the Rps1 disease resistance locus has an increased number of Rps1 genes compared to the first Rps1 disease resistance locus or the second Rps1 disease resistance locus. In some embodiments, the recombination is asymmetric and the new allele of the Rps1 disease resistance locus has a reduced number of RPS1 genes compared to the first Rps1 disease resistance locus or the second Rps1 disease resistance locus. In some embodiments, the recombination is symmetric. In some embodiments, the recombination is symmetric, the first Rps1 disease resistance locus and second Rps1 disease resistance locus are heterologous and the new allele of the Rps1 disease resistance locus comprises a new combination of Rps1 genes. In some embodiments, the target sequence is within a gene. In some embodiments, the target sequence is within an intergenic region. In some embodiments, the target sequence is selected from one or more of the group comprising SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, and SEQ ID NO: 32. In some embodiments, the target sequence in the first Rps1 disease resistance locus is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of the second Rps1 disease resistance locus. In some embodiments, the first Rps1 disease resistance locus and the second Rps1 disease resistance locus are homologous. In some embodiments, the first Rps1 disease resistance locus and second Rps1 disease resistance locus are heterologous. In some embodiments, the first Rps1 disease resistance locus and second Rps1 disease resistance locus are homoeologous. In some embodiments, the first Rps1 disease resistance locus and second Rps1 disease resistance locus are identical. In some embodiments, the first Rps1 disease resistance locus and second Rps1 disease resistance locus are not identical. In some embodiments, the first Rps1 disease resistance locus is located in a first parental genome and the second Rps1 disease resistance locus is located in a second parental genome. In some embodiments, the new allele of an Rps1 disease resistance locus confers resistance to one or more diseases selected from Sudden Death Syndrome (SDS), *Phytophthora* Root Rot, *Phytophthora* Stem Rot, *Fusarium* Root Rot, *Rhizoctonia* Root Rot, Charcoal Rot, Soybean Cyst Nematode (SCN), *Sclerotinia* Stem Rot (White Mold), Brown Stem Rot (BSR), Pod and Stem Blight, Stem Canker, Anthracnose, Green Stem Syndrome, Soybean Rust, *Septoria* Brown Spot, Bacterial Blight, Downy Mildew, *Cercospora* Leaf Blight, Frogeye Leaf Spot, Powdery Mildew, Soybean Mosaic Virus and Bean Pod Mottle Virus. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of generating a soy plant having a new allele of an Rhg1 soy cyst nematode resistance locus, comprising contacting a soy cell with a first site-specific genome modification enzyme that introduces a genome modification in at least one target sequence of a first Rhg1 soy cyst nematode resistance locus, thereby inducing recombination with a second Rhg1 soy cyst nematode resistance locus, and selecting at least one soy plant comprising a new allele of the Rhg1 soy cyst nematode resistance locus. Several embodiments relate to a method of generating a soy plant having a new allele of an Rhg1 soy cyst nematode resistance locus, comprising contacting a soy cell with a first site-specific genome modification enzyme that introduces a genome modification in at least one target sequence of a first Rhg1 soy cyst nematode resistance locus and in at least one target sequence of a first Rhg1 soy cyst nematode resistance locus, thereby inducing recombination between the first Rhg1 soy cyst nematode resistance locus and the second Rhg1 soy cyst nematode resistance locus, and selecting at least one soy plant comprising a new allele of the Rhg1 soy cyst nematode resistance locus. Several embodiments relate to a method of generating a soy plant having a new allele of an Rhg1 soy cyst nematode resistance locus, comprising contacting a soy cell with a first site-specific genome modification enzyme that introduces a genome modification in at least one target sequence of a first Rhg1 soy cyst nematode resistance locus and contacting the soy cell with a second site-specific genome modification enzyme that introduces a genome modification in at least one target sequence of a second Rhg1 soy cyst nematode resistance locus, thereby inducing recombination between the first Rhg1 soy cyst nematode resistance locus and the second Rhg1 soy cyst nematode resistance locus, and selecting at least one soy plant comprising a new allele of the Rhg1 soy cyst nematode resistance locus. In some embodiments, two new alleles of the Rhg1 soy cyst nematode resistance locus are generated. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombination is asymmetric and the new allele of the Rhg1 soy cyst nematode resistance locus has an increased number of Rhg1 genes compared to the first Rhg1 soy cyst nematode resistance locus or the second Rhg1 soy cyst nematode resistance locus. In some embodiments, the recombination is asymmetric and the new allele of the Rhg1 soy cyst nematode resistance locus has a reduced number of Rhg1 genes compared to the first Rhg1 soy cyst nematode resistance locus or the second Rhg1 soy cyst nematode resistance locus. In some embodiments, the recombination is symmetric. In some embodiments, the recombination is symmetric, the first Rhg1 soy cyst nematode resistance locus and second Rhg1 soy cyst nematode resistance locus are heterologous and the new allele of the Rhg1 soy cyst nematode resistance locus comprises a new combination of Rhg1 genes. In some embodiments, the target sequence is within a gene. In some embodiments, the target sequence is within an intergenic region. In some embodiments, the target sequence is selected from one or more of the group comprising SEQ ID NO: 69, SEQ ID NO: 70, SEQ ID NO: 71, SEQ ID NO: 72, SEQ ID NO: 73, SEQ ID NO: 74, SEQ ID NO: 75, and SEQ ID NO: 76. In some embodiments, the target sequence in the first Rhg1 soy cyst nematode resistance locus is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of the second Rhg1 soy cyst nematode resistance locus. In some embodiments, the first Rhg1 soy cyst nematode resistance locus and the second Rhg1 soy cyst nematode resistance locus are homologous. In some embodiments, the first Rhg1 soy cyst nematode resistance locus and second Rhg1 soy cyst nematode resistance locus are heterologous. In some embodiments, the first Rhg1 soy cyst nematode resistance locus and second Rhg1 soy cyst nematode resistance locus are homoeologous. In some embodiments, the first Rhg1 soy cyst nematode resistance locus and second Rhg1 soy cyst nematode resistance locus are identical. In some embodiments, the first Rhg1 soy cyst nematode resistance locus and second Rhg1 soy cyst nematode resistance locus are not identical. In some embodiments, the first Rhg1 soy cyst nematode resistance locus is located in a first parental genome and the second Rhg1 soy cyst nematode resistance locus is located in a second parental genome. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of providing a plant with improved disease resistance, comprising: (a) providing to one or more plant cells a site-specific genome modification enzyme that introduces a genome modification in at least one target sequence in a disease resistance locus; (b) screening for asymmetric recombination between disease-resistance loci on homologous chromosomes to identify plant cells comprising a recombinant disease resistance locus; (c) testing plants obtained from the plant cells identified in step (b) and their progeny for improved disease resistance; and (d) selecting the plant with improved disease resistance. Several embodiments relate to a method of providing a plant with improved disease resistance, comprising: (a) providing to one or more plant cells a site-specific genome modification enzyme that introduces a genome modification in at least one target sequence in a first disease resistance locus; (b) screening for recombination between the first disease-resistance locus and a second disease resistance locus, where the first and second disease resistance loci are on non-homologous chromosomes to identify plant cells comprising a recombinant disease resistance locus; (c) testing plants obtained from the plant cells identified in step (b) and their progeny for improved disease resistance; and (d) selecting the plant with improved disease resistance. Several embodiments relate to a method of providing a plant with improved disease resistance, comprising: (a) providing to one or more plant cells a site-specific genome modification enzyme that introduces a genome modification in at least one target sequence in a first disease resistance locus; (b) screening for recombination between the first disease-resistance locus and a second disease resistance locus, where the first and second disease resistance loci are on homoeologous chromosomes to identify plant cells comprising a recombinant disease resistance locus; (c) testing plants obtained from the plant cells identified in step (b) and their progeny for improved disease resistance; and (d) selecting the plant with improved disease resistance. Several embodiments relate to a method of providing a plant with improved disease resistance, comprising: (a) providing to one or more plant cells a site-specific genome modification enzyme that introduces a genome modification a first target sequence in a disease resistance locus and a second target sequence in a disease resistance locus, wherein the first target sequence and second target sequence are on homologous chromosomes; (b) screening for asymmetric recombination between disease-resistance loci on homologous chromosomes to identify plant cells comprising a recombinant disease resistance locus; (c) testing plants obtained from the plant cells identified in step (b) and their progeny for improved disease resistance; and (d) selecting the plant with improved disease resistance. Several embodiments relate to a method of providing a plant with improved disease resistance, comprising: (a) providing to one or more plant cells a site-specific genome modification enzyme that introduces a genome modification a first target sequence in a first disease resistance locus and a second target sequence in a second disease resistance locus, wherein the first disease resistance locus and second disease resistance locus are on non-homologous chromosomes; (b) screening for recombination between the disease-resistance loci to identify plant cells comprising a recombinant disease resistance locus; (c) testing plants obtained from the plant cells identified in step (b) and their progeny for improved disease resistance; and (d) selecting the plant with improved disease resistance. Several embodiments relate to a method of providing a plant with improved disease resistance, comprising: (a) providing to one or more plant cells a site-specific genome modification enzyme that introduces a genome modification a first target sequence in a first disease resistance locus and a second target sequence in a second disease resistance locus, wherein the first disease resistance locus and second disease resistance locus are on homoeologous chromosomes; (b) screening for recombination between the disease-resistance loci to identify plant cells comprising a recombinant disease resistance locus; (c) testing plants obtained from the plant cells identified in step (b) and their progeny for improved disease resistance; and (d) selecting the plant with improved disease resistance. Several embodiments relate to a method of providing a plant with improved disease resistance, comprising: (a) providing to one or more plant cells a first site-specific genome modification enzyme that introduces a genome modification a first target sequence in a disease resistance locus and a second site-specific genome modification enzyme that introduces a genome modification in a second target sequence in a disease resistance locus, wherein the first target sequence and second target sequence are on homologous chromosomes; (b) screening for asymmetric recombination between disease-resistance loci on homologous chromosomes to identify plant cells comprising a recombinant disease resistance locus; (c) testing plants obtained from the plant cells identified in step (b) and their progeny for improved disease resistance; and (d) selecting the plant with improved disease resistance. Several embodiments relate to a method of providing a plant with improved disease resistance, comprising: (a) providing to one or more plant cells a first site-specific genome modification enzyme that introduces a genome modification a first target sequence in a first disease resistance locus and a second site-specific genome modification enzyme that introduces a genome modification in a second target sequence in a second disease resistance locus, wherein the first disease resistance locus and second disease resistance locus are on non-homologous chromosomes; (b) screening for asymmetric recombination between the disease-resistance loci to identify plant cells comprising a recombinant disease resistance locus; (c) testing plants obtained from the plant cells identified in step (b) and their progeny for improved disease resistance; and (d) selecting the plant with improved disease resistance. Several embodiments relate to a method of providing a plant with improved disease resistance, comprising: (a) providing to one or more plant cells a first site-specific genome modification enzyme that introduces a genome modification a first target sequence in a first disease resistance locus and a second site-specific genome modification enzyme that introduces a genome modification in a second target sequence in a second disease resistance locus, wherein the first disease resistance locus and second disease resistance locus are on homoeologous chromosomes; (b) screening for asymmetric recombination between the disease-resistance loci to identify plant cells comprising a recombinant disease resistance locus; (c) testing plants obtained from the plant cells identified in step (b) and their progeny for improved disease resistance; and (d) selecting the plant with improved disease resistance. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombinant disease resistance locus has an increased number of genes compared to the disease resistance locus in either parent. In some embodiments, the recombinant disease resistance locus has reduced number of genes compared to the disease resistance locus in either parent. In some embodiments, the recombinant disease resistance locus has a different combination of genes compared to the disease resistance locus in either parent. In some embodiments, the target sequence is genic. In some embodiments, the target sequence is within an intergenic region. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus on the homologous chromosome. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus on the homologous chromosome that is in a different position. In some embodiments, recombination is between homologous disease-resistance loci. In some embodiments, recombination is between heterologous disease-resistance loci. In some embodiments, recombination is between homoeologous disease-resistance loci. In some embodiments, recombination is between paraologous disease-resistance loci. In some embodiments, recombination is between identical disease-resistance loci. In some embodiments, the homologous chromosomes are from sexually incompatible parental genomes. In some embodiments, the first parental genome is *Triticum aestivum* (wheat) and the second parental genome is selected from *Aegilops ovate, Ae. biuncialis, Ae. triuncialis, Ae. quarrosa, Secale* cereal, *Triticum dicoccoides, Triticum dicoccum* and *Triticum durum*. In some embodiments, the first parental genome is selected from *Aegilops ovate, Ae. biuncialis, Ae. triuncialis, Ae. quarrosa, Secale cereal, Triticum dicoccoides, Triticum dicoccum* and *Triticum durum* and the second parental genome is *Triticum aestivum* (wheat). In some embodiments, the first parental genome is *Gossypium hirsutum* (cotton) and the second parental genome is selected from *G. sturtii, G. davidsonii, G. arboretum* and *G. raimondii*. In some embodiments, the first parental genome is selected from *G. sturtii, G. davidsonii, G. arboretum* and *G. raimondii* and the second parental genome is *Gossypium hirsutum* (cotton). In some embodiments, the homologous chromosomes are different plant species. In some embodiments, the first disease resistance locus is Rgh1 and the second disease resistance locus is Rgh4. In some embodiments, the disease resistance locus encodes NBS-LRR disease resistance proteins, pathogen recognition receptor (PRR) proteins, seed storage proteins, cell wall component extension proteins, F-box proteins, ABC transporters, or serine-threonine/tyrosine protein kinases. In some embodiments, the recombinant disease resistance locus confers resistance to one or more diseases selected from Anthracnose Stalk Rot (*Colletotrichum graminicola*), Fusarium Ear Rot (*Fusarium verticillioides*), Fusarium Stalk Rot (*Fusarium* spp.), Gibberella Ear Rot (*Gibberella moniliformis*), Gibberella Stalk Rot (*Gibberella zeae*), Goss's Wilt and Leaf Blight (*Clavibacter michiganensis*), Gray Leaf Spot (*Cercospora zeae-maydis, C. zeina*), Northern Corn Leaf Blight (*Exserohilum turcicum*), Sudden death syndrome (*Fusarium solani* f. sp. *glycines*), Asian soybean rust (*Phakopsora pachyrhizi*), Phytophthora root and stem rot (*Phytophthora sojae*), Root-knot Nematode (*Meloidogyne* spp.), Soybean Cyst Nematode (*Heterodera glycines*), Reniform nematode (*Rotylenchulus reniformis*), Root-knot nematode (*Meloidogyne incognita*), Fusarium wilt (*Fusarium oxysporurn* f. sp. *vasinfectum*), Verticillium wilt (*Verticillium dahlia*), Fusarium head blight (*Fusarium graminearum*), Fusarium seedling blight (*Fusarium* spp., *Septoria nodorum*), Fusarium Leaf Blotch (*Monographella nivalis*), and Stem Rust (*Puccinia graminis*). In some embodiments, the plant is a maize plant. In some embodiments, the plant is a soybean plant. In some embodiments, the plant is a cotton plant. In some embodiments, the plant is a wheat plant. In some embodiments, the plant is a sorghum plant. In some embodiments, the plant is a canola plant. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of providing a corn plant with improved disease resistance, comprising: (a) providing to one or more plant cells a site-specific genome modification enzyme that introduces a genome modification in at least one target sequence in a Rp1 disease resistance locus; (b) screening for asymmetric recombination between Rp1 disease-resistance loci on homologous chromosomes to identify corn cells comprising a recombinant Rp1 disease resistance locus; (c) testing corn plants obtained from the corn cells identified in step (b) and their progeny for improved disease resistance; and (d) selecting the corn plant with improved resistance to one or more diseases selected from Anthracnose Stalk Rot (*Colletotrichum graminicola*), Fusarium Ear Rot (*Fusarium verticillioides*), Fusarium Stalk Rot (*Fusarium* spp.), *Gibberella* Ear Rot (*Gibberella moniliformis*), *Gibberella* Stalk Rot (*Gibberella zeae*), Goss's Wilt and Leaf Blight (*Clavibacter michiganensis*), Gray Leaf Spot (*Cercospora zeae-maydis, C. zeina*), and Northern Corn Leaf Blight (*Exserohilum turcicum*). Several embodiments relate to a method of providing a corn plant with improved disease resistance, comprising: (a) providing to one or more corn cells a site-specific genome modification enzyme that introduces a genome modification a first target sequence in a Rp1 disease resistance locus and a second target sequence in the Rp1 disease resistance locus, wherein the first target sequence and second target sequence are on homologous chromosomes; (b) screening for asymmetric recombination between Rp1 disease-resistance loci on homologous chromosomes to identify plant cells comprising a recombinant Rp1 disease resistance locus; (c) testing plants obtained from the plant cells identified in step (b) and their progeny for improved disease resistance; and (d) selecting the corn plant with improved resistance to a disease selected from Anthracnose Stalk Rot (*Colletotrichum graminicola*), Fusarium Ear Rot (*Fusarium verticillioides*), Fusarium Stalk Rot (*Fusarium* spp.), *Gibberella* Ear Rot (*Gibberella moniliformis*), *Gibberella* Stalk Rot (*Gibberella zeae*), Goss's Wilt and Leaf Blight (*Clavibacter michiganensis*), Gray Leaf Spot (*Cercospora zeae-maydis, C. zeina*), and Northern Corn Leaf Blight (*Exserohilum turcicum*). Several embodiments relate to a method of providing a corn plant with improved disease resistance, comprising: (a) providing to one or more plant cells a first site-specific genome modification enzyme that introduces a genome modification a first target sequence in a Rp1 disease resistance locus and a second site-specific genome modification enzyme that introduces a genome modification in a second target sequence in a Rp1 disease resistance locus, wherein the first target sequence and second target sequence are on homologous chromosomes; (b) screening for asymmetric recombination between Rp1 disease-resistance loci on homologous chromosomes to identify plant cells comprising a recombinant Rp1 disease resistance locus; (c) testing corn plants obtained from the corn cells identified in step (b) and their progeny for improved disease resistance; and (d) selecting the corn plant with improved resistance to a disease selected from Anthracnose Stalk Rot (*Colletotrichum graminicola*), Fusarium Ear Rot (*Fusarium verticillioides*), Fusarium Stalk Rot (*Fusarium* spp.), *Gibberella* Ear Rot (*Gibberella moniliformis*), *Gibberella* Stalk Rot (*Gibberella zeae*), Goss's Wilt and Leaf Blight (*Clavibacter michiganensis*), Gray Leaf Spot (*Cercospora zeae-maydis, C. zeina*), and Northern Corn Leaf Blight (*Exserohilum turcicum*. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombinant Rp1 disease resistance locus has an increased number of genes compared to the Rp1 disease resistance locus in either parent. In some embodiments, the recombinant Rp1 disease resistance locus has reduced number of genes compared to the Rp1 disease resistance locus in either parent. In some embodiments, the recombinant Rp1 disease resistance locus has a different combination of genes compared to the Rp1 disease resistance locus in either parent. In some embodiments, the target sequence is genic. In some embodiments, the target sequence is within an intergenic region. In some embodiments, the target sequence is selected from one or more of the group comprising SEQ ID NO: 3, SEQ ID NO: 4, SEQ ID NO: 5, SEQ ID NO: 6, SEQ ID NO: 7, SEQ ID NO: 8, and SEQ ID NO: 9. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus on the homologous chromosome. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus in a different position on the homologous chromosome. In some embodiments, recombination is between homologous Rp1 disease-resistance loci. In some embodiments, recombination is between heterologous Rp1 disease-resistance loci. In some embodiments, recombination is between homoeologous Rp1 disease-resistance loci. In some embodiments, recombination is between paralogous Rp1 disease-resistance loci. In some embodiments, recombination is between identical Rp1 disease-resistance loci. In some embodiments, the homologous chromosomes are from sexually incompatible parental genomes. In some embodiments, the first parental genome is *Triticum aestivum* (wheat) and the second parental genome is selected from *Aegilops ovate, Ae. biuncialis, Ae. triuncialis, Ae. quarrosa, Secale cereal, Triticum dicoccoides, Triticum dicoccum* and *Triticum durum*. In some embodiments, the first parental genome is selected from *Aegilops ovate, Ae. biuncialis, Ae. triuncialis, Ae. quarrosa, Secale cereal, Triticum dicoccoides, Triticum dicoccum* and *Triticum durum* and the second parental genome is *Triticum aestivum* (wheat). In some embodiments, the first parental genome is *Gossypium hirsutum* (cotton) and the second parental genome is selected from *G. sturtii, G. davidsonii, G. arboretum* and *G. raimondii*. In some embodiments, the first parental genome is selected from *G. sturtii, G. davidsonii, G. arboretum* and *G. raimondii* and the second parental genome is *Gossypium hirsutum* (cotton). In some embodiments, the homologous chromosomes are different plant species. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of providing a soy plant with improved disease resistance, comprising: (a) providing to one or more plant cells a site-specific genome modification enzyme that introduces a genome modification in at least one target sequence in a Rpp1 disease resistance locus; (b) screening for asymmetric recombination between Rpp1 disease-resistance loci on homologous chromosomes to identify soy cells comprising a recombinant Rpp1 disease resistance locus; (c) testing soy plants obtained from the soy cells identified in step (b) and their progeny for improved disease resistance; and (d) selecting the soy plant with improved resistance to one or more diseases selected from Sudden Death Syndrome (SDS), *Phytophthora* Root Rot, *Phytophthora* Stem Rot, *Fusarium* Root Rot, *Rhizoctonia* Root Rot, Charcoal Rot, Soybean Cyst Nematode (SCN), *Sclerotinia* Stem Rot (White Mold), Brown Stem Rot (BSR), Pod and Stem Blight, Stem Canker, Anthracnose, Green Stem Syndrome, Soybean Rust, *Septoria* Brown Spot, Bacterial Blight, Downy Mildew, *Cercospora* Leaf Blight, Frogeye Leaf Spot, Powdery Mildew, Soybean Mosaic Virus and Bean Pod Mottle Virus. Several embodiments relate to a method of providing a soy plant with improved disease resistance, comprising: (a) providing to one or more soy cells a site-specific genome modification enzyme that introduces a genome modification a first target sequence in a Rpp1 disease resistance locus and a second target sequence in the Rpp1 disease resistance locus, wherein the first target sequence and second target sequence are on homologous chromosomes; (b) screening for asymmetric recombination between Rpp1 disease-resistance loci on homologous chromosomes to identify plant cells comprising a recombinant Rpp1 disease resistance locus; (c) testing plants obtained from the plant cells identified in step (b) and their progeny for improved disease resistance; and (d) selecting the soy plant with improved resistance to a disease selected from Sudden Death Syndrome (SD S), *Phytophthora* Root Rot, *Phytophthora* Stem Rot, *Fusarium* Root Rot, *Rhizoctonia* Root Rot, Charcoal Rot, Soybean Cyst Nematode (SCN), *Sclerotinia* Stem Rot (White Mold), Brown Stem Rot (BSR), Pod and Stem Blight, Stem Canker, Anthracnose, Green Stem Syndrome, Soybean Rust, *Septoria* Brown Spot, Bacterial Blight, Downy Mildew, *Cercospora* Leaf Blight, Frogeye Leaf Spot, Powdery Mildew, Soybean Mosaic Virus and Bean Pod Mottle Virus. Several embodiments relate to a method of providing a soy plant with improved disease resistance, comprising: (a) providing to one or more plant cells a first site-specific genome modification enzyme that introduces a genome modification a first target sequence in a Rpp1 disease resistance locus and a second site-specific genome modification enzyme that introduces a genome modification in a second target sequence in a Rpp1 disease resistance locus, wherein the first target sequence and second target sequence are on homologous chromosomes; (b) screening for asymmetric recombination between Rpp1 disease-resistance loci on homologous chromosomes to identify plant cells comprising a recombinant Rpp1 disease resistance locus; (c) testing soy plants obtained from the soy cells identified in step (b) and their progeny for improved disease resistance; and (d) selecting the soy plant with improved resistance to a disease selected from Sudden Death Syndrome (SDS), *Phytophthora* Root Rot, *Phytophthora* Stem Rot, *Fusarium* Root Rot, *Rhizoctonia* Root Rot, Charcoal Rot, Soybean Cyst Nematode (SCN), *Sclerotinia* Stem Rot (White Mold), Brown Stem Rot (BSR), Pod and Stem Blight, Stem Canker, Anthracnose, Green Stem Syndrome, Soybean Rust, *Septoria* Brown Spot, Bacterial Blight, Downy Mildew, *Cercospora* Leaf Blight, Frogeye Leaf Spot, Powdery Mildew, Soybean Mosaic Virus and Bean Pod Mottle Virus. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombinant Rpp1 disease resistance locus has an increased number of genes compared to the Rpp1 disease resistance locus in either parent. In some embodiments, the recombinant Rpp1 disease resistance locus has reduced number of genes compared to the Rpp1 disease resistance locus in either parent. In some embodiments, the recombinant Rpp1 disease resistance locus has a different combination of genes compared to the Rpp1 disease resistance locus in either parent. In some embodiments, the target sequence is genic. In some embodiments, the target sequence is within an intergenic region. In some embodiments, the target sequence is selected from one or more of the group comprising SEQ ID NO: 12, SEQ ID NO: 13, SEQ ID NO: 14, SEQ ID NO: 15, SEQ ID NO: 16, SEQ ID NO: 17, and SEQ ID NO: 18. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus on the homologous chromosome. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus in a different position on the homologous chromosome. In some embodiments, recombination is between homologous Rpp1 disease-resistance loci. In some embodiments, recombination is between heterologous Rpp1 disease-resistance loci. In some embodiments, recombination is between homoeologous Rpp1 disease-resistance loci. In some embodiments, recombination is between paralogous Rpp1 disease-resistance loci. In some embodiments, recombination is between identical Rpp1 disease-resistance loci. In some embodiments, the homologous chromosomes are from sexually incompatible parental genomes. In some embodiments, the first parental genome is *Triticum aestivum* (wheat) and the second parental genome is selected from *Aegilops ovate, Ae. biuncialis, Ae. triuncialis, Ae. quarrosa, Secale cereal, Triticum dicoccoides, Triticum dicoccum* and *Triticum durum*. In some embodiments, the first parental genome is selected from *Aegilops ovate, Ae. biuncialis, Ae. triuncialis, Ae. quarrosa, Secale cereal, Triticum dicoccoides, Triticum dicoccum* and *Triticum durum* and the second parental genome is *Triticum aestivum* (wheat). In some embodiments, the first parental genome is *Gossypium hirsutum* (cotton) and the second parental genome is selected from *G. sturtii, G. davidsonii, G. arboretum* and *G. raimondii*. In some embodiments, the first parental genome is selected from *G. sturtii, G. davidsonii, G. arboretum* and *G. raimondii* and the second parental genome is *Gossypium hirsutum* (cotton). In some embodiments, the homologous chromosomes are different plant species. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of providing a soy plant with improved disease resistance, comprising: (a) providing to one or more plant cells a site-specific genome modification enzyme that introduces a genome modification in at least one target sequence in a Rps1 disease resistance locus; (b) screening for asymmetric recombination between Rps1 disease-resistance loci on homologous chromosomes to identify soy cells comprising a recombinant Rps1 disease resistance locus; (c) testing soy plants obtained from the soy cells identified in step (b) and their progeny for improved disease resistance; and (d) selecting the soy plant with improved resistance to one or more diseases selected from Sudden Death Syndrome (SDS), *Phytophthora* Root Rot, *Phytophthora* Stem Rot, *Fusarium* Root Rot, *Rhizoctonia* Root Rot, Charcoal Rot, Soybean Cyst Nematode (SCN), *Sclerotinia* Stem Rot (White Mold), Brown Stem Rot (BSR), Pod and Stem Blight, Stem Canker, Anthracnose, Green Stem Syndrome, Soybean Rust, *Septoria* Brown Spot, Bacterial Blight, Downy Mildew, *Cercospora* Leaf Blight, Frogeye Leaf Spot, Powdery Mildew, Soybean Mosaic Virus and Bean Pod Mottle Virus. Several embodiments relate to a method of providing a soy plant with improved disease resistance, comprising: (a) providing to one or more soy cells a site-specific genome modification enzyme that introduces a genome modification a first target sequence in a Rps1 disease resistance locus and a second target sequence in the Rps1 disease resistance locus, wherein the first target sequence and second target sequence are on homologous chromosomes; (b) screening for asymmetric recombination between Rps1 disease-resistance loci on homologous chromosomes to identify plant cells comprising a recombinant Rps1 disease resistance locus; (c) testing plants obtained from the plant cells identified in step (b) and their progeny for improved disease resistance; and (d) selecting the soy plant with improved resistance to a disease selected from Sudden Death Syndrome (SD S), *Phytophthora* Root Rot, *Phytophthora* Stem Rot, *Fusarium* Root Rot, *Rhizoctonia* Root Rot, Charcoal Rot, Soybean Cyst Nematode (SCN), *Sclerotinia* Stem Rot (White Mold), Brown Stem Rot (BSR), Pod and Stem Blight, Stem Canker, Anthracnose, Green Stem Syndrome, Soybean Rust, *Septoria* Brown Spot, Bacterial Blight, Downy Mildew, *Cercospora* Leaf Blight, Frogeye Leaf Spot, Powdery Mildew, Soybean Mosaic Virus and Bean Pod Mottle Virus. Several embodiments relate to a method of providing a soy plant with improved disease resistance, comprising: (a) providing to one or more plant cells a first site-specific genome modification enzyme that introduces a genome modification a first target sequence in a Rps1 disease resistance locus and a second site-specific genome modification enzyme that introduces a genome modification in a second target sequence in a Rps1 disease resistance locus, wherein the first target sequence and second target sequence are on homologous chromosomes; (b) screening for asymmetric recombination between Rps1 disease-resistance loci on homologous chromosomes to identify plant cells comprising a recombinant Rps1 disease resistance locus; (c) testing soy plants obtained from the soy cells identified in step (b) and their progeny for improved disease resistance; and (d) selecting the soy plant with improved resistance to a disease selected from Sudden Death Syndrome (SD S), *Phytophthora* Root Rot, *Phytophthora* Stem Rot, *Fusarium* Root Rot, *Rhizoctonia* Root Rot, Charcoal Rot, Soybean Cyst Nematode (SCN), *Sclerotinia* Stem Rot (White Mold), Brown Stem Rot (BSR), Pod and Stem Blight, Stem Canker, Anthracnose, Green Stem Syndrome, Soybean Rust, *Septoria* Brown Spot, Bacterial Blight, Downy Mildew, *Cercospora* Leaf Blight, Frogeye Leaf Spot, Powdery Mildew, Soybean Mosaic Virus and Bean Pod Mottle Virus. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombinant Rps1 disease resistance locus has an increased number of genes compared to the Rps1 disease resistance locus in either parent. In some embodiments, the recombinant Rps1 disease resistance locus has reduced number of genes compared to the Rps1 disease resistance locus in either parent. In some embodiments, the recombinant Rps1 disease resistance locus has a different combination of genes compared to the Rps1 disease resistance locus in either parent. In some embodiments, the target sequence is genic. In some embodiments, the target sequence is within an intergenic region. In some embodiments, the target sequence is selected from one or more of the group comprising SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, and SEQ ID NO: 32. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus on the homologous chromosome. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus in a different position on the homologous chromosome. In some embodiments, recombination is between homologous Rps1 disease-resistance loci. In some embodiments, recombination is between heterologous Rps1 disease-resistance loci. In some embodiments, recombination is between homoeologous Rps1 disease-resistance loci. In some embodiments, recombination is between paralogous Rps1 disease-resistance loci. In some embodiments, recombination is between identical Rps1 disease-resistance loci. In some embodiments, the homologous chromosomes are from sexually incompatible parental genomes. In some embodiments, the homologous chromosomes are different plant species. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of providing a soy plant with improved nematode resistance, comprising: (a) providing to one or more plant cells a site-specific genome modification enzyme that introduces a genome modification in at least one target sequence in a Rhg1 soy cyst nematode resistance locus; (b) screening for asymmetric recombination between Rhg1 soy cyst nematode resistance loci on homologous chromosomes to identify soy cells comprising a recombinant Rhg1 soy cyst nematode resistance locus; (c) testing soy plants obtained from the soy cells identified in step (b) and their progeny for improved nematode resistance; and (d) selecting the soy plant with improved nematode resistance. Several embodiments relate to a method of providing a soy plant with improved nematode resistance, comprising: (a) providing to one or more soy cells a site-specific genome modification enzyme that introduces a genome modification a first target sequence in a Rhg1 soy cyst nematode resistance locus and a second target sequence in the Rhg1 soy cyst nematode resistance locus, wherein the first target sequence and second target sequence are on homologous chromosomes; (b) screening for asymmetric recombination between Rhg1 soy cyst nematode resistance loci on homologous chromosomes to identify plant cells comprising a recombinant Rhg1 soy cyst nematode resistance locus; (c) testing plants obtained from the plant cells identified in step (b) and their progeny for improved nematode resistance; and (d) selecting the soy plant with improved nematode resistance. Several embodiments relate to a method of providing a soy plant with improved nematode resistance, comprising: (a) providing to one or more plant cells a first site-specific genome modification enzyme that introduces a genome modification a first target sequence in a Rhg1 soy cyst nematode resistance locus and a second site-specific genome modification enzyme that introduces a genome modification in a second target sequence in a Rhg1 soy cyst nematode resistance locus, wherein the first target sequence and second target sequence are on homologous chromosomes; (b) screening for asymmetric recombination between Rhg1 soy cyst nematode resistance loci on homologous chromosomes to identify soy cells comprising a recombinant Rhg1 soy cyst nematode resistance locus; (c) testing soy plants obtained from the soy cells identified in step (b) and their progeny for improved nematode resistance; and (d) selecting the soy plant with improved nematode resistance. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombinant Rhg1 soy cyst nematode resistance locus has an increased number of genes compared to the Rhg1 soy cyst nematode resistance locus in either parent. In some embodiments, the recombinant Rhg1 soy cyst nematode resistance locus has reduced number of genes compared to the Rhg1 soy cyst nematode resistance locus in either parent. In some embodiments, the recombinant Rhg1 soy cyst nematode resistance locus has a different combination of genes compared to the Rhg1 soy cyst nematode resistance locus in either parent. In some embodiments, the target sequence is genic. In some embodiments, the target sequence is within an intergenic region. In some embodiments, the target sequence is selected from one or more of the group comprising SEQ ID NO: 69, SEQ ID NO: 70, SEQ ID NO: 71, SEQ ID NO: 72, SEQ ID NO: 73, SEQ ID NO: 74, SEQ ID NO: 75, and SEQ ID NO: 76. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus on the homologous chromosome. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus in a different position on the homologous chromosome. In some embodiments, recombination is between homologous Rhg1 soy cyst nematode resistance loci. In some embodiments, recombination is between heterologous Rhg1 soy cyst nematode resistance loci. In some embodiments, recombination is between homoeologous Rhg1 soy cyst nematode resistance loci. In some embodiments, recombination is between paraologous Rhg1 soy cyst nematode resistance loci. In some embodiments, recombination is between identical Rhg1 soy cyst nematode resistance loci. In some embodiments, the homologous chromosomes are from sexually incompatible parental genomes. In some embodiments, the homologous chromosomes are different plant species. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

A method of generating a plant with an altered disease resistance locus from an inbred line, comprising providing a site-specific genome modification enzyme to a plant cell, wherein the site-specific genome modification enzyme introduces a genome modification at least one target sequence in a disease resistance locus thereby inducing asymmetric recombination between homologous chromosomes within the disease resistance locus and growing the plant with the altered disease resistance locus from the plant cell. A method of generating a plant with an altered disease resistance locus from an inbred line, comprising providing a first site-specific genome modification enzyme and a second site-specific genome modification enzyme to a plant cell, wherein the first site-specific genome modification enzyme introduces a genome modification at a first target sequence in a disease resistance locus and the second site-specific genome modification enzyme introduces a genome modification at a second target sequence in a disease resistance locus thereby inducing asymmetric recombination between the first and second target sequences on homologous chromosomes and growing the plant with the altered disease resistance locus from the plant cell. A method of generating a plant with an altered disease resistance locus from an inbred line, comprising providing a site-specific genome modification enzyme to a plant cell, wherein the site-specific genome modification enzyme introduces a genome modification at least two target sequences in a disease resistance locus thereby inducing deletion of a sequence in the disease resistance locus and growing the plant with the altered disease resistance locus from the plant cell. In some embodiments, the plant with the altered disease resistance locus does not require backcrossing to achieve genetic identity. In some embodiments, the plant with the altered disease resistance locus has improved disease resistance compared a plant of the inbred line without the altered disease resistance locus. In some embodiments, disease resistance locus encodes one or more nucleotide-binding site leucine-rich repeat (NBS-LRR) disease resistance proteins. In some embodiments, the plant is a corn plant and the disease resistance locus is Rp1. In some embodiments, the plant is a soybean plant and the disease resistance locus is Rpp1. In some embodiments, the plant is a soybean plant and the disease resistance locus is Rps1. In some embodiments, the plant is a soybean plant and the disease resistance locus is Rhg1. In some embodiments, the plant is a soybean plant and the disease resistance locus is Rgh4. In some embodiments, the plant with the altered disease resistance locus has improved resistance to one or more diseases selected from the group consisting of Anthracnose Stalk Rot (*Colletotrichum graminicola*), *Fusarium* Ear Rot (*Fusarium verticillioides*), *Fusarium* Stalk Rot (*Fusarium* spp.), *Gibberella* Ear Rot (*Gibberella moniliformis*), *Gibberella* Stalk Rot (*Gibberella zeae*), Goss's Wilt and Leaf Blight (*Clavibacter michiganensis*), Gray Leaf Spot (*Cercospora zeae-maydis, C. zeina*), Northern Corn Leaf Blight (*Exserohilum turcicum*), Sudden death syndrome (*Fusarium solani* f. sp. *glycines*), Asian soybean rust (*Phakopsora pachyrhizi*), *Phytophthora* root and stem rot (*Phytophthora sojae*), Root-knot Nematode (*Meloidogyne* spp.), Soybean Cyst Nematode (*Heterodera glycines*), Reniform nematode (*Rotylenchulus reniformis*), Root-knot nematode (*Meloidogyne incognita*), *Fusarium* wilt (*Fusarium oxysporurn* f. sp. *vasinfectum*), *Verticillium* wilt (*Verticillium dahlia*), *Fusarium* head blight (*Fusarium graminearum*), *Fusarium* seedling blight (*Fusarium* spp., *Septoria nodorum*), *Fusarium* Leaf Blotch (*Monographella nivalis*), and Stem Rust (*Puccinia graminis*). In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the altered disease resistance locus has an increased number of genes compared to the disease resistance locus in either parental genome. In some embodiments, the altered disease resistance locus has a reduced number of genes compared to the disease resistance locus in either parental genome. In some embodiments, the altered disease resistance locus has a new combination of genes compared to the disease resistance locus in either parental genome. In some embodiments, the disease resistance loci in the parental genomes are identical. In some embodiments, the target sequence is genic. In some embodiments, the target sequence is within an intergenic region. In some embodiments, the target sequence in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus in the disease resistance locus on the homologous chromosome. In some embodiments, the target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus in the disease resistance locus on the homologous chromosome, where the target sequence and the genomic locus in the disease resistance locus on the homologous chromosome are in different positions in the genome. In some embodiments, the plant is a maize plant. In some embodiments, the plant is a soybean plant. In some embodiments, the plant is a cotton plant. In some embodiments, the plant is a wheat plant. In some embodiments, the plant is a sorghum plant. In some embodiments, the plant is a canola plant. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. In some embodiments, the disease resistance locus Rp1, and the target sequence is selected from one or more of the group consisting of SEQ ID NO: 3, SEQ ID NO: 4, SEQ ID NO: 5, SEQ ID NO: 6, SEQ ID NO: 7, SEQ ID NO: 8, and SEQ ID NO: 9. In some embodiments, the disease resistance locus Rpp1, and the target sequence is selected from one or more of the group consisting of SEQ ID NO: 12, SEQ ID NO: 13, SEQ ID NO: 14, SEQ ID NO: 15, SEQ ID NO: 16, SEQ ID NO: 17, and SEQ ID NO: 18. In some embodiments, the disease resistance locus Rps1, and the target sequence is selected from one or more of the group consisting of SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, and SEQ ID NO: 32. In some embodiments, the disease resistance locus Rhg1, and the target sequence is selected from one or more of the group consisting of SEQ ID NO: 69, SEQ ID NO: 70, SEQ ID NO: 71, SEQ ID NO: 72, SEQ ID NO: 73, SEQ ID NO: 74, SEQ ID NO: 75, and SEQ ID NO: 76. Several embodiments relate to a plant, plant cell or a seed of a plant produced by according to the aforementioned methods.

Several embodiments relate to a method of enhancing recombination at selected genomic loci, comprising providing to a plant cell at least one site-specific genome modification enzyme that introduces genome modification in a first genomic locus, thereby inducing recombination between the first genomic locus and a second genomic locus, wherein the at least one site-specific genome modification enzyme does not introduce a genome modification at the second genomic locus, and selecting at least one plant cell comprising a recombination event between the first genomic locus and the second genomic locus. Several embodiments relate to a method of enhancing recombination at selected genomic loci, comprising providing to a plant cell at least one site-specific genome modification enzyme that introduces genome modification at a first genomic locus and a second genomic locus, thereby inducing recombination between the first genomic locus and the second genomic locus, and selecting at least one plant cell comprising a recombination event between the first genomic locus and the second genomic locus. Several embodiments relate to a method of enhancing recombination at selected genomic loci, comprising providing to a cell a first site-specific genome modification enzyme that introduces a genome modification at a first genomic locus and a second site-specific genome modification enzyme that introduces a genome modification at a second genomic locus, thereby inducing recombination between the first genomic locus and the second genomic locus, and selecting at least one progeny comprising a recombination event between the first genomic locus and the second genomic locus. In some embodiments the first and second genomic loci are in cis. In some embodiments, the first and second genomic loci are in trans. In some embodiments, the first and second genomic loci are homologs. In some embodiments, the first and second genomic loci are paraologs. In some embodiments, the first and second genomic loci are homeologs. In some embodiments, the first and second genomic loci are identical. In some embodiments, the first genomic locus and the second genomic locus are on homologous chromosomes. In some embodiments, the first genomic locus and the second genomic locus are on non-homologous chromosomes. In some embodiments, the first genomic locus and the second genomic locus are on homoeologous chromosomes. In some embodiments, the first and second genomic loci share at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity. In some embodiments, the first genomic locus and the second genomic locus are located on homologous chromosomes. In some embodiments, the first genomic locus and the second genomic locus are located on non-homologous chromosomes. In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the recombination is asymmetric. In some embodiments, the recombination is symmetric. In some embodiments, the first target sequence and/or the second target sequence is genic. In some embodiments, the first target sequence and/or the second target sequence is within an intergenic region. In some embodiments, the first target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus containing the second target sequence. In some embodiments, the first target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus containing the second target sequence, wherein the genomic locus containing the first target sequence and the genomic locus containing the second target sequence are in corresponding positions in the genome. In some embodiments, the first target sequence is in a genomic locus that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus containing the second target sequence, wherein the genomic locus containing the first target sequence and the genomic locus containing the second target sequence are not in corresponding positions in the genome. In some embodiments, the first target sequence has at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the second target sequence. In some embodiments, one or more of the first genomic locus and the second genomic locus comprise one or more genomic regions selected independently from the group consisting of a gene, an array of tandemly duplicated genes, an enhancer, a suppressor, a promoter, a termination sequence, a splice acceptor sequence, a splice donor sequence, an intron, an exon, an siRNA, and a quantitative trait locus (QTL). In some embodiments, progeny of the one plant cell comprising the recombination event between the first genomic locus and the second genomic locus exhibit resistance to one or more diseases selected from Anthracnose Stalk Rot (*Colletotrichum graminicola*), Fusarium Ear Rot (*Fusarium verticillioides*), Fusarium Stalk Rot (*Fusarium* spp.), Gibberella Ear Rot (*Gibberella moniliformis*), Gibberella Stalk Rot (*Gibberella zeae*), Goss's Wilt and Leaf Blight (*Clavibacter michiganensis*), Gray Leaf Spot (*Cercospora zeae-maydis, C. zeina*), Northern Corn Leaf Blight (*Exserohilum turcicum*), Sudden death syndrome (*Fusarium solani* f. sp. *glycines*), Asian soybean rust (*Phakopsora pachyrhizi*), Phytophthora root and stem rot (*Phytophthora sojae*), Root-knot Nematode (*Meloidogyne* spp.), Soybean Cyst Nematode (*Heterodera glycines*), Reniform nematode (*Rotylenchulus reniformis*), Root-knot nematode (*Meloidogyne incognita*), Fusarium wilt (*Fusarium oxysporurn* f. sp. *vasinfectum*), Verticillium wilt (*Verticillium dahlia*), Fusarium head blight (*Fusarium graminearum*), Fusarium seedling blight (*Fusarium* spp., *Septoria nodorum*), Fusarium Leaf Blotch (*Monographella nivalis*), and Stem Rust (*Puccinia graminis*). In some embodiments, the plant is a maize plant. In some embodiments, the plant is a soybean plant. In some embodiments, the plant is a cotton plant. In some embodiments, the plant is a wheat plant. In some embodiments, the plant is a sorghum plant. In some embodiments, the plant is a canola plant. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods.

Several embodiments relate to a method of introgressing a genomic locus of interest into a selected germplasm, comprising generating a plant cell comprising a first parental genome comprising the genomic locus of interest and a second parental genome comprising the selected germplasm, providing to the plant cell a first site-specific genome modification enzyme that introduces genome modification in the first parental genome at a target sequence adjacent to the genomic locus of interest, thereby inducing recombination between the first parental genome and the second parental genome, and selecting at least one progeny comprising at least one recombinant chromosome comprising the selected germplasm and the genomic locus of interest. Several embodiments relate to a method of introgressing a genomic locus of interest into a selected germplasm, comprising generating a plant cell comprising a first parental genome comprising the genomic locus of interest and a second parental genome comprising the selected germplasm, providing to the plant cell a first site-specific genome modification enzyme that introduces genome modification in the first parental genome at a target sequence adjacent to the genomic locus of interest and a genome modification at a target site in the second parental genome, thereby inducing recombination between the first parental genome and the second parental genome, and selecting at least one progeny comprising at least one recombinant chromosome comprising the selected germplasm and the genomic locus of interest. Several embodiments relate to a method of introgressing a genomic locus of interest into a selected germplasm, comprising generating a plant cell comprising a first parental genome comprising the genomic locus of interest and a second parental genome comprising the selected germplasm, providing to the plant cell a first site-specific genome modification enzyme that introduces genome modification in the first parental genome at a target sequence adjacent to the genomic locus of interest and a second site-specific genome modification enzyme that introduces a genome modification in the first parental genome at a second target sequence adjacent to the genomic locus, wherein the second target sequence is on opposite side of the genome genomic locus of interest from the target sequence of the first site-specific genome modification enzyme, thereby inducing recombination between the first parental genome and the second parental genome, and selecting at least one plant cell comprising at least one recombinant chromosome comprising the selected germplasm and the genomic locus of interest. Several embodiments relate to a method of introgressing a genomic locus of interest into a selected germplasm, comprising generating a plant cell comprising a first parental genome comprising the genomic locus of interest and a second parental genome comprising the selected germplasm, providing to the plant cell a first site-specific genome modification enzyme that introduces genome modification in the first parental genome at a target sequence adjacent to the genomic locus of interest and a second site-specific genome modification enzyme that introduces a genome modification in the first parental genome at a second target sequence adjacent to the genomic locus, wherein the second target sequence is on opposite side of the genome genomic locus of interest from the target sequence of the first site-specific genome modification enzyme, thereby inducing recombination between the first parental genome and the second parental genome, and selecting at least one plant cell comprising at least one recombinant chromosome comprising the selected germplasm and the genomic locus of interest. In some embodiments, the second site-specific genome modification enzyme introduces a genome modification at a target sequence in the second parental genome. In some embodiments, the recombination is asymmetric. In some embodiments, the recombination is symmetric. In some embodiments, the genomic locus of interest comprises one or more genomic regions selected independently from the group consisting of a gene, an array of tandemly duplicated genes, a multigene family, an enhancer, a suppressor, a promoter, a termination sequence, a splice acceptor sequence, a splice donor sequence, an intron, an exon, an siRNA, a sequence encoding a non-coding RNA, a microRNA, a transgene, and a quantitative trait locus (QTL). In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the target sequence is genic. In some embodiments, the target sequence is within an intergenic region. In some embodiments, the target sequence is in a genomic locus of the first parental genome that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second parental genome. In some embodiments, the target sequence is in a genomic locus of the first parental genome that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second parental genome, wherein the genomic locus of the first parental genome and the genomic locus of the second parental genome are located in corresponding positions. In some embodiments, the target sequence is in a genomic locus of the first parental genome that is homologous to at least about 100 bp, at least about 150 bp, at least about 200 bp, at least about 250 bp, at least about 300 bp, at least about 350 bp, at least about 400 bp, at least about 450 bp, at least about 500 bp, at least about 600 bp, at least about 700 bp, at least about 800 bp, at least about 900 bp, or at least about 1000 bp of a genomic locus of the second parental genome, wherein the genomic locus of the first parental genome and the genomic locus of the second parental genome are not located in corresponding positions, leading to asymmetric recombination. In some embodiments, the first parental genome and the second parental genome are not sexually compatible. In some embodiments, the first parental genome and the second parental genome are different species. In some embodiments, the first parental genome is *Triticum aestivum* (wheat) and the second parental genome is selected from *Aegilops ovate, Ae. biuncialis, Ae. triuncialis, Ae. quarrosa, Secale cereal, Triticum dicoccoides, Triticum dicoccum* and *Triticum durum*. In some embodiments, the first parental genome is selected from *Aegilops ovate, Ae. biuncialis, Ae. triuncialis, Ae. quarrosa, Secale cereal, Triticum dicoccoides, Triticum dicoccum* and *Triticum durum* and the second parental genome is *Triticum aestivum* (wheat). In some embodiments, the first parental genome is *Gossypium hirsutum* (cotton) and the second parental genome is selected from *G. sturtii, G. davidsonii, G. arboretum* and *G. raimondii*. In some embodiments, the first parental genome is selected from *G. sturtii, G. davidsonii, G. arboretum* and *G. raimondii* and the second parental genome is *Gossypium hirsutum* (cotton). In some embodiments, the first parental genome and/or the second parental genome are haploid. In some embodiments, the first parental genome and/or the second parental genome are diploid. In some embodiments, the genomic locus of interest is Rp1 disease resistance locus. In some embodiments, the genomic locus of interest is Rpp1 disease resistance locus. In some embodiments, the genomic locus of interest is Rps1 disease resistance locus. In some embodiments, the genomic locus of interest is Rhg1 disease resistance locus. In some embodiments, the genomic locus of interest is Rgh4 disease resistance locus. In some embodiments, the plant is a maize plant. In some embodiments, the plant is a soybean plant. In some embodiments, the plant is a cotton plant. In some embodiments, the plant is a wheat plant. In some embodiments, the plant is a sorghum plant. In some embodiments, the plant is a canola plant. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain.

Several embodiments relate to a plant, plant cell or a seed of a plant produced by according to the aforementioned methods.

Several embodiments relate to a method of removing linkage drag, comprising generating a plant cell comprising a first parental genome and a second parental genome, wherein the first parental genome comprises a genomic locus of interest linked in cis to an undesirable genomic locus, providing to the cell a first site-specific genome modification enzyme that introduces a genome modification between the genomic locus of interest and the undesirable genomic locus, thereby inducing recombination between the first parental genome and the second parental genome and unlinking the genomic locus of interest and the undesirable locus, and selecting at least one progeny comprising the genomic locus of interest. Several embodiments relate to a method of removing linkage drag, comprising generating a plant cell comprising a first parental genome and a second parental genome, wherein the first parental genome comprises a genomic locus of interest linked in cis to an undesirable genomic locus, providing to the cell a first site-specific genome modification enzyme that introduces a first genome modification between the genomic locus of interest and the undesirable genomic locus and a second genome modification on opposite side of the undesirable genomic locus from the first genome modification, thereby inducing recombination between the first parental genome and the second parental genome and removing the undesirable locus while maintaining the germplasm of the first parental genome distal to the second genome modification, and selecting at least one progeny comprising the genomic locus of interest. In some embodiments, the second site-specific genome modification enzyme introduces a genome modification at a target sequence in the second parental genome. In some embodiments, the recombination is asymmetric. In some embodiments, the recombination is symmetric. In some embodiments, the genomic locus of interest comprises one or more genomic regions selected independently from the group consisting of a gene, an array of tandemly duplicated genes, a multigene family, an enhancer, a suppressor, a promoter, a termination sequence, a splice acceptor sequence, a splice donor sequence, an intron, an exon, an siRNA, a sequence encoding a non-coding RNA, a microRNA, a transgene, and a quantitative trait locus (QTL). In some embodiments, the genome modification is a double strand break (DSB). In some embodiments, the genome modification is a single strand break. In some embodiments, the genome modification is a recombinase-mediated DNA exchange reaction. In some embodiments, the genome modification is a transposase-mediated DNA exchange reaction. In some embodiments, the genome modification occurs at the beginning of meiosis. In some embodiments, the first parental genome and the second parental genome are not sexually compatible. In some embodiments, the first parental genome and the second parental genome are different species. In some embodiments, the first parental genome is *Triticum aestivum* (wheat) and the second parental genome is selected from *Aegilops ovate, Ae. biuncialis, Ae. triuncialis, Ae. quarrosa, Secale cereal, Triticum dicoccoides, Triticum dicoccum* and *Triticum durum*. In some embodiments, the first parental genome is selected from *Aegilops ovate, Ae. biuncialis, Ae. triuncialis, Ae. quarrosa, Secale cereal, Triticum dicoccoides, Triticum dicoccum* and *Triticum durum* and the second parental genome is *Triticum aestivum* (wheat). In some embodiments, the first parental genome is *Gossypium hirsutum* (cotton) and the second parental genome is selected from *G. sturtii, G. davidsonii, G.*

*arboretum* and *G. raimondii*. In some embodiments, the first parental genome is selected from *G. sturtii, G. davidsonii, G. arboretum* and *G. raimondii* and the second parental genome is *Gossypium hirsutum* (cotton). In some embodiments, the first parental genome and/or the second parental genome are haploid. In some embodiments, the first parental genome and/or the second parental genome are diploid. In some embodiments, the genomic locus of interest is Rp1 disease resistance locus. In some embodiments, the genomic locus of interest is Rpp1 disease resistance locus. In some embodiments, the genomic locus of interest is Rps1 disease resistance locus. In some embodiments, the genomic locus of interest is Rhg1 disease resistance locus. In some embodiments, the genomic locus of interest is Rhg4 disease resistance locus. In some embodiments, the plant is a maize plant. In some embodiments, the plant is a soybean plant. In some embodiments, the plant is a cotton plant. In some embodiments, the plant is a wheat plant. In some embodiments, the plant is a sorghum plant. In some embodiments, the plant is a canola plant. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. Several embodiments relate to a plant, plant cell or a seed of a plant produced by according to the aforementioned methods. Several embodiments relate to a method of coupling genomic loci in repulsion, comprising generating a plant cell comprising a first parental genome comprising a first genomic locus and a second parental genome comprising a second genomic locus, wherein the first genomic locus and the second genetic locus are in repulsion, providing to the cell a first site-specific genome modification enzyme that introduces a genome modification adjacent to the first genomic locus, thereby inducing recombination between the first parental genome and the second parental genome, and selecting at least one plant cell comprising the first genomic locus and the second genomic locus on the same chromosome. In some embodiments, the first genomic locus and the second genomic locus are located on homologous chromosomes. In some embodiments, the first parental genome and the second parental genome are not sexually compatible. In some embodiments, the first parental genome and the second parental genome are different species. In some embodiments, the first genomic locus of interest and/or the second genomic locus of interest comprises one or more genomic regions selected independently from the group consisting of a gene, an array of tandemly duplicated genes, an enhancer, a suppressor, a promoter, a termination sequence, a splice acceptor sequence, a splice donor sequence, an intron, an exon, an siRNA, and a quantitative trait locus (QTL). In some embodiments, the first parental genome and/or the second parental genome are haploid. In some embodiments, the first parental genome and/or the second parental genome are diploid. In some embodiments, the first parental genome is *Triticum aestivum* (wheat) and the second parental genome is selected from *Aegilops ovate, Ae. biuncialis, Ae. triuncialis, Ae. quarrosa, Secale cereal, Triticum dicoccoides, Triticum dicoccum* and *Triticum durum*. In some embodiments, the first parental genome is selected from *Aegilops ovate, Ae. biuncialis, Ae. triuncialis, Ae. quarrosa, Secale cereal, Triticum dicoccoides, Triticum dicoccum* and *Triticum durum* and the second parental genome is *Triticum aestivum* (wheat). In some embodiments, the first parental genome is *Gossypium hirsutum* (cotton) and the second parental genome is selected from *G. sturtii, G. davidsonii, G. arboretum* and *G. raimondii*. In some embodiments, the first parental genome is selected from *G. sturtii, G. davidsonii, G. arboretum* and *G. raimondii* and the second parental genome is *Gossypium hirsutum* (cotton). In some embodiments, the genomic locus of interest is Rp1 disease resistance locus. In some embodiments, the first genomic locus of interest and/or the second genomic locus of interest is Rpp1 disease resistance locus. In some embodiments, the first genomic locus of interest and/or the second genomic locus of interest is Rps1 disease resistance locus. In some embodiments, the first genomic locus of interest and/or the second genomic locus of interest Rhg1 disease resistance locus. In some embodiments, the first genomic locus of interest and/or the second genomic locus of interest Rhg4 disease resistance locus. In some embodiments, the first genomic locus of interest is Rhg1 and the second genomic locus of interest Rhg4. In some embodiments, the plant is a maize plant. In some embodiments, the plant is a soybean plant. In some embodiments, the plant is a cotton plant. In some embodiments, the plant is a wheat plant. In some embodiments, the plant is a sorghum plant. In some embodiments, the plant is a canola plant. In some embodiments, the site-specific genome modification enzyme is an endonuclease. In some embodiments, the site-specific genome modification enzyme is an endonuclease selected from a meganuclease, a zinc finger nuclease, a transcription activator-like effector nuclease (TALEN), an Argonaute, an RNA-guided endonuclease, a type I CRISPR-Cas system, type II CRISPR-Cas system or a type III CRISPR-Cas system. In some embodiments, the site-specific genome modification enzyme is a CRISPR associate protein selected from the group comprising Cpf1, Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4 nuclease. In some embodiments, the site-specific genome modification enzyme is a recombinase. In some embodiments, the site-specific genome modification enzyme is an RNA-guided recombinase. In some embodiments, the site-specific genome modification enzyme is a fusion protein comprising a recombinase and a CRISPR associated protein. In some embodiments, the recombinase is a tyrosine recombinase attached to a DNA recognition motif, or a serine recombinase attached to a DNA recognition motif. In some embodiments, the recombinase is a Cre recombinase, a Flp recombinase, a Tnp1 recombinase, a PhiC31 integrase, an R4 integrase, or a TP-901 integrase. In some embodiments, the site-specific genome modification enzyme is a transposase attached to a DNA binding domain. In some embodiments, one or more of the first parental genome and the second parental genome are from an elite germplasm line. Several embodiments relate to a plant, plant cell or a seed of a plant produced by according to the aforementioned methods.

Several embodiments relate to a method of generating a new array of tandemly duplicated genes, comprising contacting a cell with a site-specific genome modification enzyme that cleaves at least one target sequence in a first array of tandemly duplicated genes thereby inducing asymmetric recombination with a homologous sequence of a second array of tandemly duplicated genes and selecting at least one progeny comprising a new array of tandemly duplicated genes. In some embodiments, the first and second arrays of tandemly duplicated genes are identical. In other embodiments, the first and second arrays of tandemly duplicated genes are different. In some embodiments, the asymmetric recombination generates two new arrays of tandemly duplicated genes, depending on the recombination site. In some embodiments, the asymmetric recombination results in a deletion in at least one of the tandemly duplicated genes. In some embodiments, the cell is a plant cell. In a further embodiment, the plant cell is obtained from a plant selected from an inbred plant or a hybrid plant. In other embodiments, the cell is a mammalian cell.

In one aspect, the site-specific genome modification enzyme is selected from an endonuclease, a recombinase, a transposase, a helicase, or any combination thereof. In a further aspect, the endonuclease is selected from a meganuclease, a zinc-finger nuclease, a TALEN, a nucleic acid guided endonuclease, an Argonaute, a CRISPR/Cpf1 system and a CRISPR/Cas9 system.

In one aspect, the tandemly duplicated genes encode proteins selected from NBS-LRR disease resistance proteins, pathogen recognition receptor (PRR) proteins, seed storage proteins, the cell wall component extension proteins, F-box proteins, ABC transporters, immunoglobulins, serine-threonine/tyrosine protein kinases, and ribosomal RNAs. In the case of Rhg1, the tandem repeats are composed of three genes: a putative amino acid transporter, an alpha-SNAP protein, and a wound-inducible protein.

The present disclosure also pertains to a method of altering disease resistance of a plant, comprising providing a plant cell with a site-specific genome modification enzyme that cleaves a conserved region in one or more disease resistance loci and growing the plant from the plant cell. In one embodiment, the disease resistance locus comprises an NBS-LRR class of disease resistance genes.

The present disclosure further pertains to a method of providing a plant with improved disease resistance, comprising: (a) providing to one or more plant cells a site-specific genome modification enzyme that cleaves a target sequence in a disease resistance locus; (b) screening the one or more plant cells for asymmetric recombination between disease-resistance loci on homologous chromosomes to identify plant cells comprising a recombinant disease resistance locus; (c) testing plants obtained from the plant cells identified in step (b) and their progeny for improved disease resistance; and (d) selecting a plant with improved disease resistance. In addition, the present disclosure provides a plant, plant cell, plant seed or plant part generated by this method. In some embodiments, the plant has at least one recombinant disease-resistance locus. In some embodiments, the plant has at least one deletion in at least one of the disease-resistance loci. In one aspect, the plant has improved disease resistance compared with a plant with the parental allele of the disease resistance locus or a deletion of one or more genes in the disease-resistance locus. In one embodiment, the disease resistance locus comprises an NBS-LRR class of disease resistance genes.

Furthermore, the present disclosure provides a method of detecting homologous recombination between two parental chromosomes, comprising: a. identifying restriction nuclease sites flanking a targeted locus of interest on each of the two parental chromosomes; b. providing a PCR primer specific for the first parental chromosome and another PCR primer specific for the second parental chromosome; and c. using a probe designed to specifically recognize the unique junction of the 5'-flanking region of the locus of interest on the first chromosome and the 3'-flanking region of the locus of interest on the second chromosome to identify a PCR product which indicates the occurrence of recombination.

DETAILED DESCRIPTION

Figure 1:
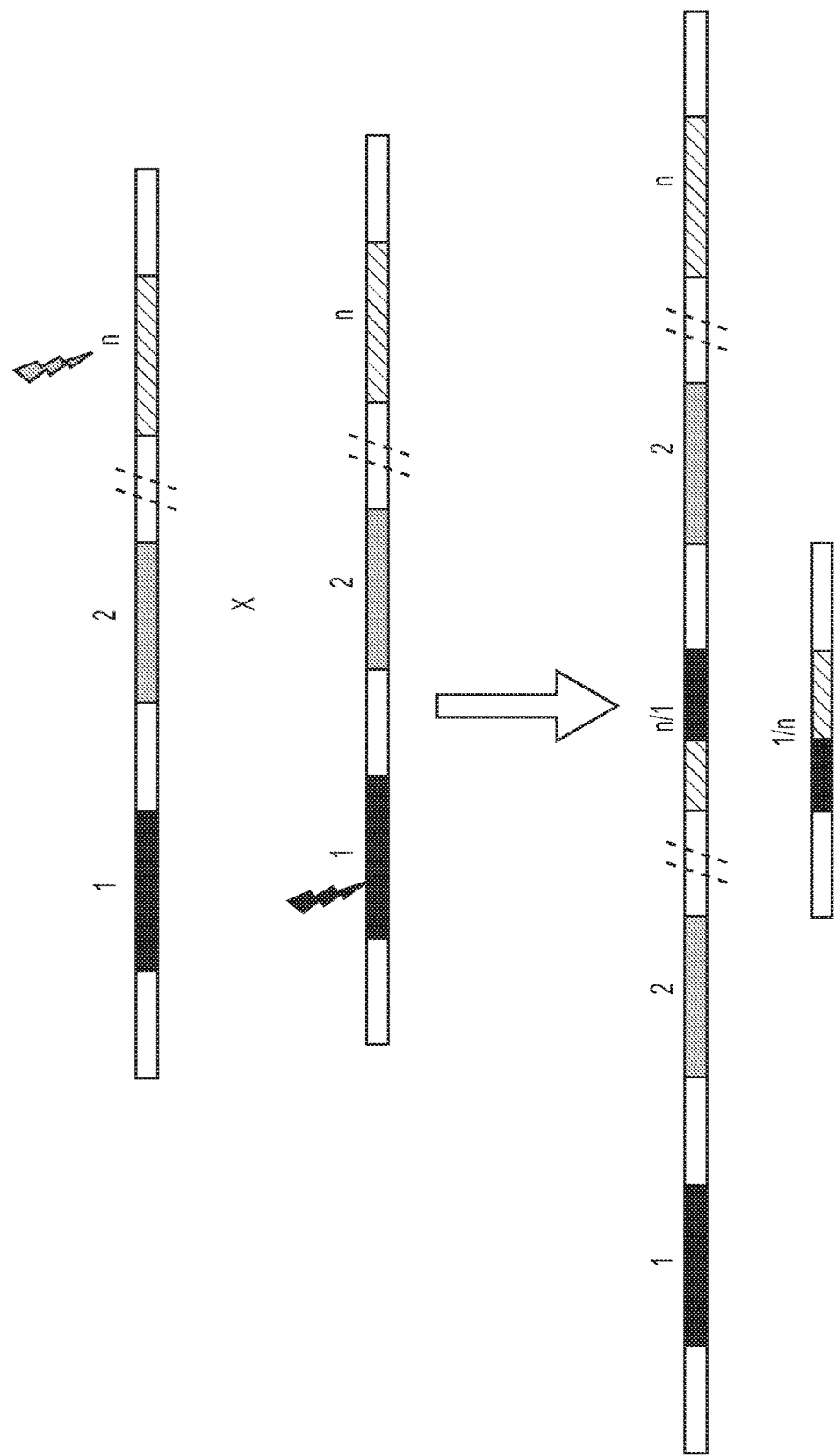
FIG. 1 illustrates induced asymmetric recombination between arrays of tandemly duplicated genes. In this illustration, the gene arrays have 1, 2, . . . , n tandemly duplicated genes and asymmetric recombination occurs between gene n on the first parental chromosome and gene 1 on the second parental chromosome resulting in the formation of a new array comprising a genes from both parent chromosomes (in this illustration 1, 2, 2, n) on a first recombinant chromosome and a single new gene (illustrated as 1/n) on a second recombinant chromosome. The lightening bolts indicate sites of genome modification.
Figure 2:
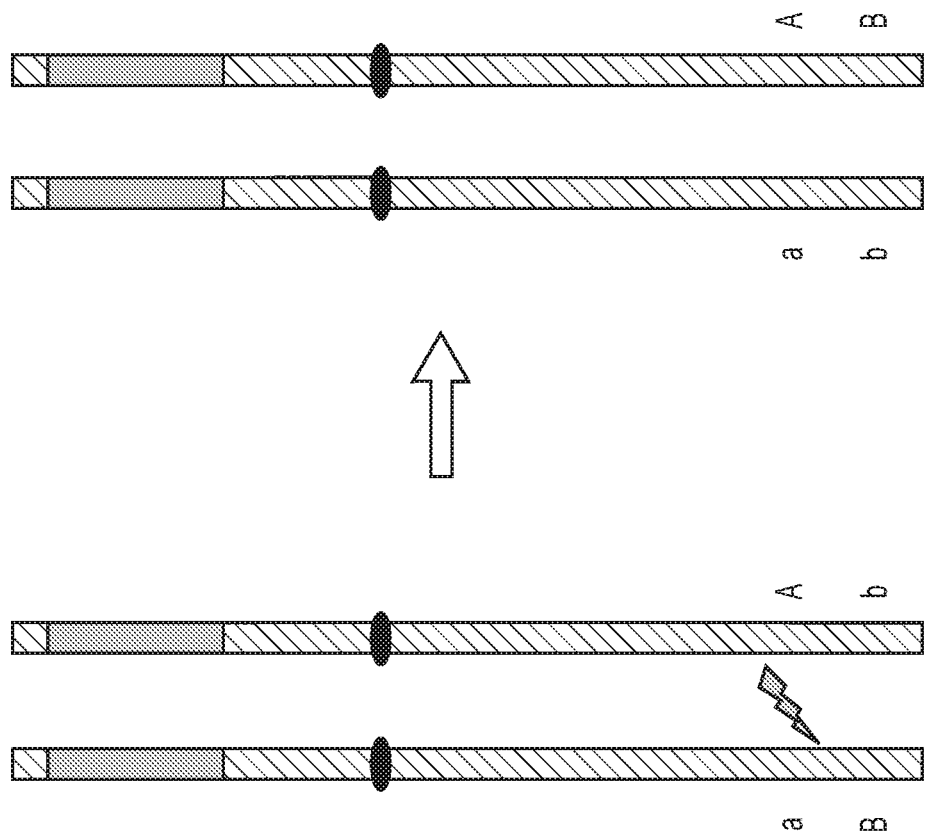
FIG. 2 illustrates induced recombination between two genomic loci arranged in trans repulsion on the two parental chromosomes (left pair) and following genome modification the loci are in cis on the progeny chromosomes (right pair). The lightening bolt indicates a site of genome modification.

Unless defined otherwise, all technical and scientific terms used herein have the same meaning as commonly understood by one of ordinary skill in the art to which this disclosure belongs. Where a term is provided in the singular, the inventors also contemplate aspects of the disclosure described by the plural of that term. Where there are discrepancies in terms and definitions used in references that are incorporated by reference, the terms used in this application shall have the definitions given herein. Other technical terms used have their ordinary meaning in the art in which they are used, as exemplified by various art-specific dictionaries, for example, "The American Heritage® Science Dictionary" (Editors of the American Heritage Dictionaries, 2011, Houghton Mifflin Harcourt, Boston and New York), the "McGraw-Hill Dictionary of Scientific and Technical Terms" (6th edition, 2002, McGraw-Hill, New York), or the "Oxford Dictionary of Biology" (6th edition, 2008, Oxford University Press, Oxford and New York). The inventors do not intend to be limited to a mechanism or mode of action. Reference thereto is provided for illustrative purposes only.

The practice of the present disclosure employs, unless otherwise indicated, conventional techniques of biochemistry, chemistry, molecular biology, microbiology, cell biology, genomics, plant breeding, and biotechnology, which are within the skill of the art. See Green and Sambrook, MOLECULAR CLONING: A LABORATORY MANUAL, 4th edition (2012); CURRENT PROTOCOLS IN MOLECULAR BIOLOGY (F. M. Ausubel, et al. eds., (1987)); the series METHODS IN ENZYMOLOGY (Academic Press, Inc.): PCR 2: A PRACTICAL APPROACH (M. J. MacPherson, B. D. Hames and G. R. Taylor eds. (1995)); Harlow and Lane, eds. (1988) ANTIBODIES, A LABORATORY MANUAL; ANIMAL CELL CULTURE (R. I. Freshney, ed. (1987)); RECOMBINANT PROTEIN PURIFICATION: PRINCIPLES AND METHODS, 18-1142-75, GE Healthcare Life Sciences; C. N. Stewart, A. Touraev, V. Citovsky, T. Tzfira eds. (2011) PLANT TRANSFORMATION TECHNOLOGIES (Wiley-Blackwell); and R. H. Smith (2013) PLANT TISSUE CULTURE. TECHNIQUES AND EXPERIMENTS (Academic Press, Inc.).

Any references cited herein are incorporated by reference in their entireties.

As used herein, the singular form "a," "an," and "the" include plural references unless the context clearly dictates otherwise. For example, the term "a compound" or "at least one compound" may include a plurality of compounds, including mixtures thereof.

As used herein, the term "about" indicates that a value includes the inherent variation of error for the method being employed to determine a value, or the variation that exists among experiments.

As used herein, the term "site-specific genome modification enzyme" refers to any enzyme that can modify a nucleotide sequence in a site-specific manner. In the present disclosure, site-specific genome modification enzymes include endonucleases, recombinases, transposases, helicases and any combination thereof.

As used herein, the term "recombination" refers to the process by which two DNA molecules exchange nucleotide sequences. In some embodiments, recombination occurs between two sets of parental chromosomes. In some embodiments, recombination occurs between two homologous chromosomes. In some embodiments, recombination occurs between non-homologous chromosomes. In some embodiments, recombination occurs between homoeologous chromosomes. In some embodiments, recombination results in the production of a new gene sequence, number of genes, arrangement of genes, allele or combination of alleles.

As used herein, the term "recombination event" refers to an instance of recombination between two DNA molecules.

As used herein, the term "homologous recombination" refers to the exchange of nucleotide sequences at a conserved region shared by two genomic loci. Homologous recombination includes symmetric homologous recombination and asymmetric homologous recombination. Asymmetric homologous recombination may also be referred to as unequal recombination.

Figure 3:
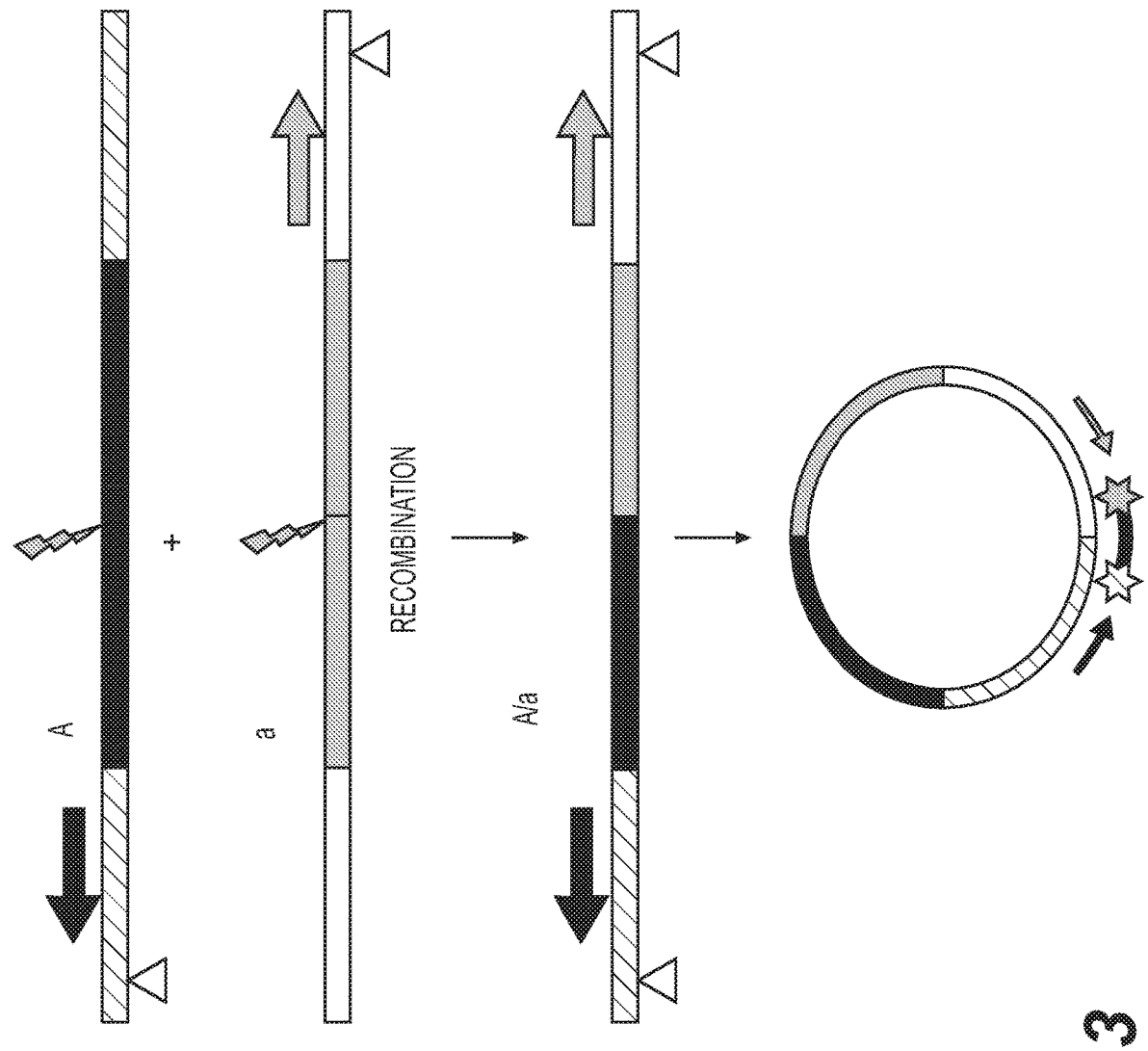
FIG. 3 illustrates a method of identifying recombination between two parental chromosomes by inverse PCR. Restriction nuclease sites (indicated by triangles) flanking a targeted genomic locus of interest are identified on each of the parental chromosomes. A PCR primer specific for the first parental chromosome ('A') is indicated by the black arrow. A PCR primer specific for the second parental chromosome (a') is indicated by the gray arrow. An induced double-stranded break (indicated by the lightening bolt) promotes recombination between the parental chromosomes bringing both restriction endonuclease sites and primer binding sites onto the same recombinant chromosome. A TaqMan® probe specific for the unique junction of the 5'-flanking region of the targeted genomic locus of interest on the 'A' chromosome and the 3'-flanking region of the targeted genomic locus of interest on the 'a' chromosome is indicated by the bar with stars on each end. A PCR product is observed only in instances where recombination occurs.

Many methods for detecting recombination are know in the art and include, but are not limited to, 1) phenotypic screening, 2) molecular marker technologies such as single nucleotide polymorphism—SNP analysis by TaqMan® or Illumina/Infinium technology, 3) Southern blot, and 4) sequencing. One example of a method for identifying recombination between two parental chromosomes by inverse PCR is illustrated in FIG. 3. In this method, restriction nuclease sites flanking a targeted gene of interest are identified on each of the two parental chromosomes. These restriction nuclease sites can be the same or different. A PCR primer specific for the first parental chromosome and another PCR primer specific for the second parental chromosome are designed. An induced double-stranded break promotes recombination between the two parental chromosomes bringing both restriction endonuclease sites and primer binding sites onto the same recombinant chromosome. A PCR product is observed only in instances where recombination occurs.

As used herein, the term "recombination rate" refers to the probability that a recombination event will occur between two genomic loci. The recombination rate may be influenced by a number of factors, including, but not limited to, the distance between two genomic loci, the chromosomal region (e.g., centromereic, telomereic) in which the loci occur, transcriptional activity, the presence of chromosomal inversions and other factors. Methods for measuring recombination include, but are not limited to, linkage analysis in mapping populations, and quantitative technologies such as quantitative PCR (qPCR) or droplet digital PCR (ddPCR), as described in the present disclosure.

As used herein, the term "genomic locus" refers to a specific location on a chromosome. A genomic locus may comprise a single nucleotide, a few nucleotides, a large number of nucleotides, a gene, a portion of a gene, a gene cluster, a multigene family or array of genes in a genomic region. In some embodiments, a genomic locus may comprise a tandemly duplicated array of genes. In some embodiments, a genomic locus may comprise a QTL. A genomic locus may be defined by a specific sequence, or a genomic locus may be defined by flanking markers. A genomic locus may also be defined by a linkage map.

As used herein, the term "target sequence" refers to a nucleotide sequence against which a site-specific genome modification enzyme binds and/or exerts cleavage, nickase, recombinase or transposase activity. A target sequence may be genic or non-genic.

As used herein, the term "gene" means a locatable region of genomic sequence corresponding to a unit of inheritance. A gene may include regulatory regions, such as promoters, enhancers, 5'-untranslated regions, intron regions, exon regions, 3'-untranslated regions, transcribed regions, and other functional sequence regions that may exist as native genes or transgenes in a plant or a mammalian genome. Depending upon the circumstances, the term "target gene" can refer to the full-length nucleotide sequence of a gene targeted for binding and/or cleavage or the nucleotide sequence of a portion of a gene targeted for binding and/or cleavage. A target gene can be an endogenous gene or a transgene.

As used herein, the term "event" refers to a genomic sequence resulting from molecular recombination of the cellular genomic DNA. The recombination includes homologous recombination, non-homologous recombination, cis-recombination, sister-chromatid exchange, multiple chromosome rearrangements, symmetric and asymmetric recombination. An event may occur in a genic sequence or the event may occur in an intergenic sequence. In some embodiments, an event may be a novel genomic sequence.

As used herein, an "elite line" is any line that has resulted from breeding and selection for superior agronomic performance.

As used herein, the term "inbred" means a line that has been bred for genetic homogeneity.

As used herein, the term "hybrid" means a progeny of mating between at least two genetically dissimilar parents. Without limitation, examples of mating schemes include single crosses, modified single cross, double modified single cross, three-way cross, modified three-way cross, and double cross wherein at least one parent in a modified cross is the progeny of a cross between sister lines. In some embodiments, a hybrid may be generated by crossing *Triticum aestivum* (wheat) with a plant selected from *Aegilops ovate, Ae. biuncialis, Ae. triuncialis, Ae. quarrosa, Secale cereal, Triticum dicoccoides, Triticum dicoccum* and *Triticum durum*. In some embodiments, a hybrid may be created by crossing *Gossypium hirsutum* (cotton) with a plant selected from *G. sturtii, G. davidsonii, G. arboretum* and *G. raimondii*.

As used herein, the term "marker" refers to a detectable characteristic that can be used to discriminate between organisms, genomes, chromosomes, genomic loci, genes or portions of genes. Examples of such characteristics may include genetic markers, protein composition, protein levels, oil composition, oil levels, carbohydrate composition, carbohydrate levels, fatty acid composition, fatty acid levels, amino acid composition, amino acid levels, biopolymers, pharmaceuticals, starch composition, starch levels, fermentable starch, fermentation yield, fermentation efficiency, energy yield, secondary compounds, metabolites, morphological characteristics, and agronomic characteristics.

As used herein, the term "genetic marker" refers to a polymorphic nucleic acid sequence or nucleic acid feature that can be used to discriminate between nucleic acids. A "polymorphism" is a variation among individuals in sequence, particularly in DNA sequence, or feature, such as a transcriptional profile or methylation pattern. Useful polymorphisms may comprise, but are not limited to, one or more base changes, the insertion of one or more nucleotides or the deletion of one or more nucleotide, a single nucleotide polymorphism (SNP), a simple sequence repeat (SSR) and indels (insertions and deletions). A polymorphism may arise from random processes in nucleic acid replication, through mutagenesis, as a result of mobile genomic elements, from copy number variation and during the process of meiosis, such as unequal crossing over, genome duplication and chromosome breaks and fusions.

As used herein, the term "linkage" refers a phenomenon wherein genes on the same chromosome tend to segregate together more often than expected by chance if their transmission was independent. For example, if genomic locus A has genes "A" or "a" and genomic locus B has genes "B" or "b" and a cross between a first parental genome with AABB and a second parental genome with aabb will produce four possible gametes where the genes are segregated into AB, Ab, aB and ab. The null expectation is that there will be independent equal segregation into each of the four possible genotypes, i.e. with no linkage ¼ of the gametes will of each genotype. In this scenario, segregation of gametes into a genotypes differing from ¼ are attributed to linkage.

As used herein, "plant" refers to a whole plant, a plant cell, plant tissue or a plant seed. A cell or tissue culture derived from a plant can comprise any plant components or plant organs (e.g., leaves, stems, roots, etc.), plant tissues, seeds, plant cells, and/or progeny of the same. A progeny plant can be from any filial generation, e.g., $F_1$, $F_2$, $F_3$, $F_4$, $F_5$, $F_6$, $F_7$, etc. A plant cell is a biological cell of a plant, taken from a plant or derived through culture from a cell taken from a plant.

As used herein, "plant genome" refers to a nuclear genome, a mitochondrial genome, or a plastid (e.g., chloroplast) genome of a plant cell. In some embodiments, a plant genome may comprise a parental genome contributed by the male and a parental genome contributed by the female. In some embodiments, a plant genome may comprise only one parental genome.

The term "conserved region" refers to a contiguous polynucleotide sequence that is shared by two or more DNA sequences with at least 80%, at least 85%, at least 90%, at least 95%, at least 96%, at least 97%, at least 98%, at least 99%, or 100%, sequence identity. The conserved region can be at least 10 bp, at least 20 bp, at least 30 bp, at least 40 bp, at least 50 bp, at least 60 bp, at least 70 bp, at least 80 bp, at least 90 bp, at least 100 bp, at least 200 bp, at least 300 bp, at least 400 bp, at least 500 bp, at least 600 bp, at least 700 bp, at least 800 bp, at least 900 bp, at least 1,000 bp, or more in length. As used herein, the term "identity" when used in relation to nucleic acids, describes the degree of similarity between two or more nucleotide sequences. The percentage of "sequence identity" between two sequences can be determined by comparing two optimally aligned sequences over a comparison window, such that the portion of the sequence in the comparison window may comprise additions or deletions (gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison, and multiplying the result by 100 to yield the percentage of sequence identity. A sequence that is identical at every position in comparison to a reference sequence is said to be identical to the reference sequence and vice-versa. An alignment of two or more sequences may be performed using any suitable computer program. For example, a widely used and accepted computer program for performing sequence alignments is CLUSTALW v1.6 (Thompson, et al. (1994) *Nucl. Acids Res.*, 22: 4673-4680).

As used herein, the term "paralog" refers to genes related by duplication within a genome. In some embodiments paralogs are in the same genome. In some embodiments paralogs are in different genomes. In some embodiments paraologs are isofunctional. In some embodiments paralogs are heterofunctional.

As used in the term "homolog" refers to a gene related to a second gene by descent from a common ancestral DNA sequence. The term, homolog, may apply to the relationship between genes separated by the event of speciation (or-tholog) or to the relationship between genes separated by the event of genetic duplication (paralog). In some embodiments homologs are in the same genome. In some embodiments homologs are in different genomes. In some embodiments homologs are isofunctional. In some embodiments homologs are heterofunctional.

As used in the term "homoeolog" refers a pair of genes that originated by speciation and were brought back together in the same genome by allopolyploidization.

As used in the term "homoeologous chromosome" refers to chromosomes of different species that share an ancestral origin.

As used herein, the term "tandem duplication" refers any occurrence of two identical sequences, one following the other, in a chromosome segment.

As used herein, the term "gene duplication" refers any duplications of a region of DNA that contains a gene.

A gene cluster is a group of two or more genes linked as neighbors on a chromosome. Genes in gene clusters often encode for similar polypeptides, or proteins, which collectively share a generalized function and are often located within a few thousand base pairs of each other.

A gene family is a set of several similar genes, formed by duplication of a single original gene. A gene family can comprise 2 or more genes, 3 or more genes, 4 or more genes, 5 or more genes, 6 or more genes, 7 or more genes, 8 or more genes, 9 or more genes, 10 or more genes, 15 or more genes, 20 or more genes, 25 or more genes, 30 or more genes, 35 or more genes, 40 or more genes, 45 or more genes, 50 or more genes, 55 or more genes, 60 or more genes, 65 or more genes, 70 or more genes, 75 or more genes, 80 or more genes, 90 or more genes, 100 or more genes, 150 or more genes, 200 or more genes, 250 or more genes, 300 or more genes, 350 or more genes, 400 or more genes, 450 or more genes, or 500 or more genes. In some embodiments a gene family may comprise an array of tandemly duplicated genes.

As used herein, the term "array of tandemly duplicated genes" refers to a gene cluster created by tandem duplication of chromosome segments containing one or more genes. In some embodiments, an array of tandemly duplicated genes can comprise 2 or more genes, 3 or more genes, 4 or more genes, 5 or more genes, 6 or more genes, 7 or more genes, 8 or more genes, 9 or more genes, 10 or more genes, 15 or more genes, 20 or more genes, 25 or more genes, 30 or more genes, 35 or more genes, 40 or more genes, 45 or more genes, 50 or more genes, 55 or more genes, 60 or more genes, 65 or more genes, 70 or more genes, 75 or more genes, 80 or more genes, 90 or more genes, 100 or more genes, 150 or more genes, 200 or more genes, 250 or more genes, 300 or more genes, 350 or more genes, 400 or more genes, 450 or more genes, or 500 or more genes. Examples of arrays of tandemly duplicated genes include, but are not limited to, genes that encode NBS-LRR or PRR disease resistance proteins, seed storage proteins, the cell wall component extension proteins, F-box proteins, ABC transporters, serine-threonine/tyrosine protein kinases, and ribosomal RNAs.

As used herein, the term "allele" refers to one of a number of alternative forms of the same gene or same genetic locus.

As used herein, the term "disease resistance locus" refers to a genomic region associated with disease or pathogen resistance in a plant. A disease resistance locus may comprise one or more genes, gene families, arrays of genes or QTLs encoding a protein or proteins that confer to a plant resistance to at least one disease or pathogen. In one embodiment, the disease resistance locus comprises one or more NBS-LRR disease resistance genes, also referred to as NB-LRR genes, R genes, LRR genes. In another embodiment, the disease resistance locus comprises one or more PRR disease resistance genes. The disease resistance locus may encompass a specific gene, cluster of genes, array of genes and/or gene family known to confer pathogen resistance, for example Rp1, or Rpp1, or Rps1. In another embodiment, the disease resistance locus comprises the Rgh1 locus. In another embodiment, the disease resistance locus comprises the Rgh4 locus. Alternatively, the disease resistance locus may encompass a genomic region but the actual gene/element composition conferring disease resistance is unknown.

As used herein, the term "immunoglobulin gene" refers to any gene encoding a region of an immunoglobulin heavy chain or light chain (e.g., the VH, VL, CH regions, the hinge region, the variable (V) segment, the diversity (D) segment, the joining (J) segment, or a portion thereof). The term immunoglobulin includes any immunoglobulin class, i.e., IgM, IgG, IgD, IgA and IgE, and any isotype.

As used herein, a "plant pathogen" is any organism or agent resulting in the infection of a plant or plant tissue. Common pathogens include viruses, bacteria, fungi, insects and nematodes.

As used herein, the term "quantitative trait locus" or "QTL" refers to a region of DNA that is associated with the differential expression of a phenotypic trait in at least one genetic background, e.g., in at least one breeding population.

QTLs are closely linked to a gene or genes that underlie the trait in question. In some instances, the identity of the elements, genes, or set of genes underlying the trait are unknown. An example of a QTL associated with pathogen resistance is Rhg4.

As used herein, a cell or genome referred to as "haploid" has a single set of chromosomes and the reduced number of chromosomes (n) in the haploid plant is equal to that of the gamete.

As used herein, a cell or genome referred to as "diploid" has two sets of chromosomes and the chromosome number (2n) is equal to that of the zygote.

Tandem gene duplication plays a role in the accumulation of clusters of repeat genes, which in turn, contributes to the expansion of gene families. Examples of tandemly duplicated loci include those encoding NBS-LRR (nucleotide-binding site leucine-rich repeat) disease resistance proteins, pathogen recognition receptor (PRR) proteins, seed storage proteins, the cell wall component extension proteins, F-box proteins, ABC transporters, serine-threonine/tyrosine protein kinases, and ribosomal RNAs. Another example includes the Rhg1 locus which comprises at least three separate genes, and copy number variation (CNV) of this locus is associated with nematode resistance in soybean. Unequal recombination within an array of tademly duplicated genes or a multigene family can provide diversity. For example, unequal recombination can occur as often as once in every few thousand gametes in a single NBS-LRR gene cluster. However, for most gene clusters, unequal recombination occurs on orders of magnitude less frequently. From time to time, new plant pathogen biotypes emerge which require deployment of new resistant paralogs, genic variation, or altered CNV of a disease resistance locus. Currently, breeders are dependent on natural mechanisms of producing genetic diversity that rely on rare random mutation events for production of plants with resistance to the new plant pathogen biotypes.

One tandemly duplicated genomic locus of particular economic value encompasses the family of the NBS-LRR disease resistance genes. Based on the rate of unequal recombination in nature and the capabilities of current technologies to boost homologous recombination in plants, it is estimated that as high as ten percent of all transformants with custom endonucleases (for example, TALENs) would induce new NBS-LRR variants in a single gene cluster. These may encode for new resistance phenotypes against plant pathogens of agronomic importance. Following transformation, R0 plants or their progeny are phenotyped in bioassays to identify new biotic resistance traits.

In one aspect, the technology described in the present disclosure will facilitate the development of a high-throughput and inexpensive trait development platform to accelerate molecular variation in genomic loci, especially genomic loci comprising tandemly arrayed genomic regions. In one embodiment, the trait development is with genomic regions associated with biotic stress resistance. In another embodiment, the trait development is with genomic regions associated with abiotic stress resistance. In another embodiment, the trait development is with genomic regions associated with compositional quality. In another embodiment, the trait development is with genomic regions associated with stature. In another embodiment, the trait development is with genomic regions associated with maturity group. In another embodiment, the trait development is with genomic regions of cis-chromosome exchange. In another embodiment, the trait development is with sister chromosomal arm exchange. In another embodiment, the trait development is with chromosomal arm exchange between non-homologous chromosomes. In another embodiment, the trait development is with chromosomal arm exchange between homoeologous chromosomes. In yet another embodiment, the trait development is with multiple genomic region exchange across chromosomes within a single nucleus.

The compositions and methods described herein relate to the use of site-specific genome modification enzymes to generate novel alleles by stimulating recombination at selected target sequences in genomic loci. In some embodiments, the compositions and methods described herein may be used to generate novel variations in clusters of genes present in the plant or animal genomes. In some embodiments, the gene cluster may comprise an array of tandemly duplicated genes. In some embodiments, the gene cluster may comprise a gene family. In some embodiments, the gene cluster may be a disease resistance locus. In several embodiments, the compositions and methods described herein stimulate cis-recombination of a selected genomic locus from one germplasm line to a second germplasm line. In several embodiments, the compositions and methods described herein stimulate sister chromosome exchange. In several embodiments, the compositions and methods described herein stimulate exchange of genomic loci between homologous chromosomes. In several embodiments, the compositions and methods described herein stimulate exchange of genomic loci between non-homologous chromosomes. In several embodiments, the compositions and methods described herein stimulate exchange of genomic loci between homoeologous chromosomes. In several embodiments, the compositions and methods described herein stimulate unequal recombination between selected target sequences in a genomic locus. In several embodiments, the compositions and methods described herein stimulate multiple genomic exchange events within a single cell.

Several embodiments relate to a method of generating new alleles of a genomic locus, comprising contacting a cell with a site-specific genome modification enzyme that cleaves at least one target sequence in a genomic locus, thereby inducing recombination and selecting at least one progeny comprising a new allele of the genomic locus. In one aspect, the present disclosure provides method of generating new alleles of a genomic locus, comprising contacting a cell with a site-specific genome modification enzyme that cleaves at least one target sequence in an array of genes in a genomic locus, thereby inducing recombination with a second array of genes in the genomic locus and selecting at least one progeny comprising a new allele of the genomic locus. In some embodiments, the first and second arrays of genes are identical. In some embodiments, the first and second arrays of genes are homologous. In some embodiments, the first and second arrays of genes are homoeologous. In some embodiments, the first and second arrays of genes are arrays of tandemly duplicated genes. In other embodiments, the first and second arrays of genes are heterologous. In some embodiments, two new alleles are generated as a result of the asymmetric recombination depending on the recombination site. In some embodiments, the asymmetric recombination results in deletion in at least one of the alleles.

In another aspect, the present disclosure provides a method of inducing recombination or increasing recombination rate between at least two target genomic DNA sequences in a plant cell or a mammal cell, comprising transforming the plant cell or the mammal cell with a site-specific genome modification enzyme that specifically induces a genome modification at least one target sequence inside a DNA region that is conserved between said at least two target DNA sequences.

In some embodiments, the cell is a plant cell. In a further embodiment, the plant cell is obtained from a plant selected from an inbred plant and a hybrid plant. In other embodiments, the cell is a mammalian cell. In a further embodiment, the mammalian cell is a human cell or, for example, a cell from a rodent (e.g., a mouse, rat, hamster, guinea pig), a rabbit, a pig, a non-human primate (e.g., monkey, chimpanzee, macaque) species, or any other mammals.

Several embodiments relate to a method of altering disease resistance of a plant or a mammal, comprising transforming the plant or the mammal with a site-specific genome modification enzyme that specifically cleaves a conserved region in one or more genomic loci. In some embodiments, the present disclosure provides a method of altering disease resistance of a plant, comprising providing a plant cell with a site-specific nuclease that cleaves a conserved region in one or more disease resistance loci and growing the plant from the plant cell.

The present disclosure further provides a method of providing a plant with improved disease resistance, comprising: (a) providing a site-specific genome modification enzyme that cleaves a target sequence in a genomic locus to one or more plant cells; (b) screening the one or more plant cells for a recombination event to identify plant cells comprising a recombinant genomic locus; (c) testing plants obtained from the plant cells identified in step (b) and their progeny for improved disease resistance; and (d) selecting a plant with improved disease resistance. In some embodiments, the targeted genomic locus comprises tandemly duplicated genomic regions. In some embodiments, the targeted genomic locus is comprised of identical arrays of tandemly duplicated sequence. In some embodiments, the targeted genomic locus is comprised of heterologous arrays of tandemly duplicated sequence. In some embodiments, the recombination is in an inbred plant. In some embodiments, the recombination is in a hybrid plant. In some embodiments, the recombination is on the same chromosome. In some embodiments the recombination is between two chromosomes. In some embodiments the chromosomes are homologous. In some embodiments the chromosomes are non-homologous. In some embodiments the chromosomes are homoeologous. In certain embodiments, the targeted genomic locus is associated with disease resistance. In certain embodiments the disease resistance locus includes genes encoding NBS-LRR genes. In certain embodiments the disease resistance locus is associated with resistance to soy cyst nematode, for example, the Rhg1 locus or the Rhg4 locus.

In some embodiments, the recombination of the targeted genomic locus is asymmetric recombination. In some embodiments, the recombination of the targeted genomic locus is symmetric recombination. In some embodiments, the site-specific genome modification enzyme increases the recombination rate at the targeted genomic locus by at least 2 fold, by at least 3 fold, by at least 4 fold, by at least 5 fold by at least 6 fold, by at least 7 fold, by at least 8 fold, by at least 9 fold, or at least 10 fold compared with the naturally occurring recombination rate of the targeted genomic locus.

Site-Specific Genome Modification Enzymes

Several embodiments relate to promoting recombination by providing a site-specific genome modification enzyme. As used herein, the term "site-specific enzyme" refers to any enzyme that can modify a nucleotide sequence in a site-specific manner. In some embodiments, recombination is promoted by providing a single-strand break inducing agent. In some embodiments, recombination is promoted by providing a double-strand break inducing agent. In some embodiments, recombination is promoted by providing a strand separation inducing reagent. In one aspect, the site-specific genome modification enzyme is selected from an endonuclease, a recombinase, a transposase, a helicase or any combination thereof.

In one aspect, the endonuclease is selected from a meganuclease, a zinc-finger nuclease (ZFN), a transcription activator-like effector nucleases (TALEN), an Argonaute (non-limiting examples of Argonaute proteins include *Thermus thermophilus* Argonaute (TtAgo), *Pyrococcus furiosus* Argonaute (PfAgo), *Natronobacterium gregoryi* Argonaute (NgAgo), an RNA-guided nuclease, such as a CRISPR associated nuclease (non-limiting examples of CRISPR associated nucleases include Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, Cpf1, homologs thereof, or modified versions thereof).

Non-limiting examples of recombinase include a tyrosine recombinase attached to a DNA recognition motif provided herein is selected from the group consisting of a Cre recombinase, a Gin recombinase a Flp recombinase, and a Tnp1 recombinase. In an aspect, a Cre recombinase or a Gin recombinase provided herein is tethered to a zinc-finger DNA-binding domain, or a TALE DNA-binding domain, or a Cas9 nuclease. In another aspect, a serine recombinase attached to a DNA recognition motif provided herein is selected from the group consisting of a PhiC31 integrase, an R4 integrase, and a TP-901 integrase. In another aspect, a DNA transposase attached to a DNA binding domain provided herein is selected from the group consisting of a TALE-piggyBac and TALE-Mutator.

Site-specific genome modification enzymes, such as meganucleases, ZFNs, TALENs, Argonaute proteins (non-limiting examples of Argonaute proteins include *Thermus thermophilus* Argonaute (TtAgo), *Pyrococcus furiosus* Argonaute (PfAgo), *Natronobacterium gregoryi* Argonaute (NgAgo), homologs thereof, or modified versions thereof), RNA-guided nucleases (non-limiting examples of RNA-guided nucleases include the CRISPR associated nucleases, such as Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, Cpf1, homologs thereof, or modified versions thereof) and engineered RNA-guided nucleases (RGNs), induce a genome modification such as a double-stranded DNA break (DSB) or single-strand DNA break at the target site of a genomic sequence that is then repaired by the natural processes of homologous recombination (HR) or non-homologous end-joining (NHEJ). Sequence modifications then occur at the cleaved sites, which can include deletions or insertions that result in gene disruption in the case of NHEJ, or integration of exogenous sequences by homologous recombination.

In one aspect of the present disclosure, site-specific genome modification enzymes are selected to induce a genome modification in one, a few, or many individual target sequences in genomic loci. In another aspect of the present disclosure, site-specific genome modification enzymes are selected to induce a genome modification in a region of the genome based upon the detection of tandem duplicated sequences identified through quantitative PCR methods. In yet another aspect of the present disclosure, site-specific genome modification enzymes are selected to induce a genome modification in a region of the genome known to be associated with copy number variation. The genome modifications stimulate DNA repair that can lead to alterations to the genomic loci by mechanisms such as removal of genomic regions, insertion/deletion mutations (indels) of a genomic region, indels within a genic region that disrupt the gene function, gene conversion, unequal recombination between non-parallel copies of tandemly duplicated arrays, recombination between homologous chromosomes, recombination between non-homologous chromosomes, recombination between homoeologous chromosomes, and other types of rearrangements. After exposure to the site-specific genome modification enzyme, the resulting alterations can be identified in various ways including phenotypic screens, sequencing, or molecular methods to identify novel variation. Because of the abundance of tandemly duplicated loci, site-specific genome modification enzymes could be designed that cut numerous copies, and expressed in plants to stimulate many different alterations. Site-specific genome modification enzymes may be expressed in plants such that one or more genome modifications occur within a genomic locus, and resulting progeny screened for molecular changes. Subsequently, the progeny with confirmed molecular rearrangements are screened phenotypically for novel phenotypes, such as improved yield, improved compositional quality, improved resistance to abiotic stress, altered stature, and resistance to specific plant pathogens.

ZFNs

Zinc finger nucleases (ZFNs) are synthetic proteins characterized by an engineered zinc finger DNA-binding domain fused to the cleavage domain of the FokI restriction endonuclease. ZFNs can be designed to cleave almost any long stretch of double-stranded DNA for modification of the zinc finger DNA-binding domain. ZFNs form dimers from monomers composed of a non-specific DNA cleavage domain of FokI endonuclease fused to a zinc finger array engineered to bind a target DNA sequence.

The DNA-binding domain of a ZFN is typically composed of 3-4 zinc-finger arrays. The amino acids at positions −1, +2, +3, and +6 relative to the start of the zinc finger ∞-helix, which contribute to site-specific binding to the target DNA, can be changed and customized to fit specific target sequences. The other amino acids form the consensus backbone to generate ZFNs with different sequence specificities. Rules for selecting target sequences for ZFNs are known in the art.

The FokI nuclease domain requires dimerization to cleave DNA and therefore two ZFNs with their C-terminal regions are needed to bind opposite DNA strands of the cleavage site (separated by 5-7 bp). The ZFN monomer can cute the target site if the two-ZF-binding sites are palindromic. The term ZFN, as used herein, is broad and includes a monomeric ZFN that can cleave double stranded DNA without assistance from another ZFN. The term ZFN is also used to refer to one or both members of a pair of ZFNs that are engineered to work together to cleave DNA at the same site.

Because the DNA-binding specificities of zinc finger domains can in principle be re-engineered using one of various methods, customized ZFNs can theoretically be constructed to target nearly any gene sequence. Publicly available methods for engineering zinc finger domains include Context-dependent Assembly (CoDA), Oligomerized Pool Engineering (OPEN), and Modular Assembly.

TALENs

Transcription activator-like effectors (TALEs) can be engineered to bind practically any DNA sequence. TALE proteins are DNA-binding domains derived from various plant bacterial pathogens of the genus Xanthomonas. The X pathogens secrete TALEs into the host plant cell during infection. The TALE moves to the nucleus, where it recognizes and binds to a specific DNA sequence in the promoter region of a specific DNA sequence in the promoter region of a specific gene in the host genome. TALE has a central DNA-binding domain composed of 13-28 repeat monomers of 33-34 amino acids. The amino acids of each monomer are highly conserved, except for hypervariable amino acid residues at positions 12 and 13. The two variable amino acids are called repeat-variable diresidues (RVDs). The amino acid pairs NI, NG, HD, and NN of RVDs preferentially recognize adenine, thymine, cytosine, and guanine/adenine, respectively, and modulation of RVDs can recognize consecutive DNA bases. This simple relationship between amino acid sequence and DNA recognition has allowed for the engineering of specific DNA binding domains by selecting a combination of repeat segments containing the appropriate RVDs. The transcription activator-like effector (TALE) DNA binding domain can be fused to a functional domain, such as a recombinase, a nuclease, a transposase or a helicase, thus conferring sequence specificity to the functional domain.

Transcription activator-like effector nucleases (TALENs) are artificial restriction enzymes generated by fusing the transcription activator-like effector (TALE) DNA binding domain to a nuclease domain. The term TALEN, as used herein, is broad and includes a monomeric TALEN that can cleave double stranded DNA without assistance from another TALEN. The term TALEN is also used to refer to one or both members of a pair of TALENs that work together to cleave DNA at the same site. In some embodiments, the nuclease is selected from a group consisting of PvuII, MutH, TevI, FokI, AZwI, MlyI, ShfI, SdaI, StsI, CleDORF, Clo051, and Pept071. When FokI is fused to a TALE domain each member of the TALEN pair binds to the DNA sites flanking a target site, the FokI monomers dimerize and cause a DSB at the target site.

Besides the wild-type FokI cleavage domain, variants of the FokI cleavage domain with mutations have been designed to improve cleavage specificity and cleavage activity. The FokI domain functions as a dimer, requiring two constructs with unique DNA binding domains for sites in the target genome with proper orientation and spacing. Both the number of amino acid residues between the TALEN DNA binding domain and the FokI cleavage domain, and the number of bases between the two individual TALEN binding sites are parameters for achieving high levels of activity. PvuII, MutH, and TevI cleavage domains are useful alternatives to FokI and FokI variants for use with TALEs. PvuII functions as a highly specific cleavage domain when coupled to a TALE (see Yank et al. 2013. *PLoS One.* 8: e82539). MutH is capable of introducing strand-specific nicks in DNA (see Gabsalilow et al. 2013. *Nucleic Acids Research.* 41: e83). TevI introduces double-stranded breaks in DNA at targeted sites (see Beurdeley et al., 2013. *Nature Communications.* 4: 1762).

The relationship between amino acid sequence and DNA recognition of the TALE binding domain allows for designable proteins. Software programs such as DNA Works can be used to design TALE constructs. Other methods of designing TALE constructs are known to those of skill in the art. Doyle et al. (2012) TAL Effector-Nucleotide Targeter (TALE-NT) 2.0: tools for TAL effector design and target prediction. *Nucleic Acids Res.* 40(W1):W117-W122; Cermak (2011). Efficient design and assembly of custom TALEN and other TAL effector-based constructs for DNA targeting. *Nucleic Acids Res.* 39(12):e82.

Meganucleases

Meganucleases, which are commonly identified in microbes, are unique enzymes with high activity and long recognition sequences (>14 bp) resulting in site-specific digestion of target DNA. Engineered versions of naturally occurring meganucleases typically have extended DNA recognition sequences (for example, 14-40 bp).

The engineering of meganucleases is more challenging than that of ZFNs and TALENs because the DNA recognition and cleavage functions of meganucleases are intertwined in a single domain. Specialized methods of mutagenesis and high-throughput screening have been used to create novel meganuclease variants that recognize unique sequences and possess improved nuclease activity.

Argonaute

The Argonaute protein family is a DNA-guided endonuclease. The Argonaute isolated from *Natronobacterium gregoryi* has been reported to be suitable for DNA-guided genome editing in human cells (Gao, et al. DNA-guided genome editing using the *Natronobacterium gregoryi* Argonaute. Nature Biotechnology 34:768-773 (2016). Argonaute endonucleases from other species have been identified, (non-limiting examples of Argonaute proteins include *Thermus thermophilus* Argonaute (TtAgo), *Pyrococcus furiosus* Argonaute (PfAgo), *Natronobacterium gregoryi* Argonaute (NgAgo), homologs thereof, or modified versions thereof). Each of these unique Argonaute endonucleases have associated a sequence encoding DNA guide.

CRISPR

The CRISPR (clustered regularly interspaced short palindromic repeats)/Cas (CRISPR-associated) system is an alternative to synthetic proteins whose DNA-binding domains enable them to modify genomic DNA at specific sequences (e.g., ZFN and TALEN). Specificity of the CRISPR/Cas system is based on an RNA-guide that use complementary base pairing to recognize target DNA sequences. In some embodiments, the site-specific genome modification enzyme is a CRISPR/Cas system. In an aspect, a site-specific genome modification enzyme provided herein can comprise any RNA-guided Cas nuclease (non-limiting examples of RNA-guided nucleases include Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, Cpf1, homologs thereof, or modified versions thereof); and, optionally, the guide RNA necessary for targeting the respective nucleases.

CRISPR/Cas systems are part of the adaptive immune system of bacteria and archaea, protecting them against invading nucleic acids such as viruses by cleaving the foreign DNA in a sequence-dependent manner. The immunity is acquired by the integration of short fragments of the invading DNA known as spacers between two adjacent repeats at the proximal end of a CRISPR locus. The CRISPR arrays, including the spacers, are transcribed during subsequent encounters with invasive DNA and are processed into small interfering CRISPR RNAs (crRNAs) approximately 40 nt in length, which combine with the trans-activating CRISPR RNA (tracrRNA) to activate and guide the Cas9 nuclease. This cleaves homologous double-stranded DNA sequences known as protospacers in the invading DNA. A prerequisite for cleavage is the presence of a conserved protospacer-adjacent motif (PAM) downstream of the target DNA, which usually has the sequence 5"-NGG-3" but less frequently NAG. Specificity is provided by the so-called "seed sequence" approximately 12 bases upstream of the PAM, which must match between the RNA and target DNA. Cpf1 acts in a similar manner to Cas9, but Cpf1 does not require a tracrRNA.

Target Genes

The present disclosure can be applied to any genomic locus to generate genetic variation or recombination. In one embodiment, the genomic locus has tandemly duplicated copies of a genomic sequence. In some embodiments, the duplicated copies of genomic sequence are organized in gene clusters, for example as tandem arrays. Examples of such genomic regions include, but are not limited to genomic loci encompassing genes encoding NBS-LRR (nucleotide-binding site leucine-rich repeat) disease resistance proteins, pathogen recognition receptor (PRR) proteins, seed storage proteins, the cell wall component extension proteins, F-box proteins, ABC transporters, immunoglobulins, serine-threonine/tyrosine protein kinases, and ribosomal RNAs. In another aspect, the genomic region may be associated with a locus where copy number variation (CNV) is associated with resistance, such as resistance to soy cyst nematode (for example, Rhg1). In one aspect, the present disclosure is used to target and modify NBS-LRR disease resistance loci in order to generate new NBS-LRR variants that confer improved disease resistance to the plant. In another aspect, the present disclosure is used to target and modify loci with genes encoding immunoglobulins in order to generate new immunoglobulin variants in a mammal cell.

In one aspect, the present disclosure provides a method of generating a new array of tandemly duplicated genes, comprising contacting a cell with a site-specific genome modification enzyme that modifies the genome at least one target sequence in a first array of tandemly duplicated genes, thereby inducing recombination with a second array of tandemly duplicated genes and selecting at least one progeny comprising a new array of tandemly duplicated genes. In some embodiments, the new array of tandemly duplicated genes is produced by asymmetric recombination. In some embodiments, the target sequence is selected based on homology of surrounding sequence to a sequence in the second array of tandemly duplicated genes. In some embodiments, the target sequence and the sequence in the second array of tandemly duplicated genes are at different positions within the array of tandemly duplicated genes.

In some embodiments, the target sequence is in a genic region of the genome. In other embodiments, the target sequence is in an intergenic region of the genome.

In one embodiment, the target sequence for a site-specific genome modification enzyme is within a genic region of the selected genomic locus. In another embodiment, the target sequence for site-specific genome modification enzymes is in an inter-genic region of the selected genomic locus. In some embodiments, the selected genomic locus may comprise a QTL. In some embodiments, the selected genomic locus may comprise two or more tandemly arrayed gene units. In one embodiment the tandemly arrayed gene units are on the same chromosome. In another embodiment, the tandemly arrayed gene units are on different chromosomes. In some embodiments, the tandemly arrayed gene units are on homologous chromosomes. In some embodiments, the tandemly arrayed gene units are on non-homologous chromosomes. In some embodiments, the tandemly arrayed gene units are on homoeologous chromosomes. In another embodiment, the tandemly arrayed gene units are paralogs. In some embodiments, the tandemly arrayed gene units are homologs. In some embodiments, the tandemly arrayed gene units are homoeologs. In another embodiment, the tandemly arrayed gene units are different, more specifically one gene unit is not the same as another gene unit.

To promote asymetric recombination in a selected genomic locus or to promote recombination between to different genomic loci, or to promote recombination between homologous genomic loci, or to promote recombination between paralogous genomic loci, or to promote recombination between homoeologous genomic loci, or to promote recombination between genomic loci on homologous chromosomes, or to promote recombination between genomic loci on non-homologous chromosomes, or to promote recombination between genomic loci on homoeologous chromosomes, the of target sequences for the site-specific genome modification enzymes are selected in a way that the sequence of surrounding genomic regions are highly similar with a sequence in a genomic locus selected for recombination (the selected genomic locus may, for example, be in the same genomic locus as the target sequence, a different genomic locus as the target sequence, a different position with the genomic locus as the target sequence, in a paralogous genomic locus, in a homologous genomic locus, in a homoeologous genomic locus, on a homologous chromosome, on a homoeologous chromosome or on a paralogous chromosome) for at least 50 bp, at least 100 bp, at least 150 bp, at least 200 bp, at least 250 bp, at least 300 bp, at least 350 bp, at least 400 bp, at least 450 bp, at least 500 bp, at least 550 bp, at least 600 bp, at least 650 bp, at least 700 bp, at least 750 bp, at least 800 bp, at least 850 bp, at least 900 bp, at least 950 bp, or at least 1,000 bp. In some embodiments, the a sequence in the selected genomic locus and the sequence of genomic regions surrounding the target sequence may have at least 85% identity, at least 90% identity, at least 91% identity, at least 92% identity, at least 93% identity, at least 94% identity, at least 95% identity, at least 96% identity, at least 97% identity, at least 98% identity, at least 99% identity, or 100% identity, over at least 50 bp, at least 100 bp, at least 150 bp, at least 200 bp, at least 250 bp, at least 300 bp, at least 350 bp, at least 400 bp, at least 450 bp, at least 500 bp, at least 550 bp, at least 600 bp, at least 650 bp, at least 700 bp, at least 750 bp, at least 800 bp, at least 850 bp, at least 900 bp, at least 950 bp, or at least 1,000 bp. In some embodiments, the selected genomic locus may contain a target sequence for the same site-specific genome modification enzyme or a different site-specific genome modification enzyme. This high level of homology in the genomic regions surrounding the target sequence facilitates recombination with the selected genomic locus. In some embodiments, the high level of homology in the genomic regions surrounding the target sequence facilitates asymmetric recombination. In some embodiments, due to polymorphisms within the selected genomic locus, the newly assembled genomic locus promotes the formation of novel copy number variants and/or novel genes. With genomic regions or loci included in the regions of homology, there is a higher probability for an increase in the number of variations created by random matches of homologous genome regions. If the target sequence is present in multiple genome regions, that may lead to development of new variants not only by unequal recombination, but also by deletion. The further apart two target sequences are from each other within the same genomic locus, the chances of deletion decrease, thus giving more opportunity for unequal recombination.

The plant immune system has two distinct, yet highly interconnected pathways to recognize and defend against pathogenic attacks. Some essential surface molecules of pathogenic cells, such as cell wall or flagellum components can be recognized by a variety of transmembrane proteins, mostly kinases. These pathogenic signals are collectively called pathogen-associated molecular patterns (PAMPs), while their receptors are called pathogen recognition receptors (PRRs). The defense mechanism against them is called PAMP-triggered immunity (PTI) that is regarded as the first line of molecular defense in plants. However, some pathogens have sophisticated mechanisms to get around this first line of defense and are able to actively transport effector molecules into the plant cells that are to re-program cell functions to the benefit of the pathogen. These effectors trigger the other major defense pathway, the effector-triggered immunity (ETI). Recognition proteins of ETI constitute a large superfamily with a conserved domain structure: they include a nucleotide-binding site (NBS) and a leucine-rich repeat (LRR) domain. These large, abundant, NBS-LRR proteins are involved in the detection of diverse pathogens, including bacteria, viruses, fungi, nematodes, insects and oomycetes. A major difference between PTI and ETI is that while the PAMP receptors are fairly conserved across large taxa, the NBS-LRR proteins are highly variable even within a species. This exceptional variability is a reflection of an intense arms race between plants and their pathogenic environment that keeps the NBS-LRR genes under strong diversifying selection pressure.

A typical plant species may have a few hundred NBS-LRR genes that are often organized in large clusters of tandem-duplicated gene units. For example, rice carries about 580 NBS-LRR genes. Most of them are distributed into tandem duplicated clusters. There are about 130 such clusters dispersed across the rice genome. The number of genes per cluster varies from two to eighteen, with a higher frequency at the lower end of the continuum. This genomic organization facilitates frequent asymmetric alignments between tandemly arrayed gene copies in meiocytes during meiotic cell division, in somatic cells during mitotic cell division, or in somatic cells during DNA repair. Asymmetric recombination may occur between identical alleles that can give rise to new alleles and allele-combinations of newly recombined gene units within the gene array as illustrated in FIG. 1. The unequal alignment also allows cross-over events between non-parallel gene copies that can give rise to new alleles and allele-combinations. Unequal (asymmetric) recombination as described above is widely viewed as the major mechanism contributing to the exceptional diversity of NBS-LRR loci. In nature, unequal recombination can occur as often as once in every few thousand gametes in a single NBS-LRR gene cluster. However, for most NBS-LRR gene clusters, they occur by orders of magnitude less frequently.

In one aspect, the present disclosure describes methods to accelerate the rate of novel allele development, particularly unequal recombination in NBS-LRR genomic loci using site-specific genome modification enzymes to induce genome modifications in the chromosomal DNA. These genome modifications can give rise to increased rates of asymmetric recombination, symmetric recombination, or production of indels, deletions, or inversions which in turn can give rise to new disease recognition specificities.

In some embodiments, the NBS-LRR disease resistance genes encode proteins that confer resistance to one or more diseases selected from various fungal rusts disease of maize or wheat; *Fusarium* diseases of various species, such as soy, maize and wheat; Goss's wilt, gray leaf spot and rust in maize, Asian soy rust; root-knot nematodes in soy and cotton; reniform nematode in cotton; and stem and leaf rust in wheat. In another embodiment, the NBS-LRR disease resistance genes encode proteins that confer resistance to one or more maize diseases selected from; Anthracnose Stalk Rot (*Colletotrichum graminicola*), *Aspergillus* Ear Rot (*Aspergillus* spp.), Common Rust of Corn (*Puccinia sorghi*), Diplodia Ear Rot (*Diplodia frumenti, D. maydis*), Diplodia Leaf Streak (*Diplodia macrospora*), Diplodia Stalk Rot (*Diplodia frumenti, D. maydis*), Eyespot (*Aureobasidium zeae*), *Fusarium* Ear Rot (*Fusarium verticillioides*), *Fusarium* Stalk Rot (*Fusarium* spp.), Gibberella Ear Rot (*Gibberella moniliformis*), Gibberella Stalk Rot (*Gibberella zeae*), Goss's Wilt and Leaf Blight (*Clavibacter michiganensis*), Gray Leaf Spot (*Cercospora zeae-maydis, C. zeina*), Head Smut (*Sphacelotheca reiliana*), Northern Corn Leaf Blight (*Exserohilum turcicum*), *Pythium* (*Pythium* spp.), Southern Leaf Blight (*Cochliobolus heterostrophus*). In another embodiment, the NBS-LRR disease resistance genes encode proteins that confer resistance to one or more soybean diseases selected from: *Fusarium* root rot (*Fusarium* spp.), Sudden death syndrome (*Fusarium solani* fsp. *glycines*), Asian soybean rust (*Phakopsora pachyrhizi*), *Phytophthora* root and stem rot (*Phytophthora sojae*), Root-knot Nematode (*Meloidogyne* spp.), Soybean Cyst Nematode (*Heterodera glycines*), Reniform nematode (*Rotylenchulus* reniformis), Stem Canker (*Diaporthe phaseolorum*) In another embodiment, the NBS-LRR disease resistance genes encode proteins that confer resistance to one or more cotton diseases selected from: Black root rot (*Thielaviopsis basicola*), Boll rot (*Fusarium* spp., *Colletotrichum* spp., *Phytophthora* spp., *Rhizoctonia solani*), Leaf spot (*Alternaria* spp., *Cercospora gossypina, Rhizoctonia solani*), Powdery mildew (*Oidiopsis gossypii*), Cotton rust (*Puccinia* spp., *Phakopsora gossypii*), Reniform nematode (*Rotylenchulus reniformis*), Root-knot nematode (*Meloidogyne incognita*), Alternaria leaf spot (*Alternaria macrospora*), *Fusarium* wilt (*Fusarium oxysporurn* f. sp. *vasinfectum*), *Verticillium* wilt (*Verticillium dahlia*). In another embodiment, the NBS-LRR disease resistance genes encode proteins that confer resistance to one or more wheat diseases selected from: *Fusarium* head blight (*Fusarium graminearum*), *Fusarium* seedling blight (*Fusarium* spp., *Septoria nodorum*), *Fusarium* Leaf Blotch (*Monographella nivalis*), Leaf Rust (*Puccinia triticina*), Stem Rust (*Puccinia graminis*), Yellow Rust (*Puccinia striiformis*), Powdery Mildew (*Blumeria graminis*), Septoria Tritici Blotch (*Septoria tritici*), Septoria Nodorum Blotch (*Septoria nodorum*), Hessian Fly (*Mayetiola destructor*).

In some embodiments, the NBS-LRR disease resistance gene encode proteins that confer resistance to one or more diseases caused by viruses including, but are not limited pepper mottle virus, pepper mild mottle virus, cucumber mosaic virus, tomato yellow leaf curl virus, cucumber green mottle mosaic virus, potato virus Y, zucchini yellow mosaic virus, turnip mosaic virus, and rice stripe virus.

In some embodiments, a new allele of a disease resistance locus generated as described herein confers improved resistance to one or more diseases selected from various fungal rusts disease of maize or wheat; *Fusarium* diseases of various species, such as soy, maize and wheat; Goss's wilt, gray leaf spot and rust in maize, Asian soy rust; root-knot nematodes in soy and cotton; reniform nematode in cotton; and stem and leaf rust in wheat compared to a parent allele. In some embodiments, a new allele of a disease resistance locus generated as described herein confers improved resistance to one or more maize diseases selected from; Anthracnose Stalk Rot (*Colletotrichum graminicola*), *Aspergillus* Ear Rot (*Aspergillus* spp.), Common Rust of Corn (*Puccinia sorghi*), Diplodia Ear Rot (*Diplodia frumenti, D. maydis*), Diplodia Leaf Streak (*Diplodia macrospora*), Diplodia Stalk Rot (*Diplodia frumenti, D. maydis*), Eyespot (*Aureobasidium zeae*), *Fusarium* Ear Rot (*Fusarium verticillioides*), *Fusarium* Stalk Rot (*Fusarium* spp.), Gibberella Ear Rot (*Gibberella moniliformis*), Gibberella Stalk Rot (*Gibberella zeae*), Goss's Wilt and Leaf Blight (*Clavibacter michiganensis*), Gray Leaf Spot (*Cercospora zeae-maydis, C. zeina*), Head Smut (*Sphacelotheca reiliana*), Northern Corn Leaf Blight (*Exserohilum turcicum*), *Pythium* (*Pythium* spp.), Southern Leaf Blight (*Cochliobolus heterostrophus*) compared to a parent allele. In some embodiments, a new allele of a disease resistance locus generated as described herein confers improved resistance to one or more soybean diseases selected from: *Fusarium* root rot (*Fusarium* spp.), Sudden death syndrome (*Fusarium solani* f. sp. *glycines*), Asian soybean rust (*Phakopsora pachyrhizi*), *Phytophthora* root and stem rot (*Phytophthora sojae*), Root-knot Nematode (*Meloidogyne* spp.), Soybean Cyst Nematode (*Heterodera glycines*), Reniform nematode (*Rotylenchulus reniformis*), Stem Canker (*Diaporthe phaseolorum*) compared to a parent allele. In some embodiments, a new allele of a disease resistance locus generated as described herein confers improved resistance to one or more cotton diseases selected from: Black root rot (*Thielaviopsis basicola*), Boll rot (*Fusarium* spp., *Colletotrichum* spp., *Phytophthora* spp., *Rhizoctonia solani*), Leaf spot (*Alternaria* spp., *Cercospora gossypina, Rhizoctonia solani*), Powdery mildew (*Oidiopsis gossypii*), Cotton rust (*Puccinia* spp., *Phakopsora gossypii*), Reniform nematode (*Rotylenchulus reniformis*), Root-knot nematode (*Meloidogyne incognita*), Alternaria leaf spot (*Alternaria macrospora*), *Fusarium* wilt (*Fusarium oxysporurn* f. sp. *vasinfectum*), *Verticillium* wilt (*Verticillium dahlia*) compared to a parent allele. In some embodiments, a new allele of a disease resistance locus generated as described herein confers improved resistance to one or more wheat diseases selected from: *Fusarium* head blight (*Fusarium graminearum*), *Fusarium* seedling blight (*Fusarium* spp., *Septoria nodorum*), *Fusarium* Leaf Blotch (*Monographella nivalis*), Leaf Rust (*Puccinia triticina*), Stem Rust (*Puccinia graminis*), Yellow Rust (*Puccinia striiformis*), Powdery Mildew (*Blumeria graminis*), Septoria Tritici Blotch (*Septoria tritici*), Septoria Nodorum Blotch (*Septoria nodorum*), Hessian Fly (*Mayetiola destructor*) compared to a parent allele.

In some embodiments, a new allele of a disease resistance locus generated as described herein confers improved resistance to one or more diseases caused by viruses including, but not limited to pepper mottle virus, pepper mild mottle virus, cucumber mosaic virus, tomato yellow leaf curl virus, cucumber green mottle mosaic virus, potato virus Y, zucchini yellow mosaic virus, turnip mosaic virus, and rice stripe virus compared to a parent allele.

In some embodiments, a new allele of a disease resistance locus generated as described herein confers improved resistance to one or more diseases selected from the group consisting of Anthracnose Stalk Rot (*Colletotrichum graminicola*), *Fusarium* Ear Rot (*Fusarium verticillioides*), *Fusarium* Stalk Rot (*Fusarium* spp.), Gibberella Ear Rot (*Gibberella moniliformis*), Gibberella Stalk Rot (*Gibberella* zeae), Goss's Wilt and Leaf Blight (*Clavibacter michiganensis*), Gray Leaf Spot (*Cercospora zeae-maydis, C. zeina*), Northern Corn Leaf Blight (*Exserohilum turcicum*), Sudden death syndrome (*Fusarium solani* f. sp. *glycines*), Asian soybean rust (*Phakopsora pachyrhizi*), *Phytophthora* root and stem rot (*Phytophthora sojae*), Root-knot Nematode (*Meloidogyne* spp.), Soybean Cyst Nematode (*Heterodera glycines*), Reniform nematode (*Rotylenchulus reniformis*), Root-knot nematode (*Meloidogyne incognita*), *Fusarium* wilt (*Fusarium oxysporurn* f. sp. *vasinfectum*), *Verticillium* wilt (*Verticillium dahlia*), *Fusarium* head blight (*Fusarium graminearum*), *Fusarium* seedling blight (*Fusarium* spp., *Septoria nodorum*), *Fusarium* Leaf Blotch (*Monographella nivalis*), and Stem Rust (*Puccinia graminis*) compared to a parent allele.

Additional selected viral or fungal disease inducing organisms can be selected from the list including: *Acremonium*, Alfamovirus, Allexivirus, *Alternaria, Alternaria alternata*, Ampelovirus, *Aspergillus, Aspergillus oryzae, Aspergillus versicolor, Aureobasidium pullulans*, Begomovirus, *Bipolaris, Bipolaris sorokiniana* (*Helminthosporium* blight), *Bremia, Bremia lactucae*, Bymovirus, Capillovirus, Carlavirus, Carmovirus, Caulimovirus, *Cladosporium, Cladosporium herbarum*, Closterovirus, Comovirus, Crinivirus, Cucumovirus, Cytorhabdovirus, Erisphe necator, *Erysiphe*, Fabavirus, Flexiviridae, Foveavirus, Furovirus, Geminivirus, Hordeivirus, Ilarvirus, Luteovirus, Maculavirus, *Magnaporthe grisea* (Gray Leaf Spot), Microdochium, Microdochium *nivale* (Pink Snow Mold), Nepovirus, *Penicillium, Phoma*, Phytoreovirus, Podosphaero *macularis*, Polerovirus, Pomovirus, Potexvirus, Potyvirus, Pyricularia, *Rhizoctonia, Rhizoctonia oryzae* (*Rhizoctonia* Sheath Spot), Sadwavirus, *Sclerotinia, Septoria, Septoria* apiicola, Spatherotheca *fuliginea*, Sphaerotheca, Stachybotrys, Stachybotrys chartarum, Taastrupvirus, Tenuivirus, Tobamovirus, Tobravirus, Tombusvirus, Tospovirus, *Trichophyton, Trichophyton rubrum*, Trichovirus.

In one aspect of the present disclosure, the plant is corn and the NBS-LRR is Rp1. In another aspect, the plant is soy and the NBS-LRR is Rpp1. In another aspect, the plant is soy and the NBS-LRR is Rps1. In yet another aspect, the plant is soy and the tandemly duplicated array is the Rhg1 locus conferring nematode resistance. In yet another aspect, the plant is soy and the disease resistance locus is the Rhg4 locus.

Soybean rust (SBR) is one of the most destructive diseases of soy. Several resistance loci have been identified in various germplasms against SBR, among which Rpp1 located on chromosome 18 is the most effective. The locus has been mapped to a 1 cM interval (Kim et al. 2012 *Theor. Appl. Genet.* 125:1339-1352). Physically, the corresponding chromosome segment harbors, among other genes, a few tandem repeat arrays of NBS-LRR genes, which are the most likely candidates for Rpp1. Unfortunately, new SBR biotypes that are virulent against Rpp1 have recently emerged that requires deployment of new resistant alleles of Rpp1, and those of other resistance loci, into commercial germplasms. Currently, breeders have to rely on natural mechanisms of genetic diversity at these loci, and then selection for new soybean varieties that were developed by these rare random mutations. Alternatively, transgenic approaches unrelated to the system described here may provide soybean events with resistance to SBR. Using the method proposed in this disclosure, the NBS-LRR gene families found in the Rpp1 region would be specifically targeted by site-specific genome modification enzymes to trigger fast development of new allelic configurations. These individual events will be genotyped by the high-throughput molecular method proposed below. Individuals comprising recombinantion events will be phenotypically analyzed for disease resistance.

Rp1 is a major resistance locus against the fungal rust disease of maize. It is located on chromosome 10 and is composed of tandem duplicated NBS-LRR gene units. Their copy number is highly variable among corn genotypes suggesting that meiotic rearrangements, described in this disclosure, occur frequently in the region. As a result, there are several haplotypes of Rp1, each of which is effective against a number of rust biotypes. On the other hand, given the typical high rate of development of new virulent races of pathogens, the current collection of Rp1 haplotypes widely used in commercial corn germplasms will probably be broken down soon by new pathogens. Targeted recombination in the Rp1 locus as described in this disclosure can develop new allele configurations at the pace or even faster than development of new virulent pathogens and thus breeders can keep rust under control by deployment of these new genes into commercial germplasms.

One of the most destructive root and stem rot diseases of soybean in the United States is caused by the Oomycete, pathogen *Phytophthora sojae*. Although soy cultivars exist with resistance to the causative *P. sojae* agent, there are documented shifts in susceptibility and virulence, indicating the need to continue to develop soy with diversity in the resistance loci in order to prevent wide crop loss.

Soy cyst nematode (SCN) is the most economically damaging pathogen of soybeans in the United States (Cook, 2012). The quantitative trait locus, Rhg1, in soybean was localized to chromosome 18 and found to confer resistance to SCN, though the molecular basis of the SCN resistance is unclear. The SCN resistance locus has been narrowed to a 31-kb region comprising three separate genes. It has been reported that that tandem repeats of 3 or 10 copies of the Rhg1 locus correlates to SCN resistance.

In one aspect of the present disclosure, site-specific genome modification enzymes, for example, endonucleases, designed for conserved regions of NBS-LRR gene clusters can significantly increase the recombination rate of the NBS-LRR gene clusters. Recombination frequencies were observed to increase about 1000-fold when double-strand breaks were introduced into plant genomes by custom endonucleases. Proportionally, one can assume that the rate of unequal recombinations can increase at a similar rate upon targeted nuclease activity. Assuming natural rates of 1/10,000 to 1/100,000 of unequal cross-overs, which was observed for multiple gene families, introduction of targeted double-strand breaks into new NBS-LRR alleles can result in a 1000-fold increase in frequency. Specifically, this may result in an increased frequency which occurs one per a few tens of transformants or a few hundreds of transformants. This would vastly expand the genotypic variation in NBS-LRR genes and thus their recognition specificities against various diseases.

In some embodiments, new NBS-LRR alleles can confer resistance against diseases that could not be achieved with conventional breeding methods. In some embodiments, new alleles can broaden the recognition capacities of existing disease resistance loci against wider ranges of disease causing biotypes.

In some embodiments, the target genes are immunoglobulin genes. In some embodiments, the target sequence is on a gene encoding part of a heavy chain (e.g., VH, CH1, CH2, CH3, CH4, the hinge region, or a portion thereof). In other embodiments, the target sequence is on a gene encoding part of a light chain (e.g., VL and CL, or a portion thereof). In some embodiments, the target sequence is on a gene encoding a variable (V) segment, a diversity (D) segment, a joining (J) segment, or a portion or any combination thereof. In some embodiments, the target sequence is in an intergenic region flanking the immunoglobulin genes. Human immunoglobulin genes are known to exist as tandem arrays of gene segments that undergo somatic recombination and hypermutation during B-lymphocyte development. These processes enable the generation of a vast repertoire of immunoglobulin molecules capable of recognizing and eliminating infectious agents.

General Strategies for Generating New Arrays of Tandemly Duplicated Genes Using Site-Specific Genome Modification Enzymes The following illustrates the general strategies for generating new alleles of genomic loci (such as disease resistance loci) using site-specific genome modification enzymes, such as site-specific endonucleases. The NBS-LRR disease resistance loci is a non-limiting example.

In one embodiment, a DNA sequence analysis is first carried out in a plant to identify short sequence motifs that are conserved by two or more targeted genomic loci. In some embodiments, the targeted genomic loci comprise tandem duplicated genes, gene families or gene clusters. In certain embodiments, the plant is selected from corn, soy, cotton, wheat, and canola. In certain embodiments, the targeted genomic locicomprise NBS-LRR genes. In some embodiments, the short sequence motifs are at least 50 bp, at least 100 bp, at least 150 bp, at least 200 bp, at least 250 bp, at least 300 bp, at least 350 bp, at least 400 bp, at least 450 bp, at least 500 bp, at least 600 bp, at least 700 bp, at least 800 bp, at least 900 bp, at least 1000 bp, at least 1100 bp, at least 1200 bp, at least 1300 bp, at least 1400 bp, at least 1500 bp, at least 1600 bp, at least 1700 bp, at least 1800 bp, at least 1900 bp, or at least 2000 bp in length. In some embodiments, the two or more targeted genomic loci share at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% of sequence identity in the identified short sequence motif. Site-specific genome modification enzymes may be designed to target the identified short sequence motif.

In some embodiments, similarity searches and subsequent design of site-specific genome modification enzymes focus on the LRR domains as opposed to the NBS domains of the NBS LRR locus. Since the LRR domains are directly involved in pathogen recognition, new recognition specificities are more likely to be generated if the LRR domains are rearranged internally and not just "swapped" as an intact domain to another NBS domain. Both corn and soy are assumed to carry several tens of conserved LRR signatures. Soybean also contains several islands of disease resistance that could be exploited, thus creating more genetic diversity in regions known to have associations with disease resistance. Cotton and wheat, being true allopolyploid species, have probably even more of such sequences.

Several custom site-specific genome modification enzymes are designed to target the identified short sequence motif. In some embodiments, the site-specific genome modification enzyme is an endonuclease. In some embodiments, the site-specific genome modification enzyme is a recombinase. In some embodiments, the site-specific genome modification enzyme is a transposase. In some embodiments, the site-specific genome modification enzyme is a helicase. In some embodiments, the nuclease is a transposase. In certain embodiments, the endonuclease is selected from a meganuclease, a ZFN, a TALEN, and a CRIPR/Cas system.

In some embodiments site-specific genome modification enzyme are tested for activity prior to transformation using a quantitative platform. One example of a quantitative platform that can be used in the present disclosure includes, but is not limited to, a protoplast-based oligo integration assay followed by digital PCR to detect the oligo integration. Efficacious site-specific genome modification enzyme are then advanced to large-scale stable transformation experiments in plants.

A method of detecting homologous recombination in the protoplast assay is illustrated in FIG. 3. In this method, target sequences, such as restriction nuclease sites, flanking a targeted gene of interest are identified on each of the two parental chromosomes. In some embodiments, the target sequences are the same. In other embodiments, the target sequences are different. In some embodiments, the target sequences are modified by the same site-specific genome modification enzyme. In other embodiments, the target sequences are modified by different site-specific genome modification enzymes. A PCR primer specific for the first parental chromosome and another PCR primer specific for the second parental chromosome are designed as indicated by the arrows. An induced double-stranded break promotes recombination between the two parental chromosomes brings both target sequences and primer binding sites onto the same recombinant chromosome. A TaqMan® probe is designed to specifically recognize the unique junction of the 5'-flanking region of the gene or array on the first chromosome and the 3'-flanking region of the gene or array on the second chromosome. A PCR product is observed only in instances where recombination occurs.

In certain embodiments, the plant is selected from: alfalfa, aneth, apple, apricot, artichoke, arugula, asparagus, avocado, banana, barley, beans, beet, blackberry, blueberry, *brassica*, broccoli, brussel sprouts, cabbage, canola, cantaloupe, carrot, cassava, cauliflower, celery, cherry, cilantro, citrus, clementine, coffee, corn, cotton, cucumber, Douglas fir, eggplant, endive, escarole, *eucalyptus*, fennel, figs, gourd, grape, grapefruit, honey dew, jicama, kiwifruit, lettuce, leeks, lemon, lime, Loblolly pine, mango, maize, melon, mushroom, nut, oat, okra, onion, orange, an ornamental plant, *papaya*, parsley, pea, peach, peanut, pear, pepper, persimmon, pine, pineapple, plantain, plum, pomegranate, poplar, potato, pumpkin, quince, *radiata* pine, radicchio, radish, raspberry, rice, rye, sorghum, Southern pine, soybean, spinach, squash, strawberry, sugarbeet, sugarcane, sunflower, sweet potato, sweetgum, sweet corn, tangerine, tea, tobacco, tomato, turf, a vine, watermelon, wheat, yams, and zucchini plants.

In certain embodiments, the plant is selected from: Alstroemeria (e.g., *Alstoemeria brasiliensis*), aster, azalea (e.g., *Rhododendron* sp.), begonias (e.g., *Begonia* sp.), bellflower, bouganvillea, cactus (e.g., *Cactaceae schlumbergera truncata*), camellia, carnation (e.g., *Dianthus caryophyllus*), chrysanthemums (e.g., *Chrysanthemum* sp.), clematis (e.g., *Clematis* sp.), cockscomb, columbine, cyclamen (e.g., *Cyclamen* sp.), daffodils (e.g., *Narcissus* sp.), false cypress, freesia (e.g., *Freesia refracta*), geraniums, gerberas, gladiolus (e.g., *Gladiolus* sp.), holly, hibiscus (e.g., *Hibiscus rosasanensis*), hydrangea (e.g., *Macrophylla hydrangea*), juniper, lilies (e.g., *Lilium* sp.), magnolia, miniroses, orchids (e.g., members of the family Orchidaceae), petunias (e.g., *Petunia hybrida*), poinsettia (e.g., *Euphorbia pulcherima*), primroses, *rhododendron*, Rosaceae, roses (e.g., *Rosa* sp.), snapdragons (e.g., *Antirrhinum* sp.), shrubs, trees such as forest (broad-leaved trees and evergreens, such as conifers) and tulips (e.g., *Tulipa* sp.).

In some embodiments, the plant is corn, maize, soybean, cotton, wheat, sorghum, or canola. In some embodiments, the plant is an inbred line or hybrid line.

In some embodiments, inbred lines are used for transformation. In other embodiments, hybrid lines are used for transformation. In hybrids, once genome modifications are made, not only unequal, but even regular homologous recombination would create new alleles at genomic loci, for example, heterozygous NBS-LRR gene clusters. Thus, where transformation is not strictly genotype-dependent transformation of hybrids with polymorphic disease resistance genes would produce the maximum frequency of novel variation. In cases where only certain lines are easily transformed, such as maize, near isogenic lines can be created that vary for disease resistance gene clusters but have similar transformation properties. Hybridization of such near isogenic lines will produce transformable lines that are diverse for disease resistance genes.

In some embodiments, the site-specific genome modification enzyme is stably transformed in the plant. In other embodiments, the site-specific genome modification enzyme is transiently transformed in the plant. In some embodiments, the site-specific genome modification enzyme is constitutively expressed in the plant. In other embodiment, the site-specific genome modification enzyme is expressed in the plant under the control of a tissue specific promoter. In other embodiment, the site-specific genome modification enzyme is expressed in the plant under the control of a regulatable promoter known in the art. In some embodiments, the regulatable promoter is a chemically inducible promoter.

In some embodiments, the site-specific genome modification enzyme is expressed in the plant under the control of a heat shock promoter, a tissue specific promoter, or a chemically inducible promoter.

The R0 plants or their selfed and/or backcrossed progenies are then phenotyped in bio-assays, for example, for new disease resistance phenotypes. High-throughput bioassays for resistance against a panel of diseases (e.g. tests on leaf punches or very young seedlings) allow screening through thousands of plants in a fairly short period.

In some embodiments, a leaf disc assay is used for early, high-throughput screening. In some embodiments, leaf discs are collected and placed in a petri dish and inoculated with a pathogen using protocols known in the art. The dish is incubated at appropriate conditions to promote the pathogen growth and visual inspection is used to determine the resistance of the plant disc to damage by the pathogen.

In another embodiment, a leaf inoculation assay is used for high-throughput phenotypic screening, where a leaf is removed from the selected plant and is placed in a petri dish, inoculated with the pathogen, and the dish incubated at appropriate conditions to promote pathogen growth. Visual inspection is used to determine the resistance of the leaf to damage by the pathogen.

In yet another embodiment, individual plants are grown in pots in a greenhouse, inoculated with a pathogen and the phenotypic parameters of the plant growth are monitored. In some embodiments, the plant growth parameters which are tracked are plant height, canopy development, root architecture, fresh weight, stalk strength, and any other plant health parameter. Collection of the plant growth parameter data is done manually or with the systems of an automated greenhouse. In yet another embodiment, individual seeds from plants are evaluated in an agar medium or in a rolled filter assay to evaluate root and hypocoytl elongation (Chon et al, 2000). The agar or rolled paper towel may be imbibed with the test pathogen.

Several imaging systems optimized for field or green house conditions are used for quick and accurate phenotyping of massive amounts of plants in a fraction of the time that manual methods require. Examples include 2D or 3D imaging of whole plants or selected organs (e.g. leaves) using a variety of technologies, such as fluorescence, thermal or infrared cameras in automated or traditional greenhouse, or field settings.

Plants having passed the high-throughput leaf disc assay, leaf inoculation assay, root or hypocotyls elongation assay, and green house assay, are then screened for biotic stress in field trials. For this, seeds from the plants with the identified new locus are planted in the field in complete block design, the plants may or may not be inoculated with a pathogen and plant growth parameters are scored and yield is determined. Plants with resistance to biotic stress are used in a breeding program to introgress the new genotype into elite germplasm.

In some embodiments, constitutive expression of the site-specific genome modification enzyme is used because it may generate a steady level of stochastic alterations. In cases where it is possible to generate many transformants, constitutive expression may be used because each event will experience independent cutting and subsequent stochastic repair outcomes. Therefore, as an alternative to regulating the site-specific genome modification enzyme activity, many independent events can be screened. However, in other cases regulation of the timing of exposure of the genome to the custom nucleases (e.g. TALENs) may maximize the frequency of desired alterations.

Timing of site-specific genome modification enzyme activity should be done in a way that produces and allows recovery of many independent alterations. Correct timing of site-specific genome modification enzyme activity prevents "fixing" of one or a few alterations such as indels early in a cell lineage that then prevent subsequent cutting at that gene thereby minimizing the amount of variation that would be recovered at that location.

Certain tissue or cell types may have different relative levels of the various DNA repair pathways so that activation in a certain tissue or cell type may lead to a higher abundance of desired types of DNA repair and resulting alterations. For example, endonuclease activity at the beginning of meiosis may maximize the likelihood of recombination events between genes in clusters or between diverse clusters from different parents.

In some embodiments, regulation of site-specific genome modification enzyme activity is accomplished by delivery of the site-specific genome modification enzyme as gene cassettes with regulatable promoters. Such promoters will be known by those skilled in the art and include heat shock promoters, tissue specific promoters, chemically inducible promoters, or other environmentally regulated promoters. Additional methods to regulate site-specific genome modification enzyme activity include RNA stability, protein stability, protein localization, ligand inducible protein activation, conditional intein disruption and other methods.

Exposure, and therefore modification, of the genome to the site-specific genome modification enzyme at the beginning of meiosis may be optimal to stimulate meiotic recombination and unequal crossovers. Also, alterations at this stage would produce many independent gametes with different alterations that can be recovered in the next generation. Other options for timing of site-specific genome modification enzyme activity could be early in plant development such that each seed has a chance of producing different alterations or at a time when meristem branching is occurring such as during tassel development in corn.

In some embodiments, the conserved region in the target genomic locus is cleaved at the beginning of meiosis.

Besides unequal homologous recombination, several other types of mutations can also occur once double-strand breaks are created. For example, a mechanism known as synthesis-dependent strand annealing can lead to asymmetric gene conversions that, like asymmetric homologous recombination would also create new functional variants of the genes involved. Another mechanism, non-homologous end joining would create point mutations or short indels that would either cause amino-acid changes around the DSB, or render NBS-LRR genes non-functional by frame-shift mutations or by introducing a stop codon.

If DSBs occur concomitantly in two, tandemly arrayed NBS-LRR genes in the same chromosome, the fragment between the cuts being relatively short, may be eliminated as opposed to re-integrated into the genome. In this case, the chromosomal ends outside of the deleted fragment would be re-ligated by either single-strand annealing or non-homologous end joining. The net outcome of this scenario would be a new NBS-LRR allele and the loss of two or more large gene fragments. Gene conversion can also lead to the replacement of all or part of a gene with sequence from a related gene. The effect of this could be the generation of novel alleles by replacing portions of the coding regions from one gene with another or even the entire coding region such that regulatory portions of the first gene are now controlling a copy of the second gene.

Of these many possible DNA repair mechanisms, the ones creating new functional alleles, for example, unequal homologous recombination, are important for developing new disease resistant specificities. However, mutations rendering NBS-LRR genes non-functional can paradoxically also be very useful in developing new resistance phenotypes against certain types of pathogens. NBS-LRR genes trigger a pathway of programmed cell death (PCD) that kills the infected cells in plants, thus creating local lesions around the sites of pathogenic attack. There is a growing body of evidence that some necrotroph or hemibiotroph pathogens can corrupt this process to the benefit of the pathogen. Necrotroph or hemibiotroph pathogens capable of excreting host-specific toxins can stimulate NBS-LRR genes to an extent that PCD would destroy large segments of plant tissues instead of creating small lesions. These debilitated tissues can in turn be invaded by the pathogens. In all known cases of this type of pathogenesis, functional NBS-LRR genes caused disease susceptibility, while deletion or truncation of the causal NBS-LRR genes resulted in resistance. In some extreme cases, for example, "milo" disease for sorghum, such deletions caused total and irreversible immunity, so the disease ceased to be an economic problem. This mechanism of pathogenesis has been postulated for many important diseases including the sudden death syndrome (SDS) in soy caused by *Fusarium* species.

The present disclosure also provides a plant that is generated by the methods disclosed herein. In some embodiments, the site-specific genome modification enzyme modifies at least two genomic loci. In some embodiments, the site-specific genome modification enzyme modifies at least two of the disease-resistance genes or other tandemly duplicated genes. In one aspect, the plant has at least one recombinant genomic locus or other tandemly genomic locus. In one aspect, the plant has at least one deletion in one of the selected genomic loci. In one aspect, the plant has at least one recombinant disease-resistance gene or other tandemly duplicated gene. In one aspect, the plant has at least one deletion in one of the disease-resistance gene or other tandemly duplicated gene. In another aspect, the plant has improved disease resistance compared with a plant without the recombinant genomic locus or without the deletion in one of the selected genomic loci. In another aspect, the plant has improved disease resistance compared with a plant without a duplication in one of the selected genomic loci. In another aspect, the plant has improved disease resistance compared with a plant without the recombinant disease resistance gene or without the deletion in one of the disease-resistance gene. In one aspect, the plant does not have the site-specific genome modification enzyme in its genome.

In one aspect, the only exogenous gene transformed in the methods described in the present disclosure is the site-specific genome modification enzyme and any necessary selectable markers. Because the transgene will be segregated away after causing alterations to the genome, it will not be part of the final product. Events with multiple copies of the transgene and events with integrations into endogenous genes are normally discarded. However, in some embodiments they can be used as long as the site-specific genome modification enzyme is efficacious. This would allow running a high-throughput transformation and screening platform for rapid identification of new traits, such as, new disease resistance traits. This would also allow for the creation of improved disease resistance traits, wherein the improved disease resistance traits maintain robust resistance in the face of changing pathogen populations or wherein the improved traits provide resistance to a broader spectrum of pathogen races. In addition, it would save the cost of a large portion of event characterization.

The following Examples are presented for the purposes of illustration and should not be construed as limitations.

EXAMPLES

Example 1: Double-Strand Break Target Site Selection

To accelerate recombination in a selected genomic locus, comprehensive sequence analysis is done across a selected genomic locus in one or more selected germplasm lines to identify polymorphisms among both the genic and intergenic regions of the selected genomic locus. The sequencing is done by methods known to one skilled in the art. Non-limiting examples of sequencing methods include BAC clone sequencing, deep sequencing, "shot-gun" sequencing, random sequencing, direct sequencing, next-generation sequencing methods, etc. Bioinformatic tools are then used to identify specific target sequences for site-specific genome modification enzymes, such as a meganuclease, a zinc-finger nuclease, a zinc finger recombinase, an Argonaute, a TALEN, a TALER, an RNA-guided nuclease or CRISPR associated protein.

The target sequences are selected, in part, based on the sequence of the surrounding genomic region, such that the genomic regions surrounding the target sequence have a high level of homology over at least 100 bp with other regions within the selected genomic locus for. This high level of homology in genomic regions surrounding the target sequence facilitates unequal cross-over. Due to polymorphisms within the selected genomic locus, the newly assembled genomic locus promotes the formation of novel variants. Where the regions of homology within the genomic locus include multiple tandemly duplicated genes or multiple member of a multigene family, there is a higher probability for an increase in the number of variations created by random matches of homologous regions. If the target sequence is present in multiple places within the genomic locus, new variants may be formed not only by unequal recombination, but also by deletion. Where two target sequences are located at an increasing distance from each other, the chances of deletion between the target sequences decrease, thus giving more opportunity for unequal recombination.

In addition to using the sequencing data to select genome modification enzyme target sequences within the genomic locus of interest, the sequencing data may further be used to select germplasm to use for transformation. For example, sequencing data may be used to inform the selection of a specific elite germplasm or hybrid germplasm to use for transformation of the site-specific genome modification enzymes. Identification of germplasm for recombination at the selected genomic locus can be accomplished by re-sequenced across a set of individual plants representing varying germplasms and identifying polymorphisms among both the genic and intergenic regions of the selected genomic locus.

Example 2: Protoplast Assay

A protoplast assay is used as a rapid assay for testing nuclease induced recombination within the selected genomic locus. Protoplasts are prepared from leaf mesophyll cells from the selected germplasm of corn plants identified as described in Example 1 and are heterozygous at the selected genomic locus. Similarly, protoplasts are prepared from cotyledon of soy plants from the selected germplasm identified as described in Example 1 and are heterozygous at the selected genomic locus. For the protoplast assay, individual plants which have polymorphism on the flanking sides of the selected genomic locus are chosen to facilitate screening by one or more PCR assay configurations.

Site-specific genome modification enzymes chosen and/or designed for the specific target sequences(s) identified as described in Example 1 are cloned into expression cassettes with plant-specific expression elements. Expression elements include enhancers, promoters, introns, 5'-untranslated leader sequences (5'-UTR), and 3'-untranslated polyadenylation sequences (3'UTR). The expression cassettes are further codon optimized using methods known in the art, for example the expression cassettes for use in corn use monocot codon optimization, and the expression cassettes for use in soybean use dicot codon optimization. The expression cassettes are incorporated into transformation vectors useful for protoplast assays.

The protoplasts are transformed using standard protoplast transformation protocols (for example, electroporation or polyethylene glycol (PEG)) with a transformation vector containing at least one expression cassette encoding a site-specific genome modification enzyme. In one embodiment, the site-specific genome modification enzyme is a CRISPR/Cas9 nuclease with at least one guide RNA targeting one or more of the selected target sequences in the genomic locus. In another embodiment, the site-specific genome modification enzyme is a TALEN. In another embodiment, the site-specific genome modification enzyme is a CRISPR associated protein linked to a recombinase. In another embodiment, the site-specific genome modification enzyme is an Argonaute. In another embodiment, the site-specific genome modification enzyme is a recombinase. In yet another embodiment, the site-specific genome modification enzyme is a meganuclease. In another embodiment, the site-specific genome modification enzyme is a TALE recombinase.

The transformation vector containing the site-specific genome modification enzyme expression cassette is transformed into the protoplasts. The design of the protoplast assay is such that the site-specific genome modification enzyme introduces a genome modification, for example, a double strand break (DSB), single-strand break, a transposase-mediated DNA exchange reaction or a recombinase-mediated DNA exchange reaction, in the selected genomic locus to promote recombination. The transformed protoplasts are harvested 48 to 72 hours later and genomic DNA is extracted. In one PCR assay configuration, restriction nuclease sites are chosen in the flanking regions of the genes in a way that when the fragments, following digestion and self-ligation, will create a unique template for a TaqMan® probe. This unique template is not present by self-ligation of either of the parental chromosomes, but is specific for the template generated by self-ligation of the recombinant chromosome (see FIG. 3). This TaqMan® probe is used for quantification of recombinant chromosomes. This assay does not require polymorphism in the genomic locus of interest between the parents giving rise to the protoplast germplasm, only in their wider genetic environment.

A method of detecting recombination in the protoplast assay is illustrated in FIG. 3. In the figure, restriction nuclease sites are represented by the triangles below the 5'-flank of the "A" paralog, the 3'-flank of the 'a' paralog, and at both the 5'-flank and 3'-flank of the new recombined "A/a" paralog. Following restriction nuclease digestion of the genomic DNA, the genomic fragments are allowed to self-ligate to from circular molecules. When homologous recombination occurs at the locus, then the 5'-flank of the "A" paralog and the 3'-flank of the "a" paralog are joined. These rare recombination events are detected using inverse PCR with drop digital PCR (ddPCR) technology. Specifically, one PCR primer is designed to be unique to the 5'-flank of the "A" paralog, the second PCR primer is designed to be unique to the 3'-flank of the "a" paralog, and the PCR probe is designed to be unique to the junction created by self-ligation of the 5'-flank of the "A" paralog and the 3'-flank of the "a" paralog. A PCR product is observed only in instances where recombination occurs.

Figure 5:
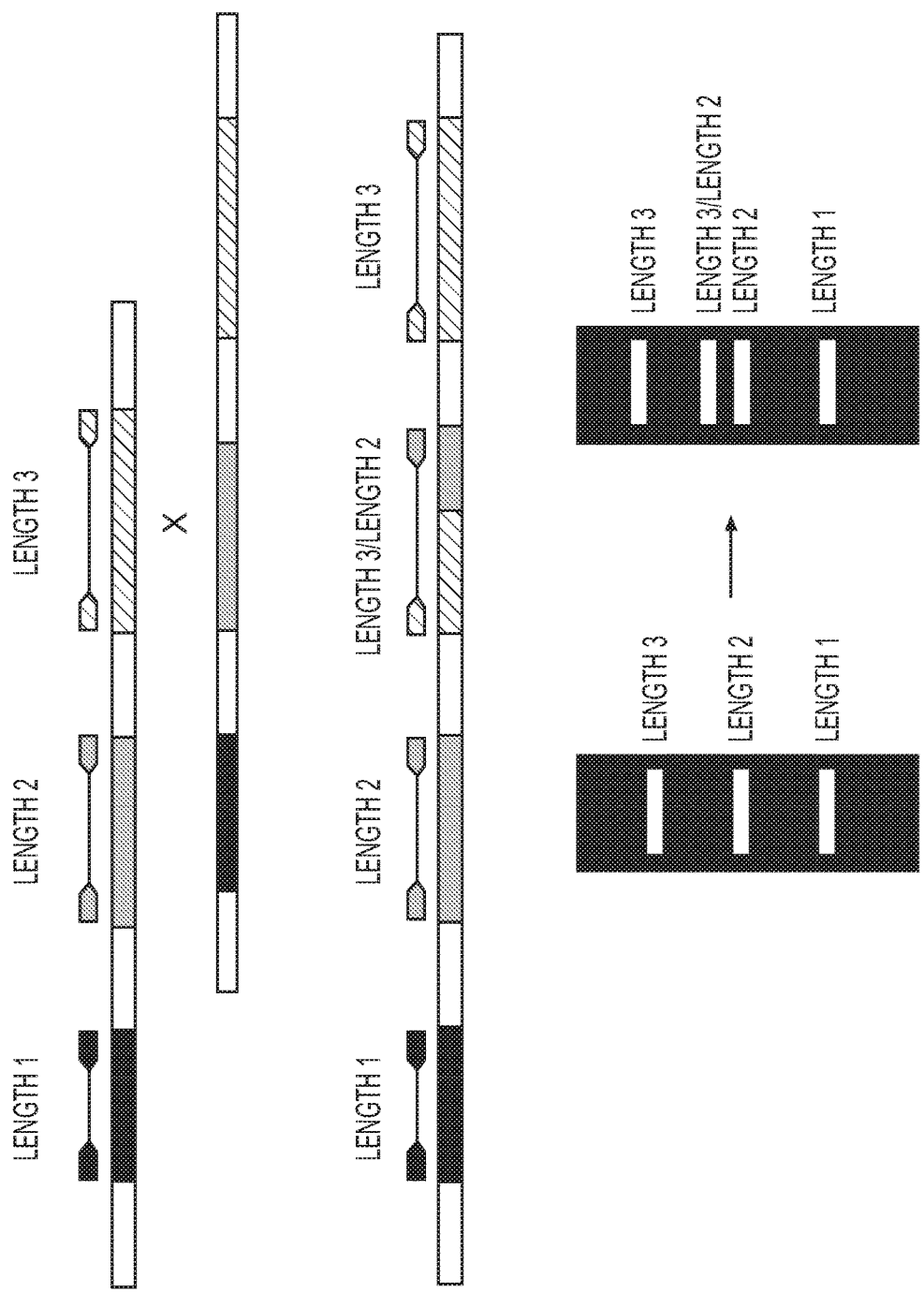
FIG. 5 illustrates an assay strategy used to detect size shifts of PCR amplicons, where the size shift indicates the presence of recombinant paralogs.

Another PCR assay configuration to detect homologous recombination is presented in FIG. 5. In this assay, PCR primer combinations are selected to amplify one or more individual genomic regions within the selected genomic locus such that the individual PCR amplicons differ in length. Upon recombination, PCR amplicons of a new size are generated with the same primer pairs. The PCR amplicons are resolved by either gel electrophoresis or by capillary electrophoresis.

Example 3: Protoplast Assay to Detect Recombination in Soybean Rps1 Locus

Figure 6:
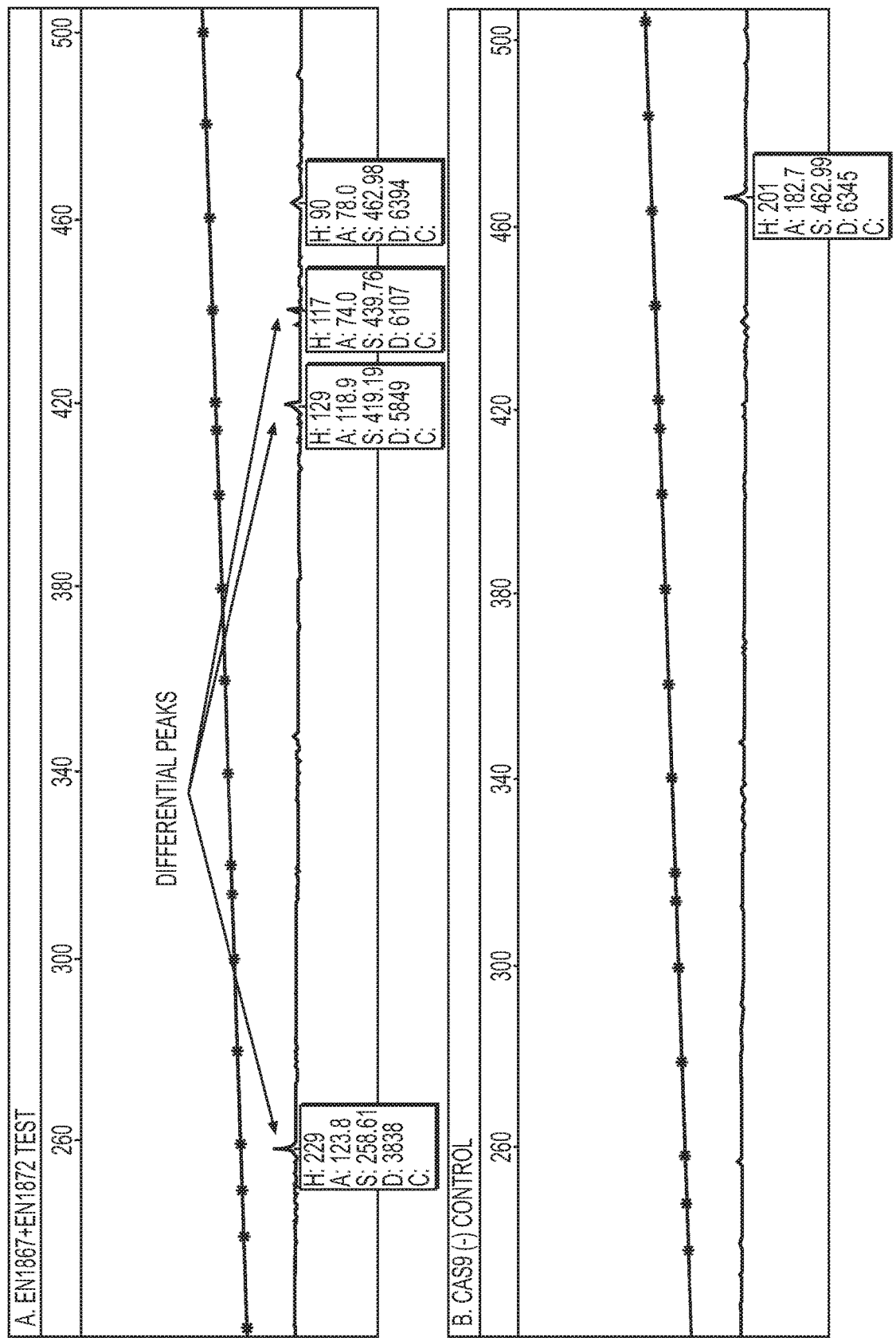
FIG. 6 shows a representative electrophoretic profile from capillary electrophoresis analysis of PCR amplicons using PCR primers EN1867 (SEQ ID NO:43) and EN1872 (SEQ ID NO:47), amplifying TS3 of the soybean Rps1 locus. Panel A shows three peaks corresponding to PCR amplicons of new length (marked as differential peaks with arrows) and a peak corresponding to a PCR amplicon of the size obtained with the control sample. Panel B shows a peak corresponding to the PCR amplicon generated with the control sample (Cas9 (−) Control).
Figure 7:
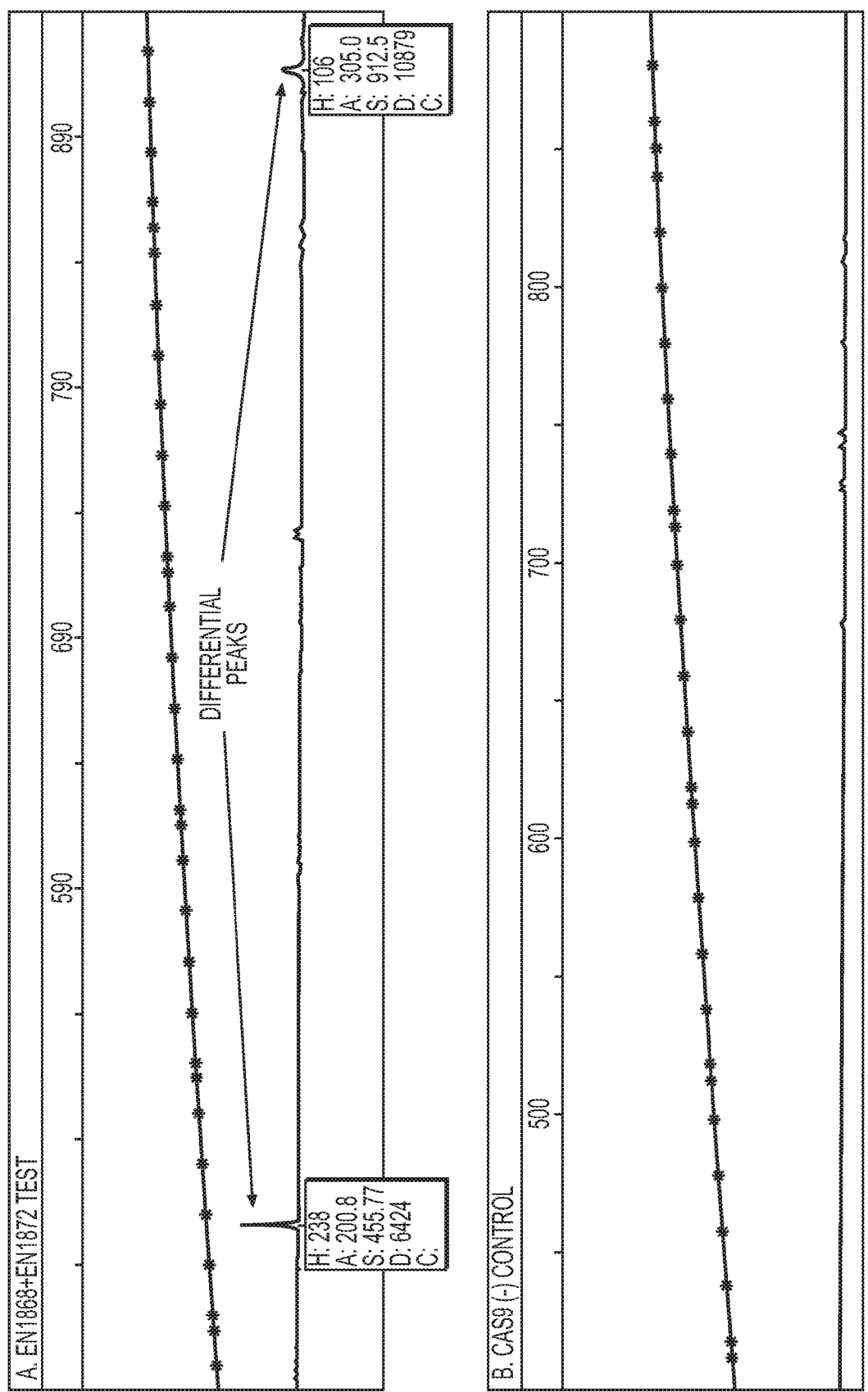
FIG. 7 shows a representative electrophoretic profile from capillary electrophoresis analysis of PCR amplicons using PCR primers EN1868 (SEQ ID NO:44) and EN1872 (SEQ ID NO:47), amplifying TS3 of the soybean Rps1 locus. Panel A shows two peaks corresponding to PCR amplicons of new length (marked as differential peaks with arrows). Panel B shows that no PCR amplicon was generated with this PCR primer pair with the control sample (Cas9 (−) Control).
Figure 8:
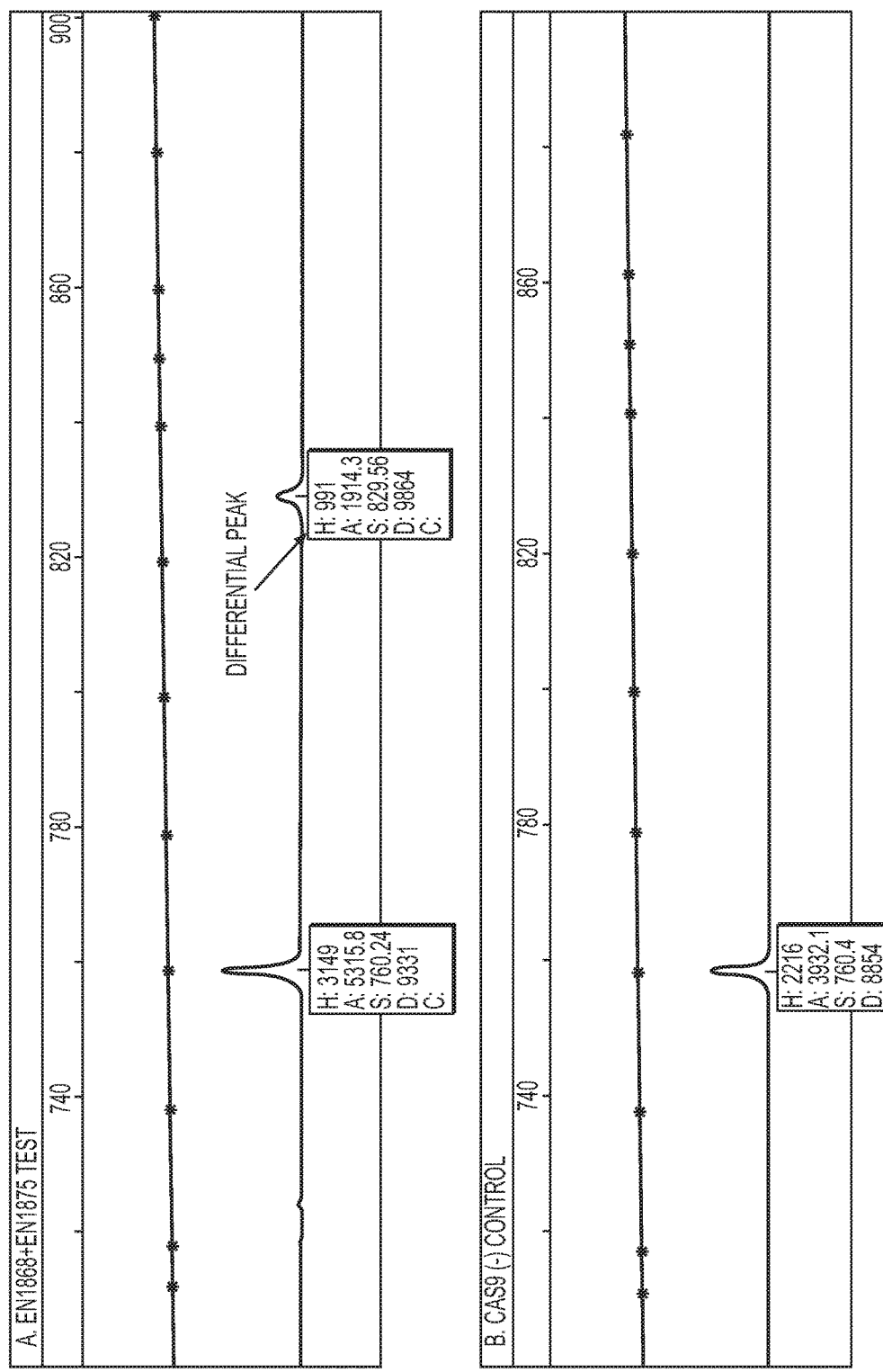
FIG. 8 shows a representative electrophoretic profile from capillary electrophoresis analysis of PCR amplicons using PCR primers EN1868 (SEQ ID NO:44) and EN1875 (SEQ ID NO:50), amplifying TS3 of the soybean Rps1 locus. Panel A shows one peak corresponding to a PCR amplicon of new length (marked as differential peak with arrow) and a peak corresponding to a PCR amplicon of the size obtained with the control sample. Panel B shows a peak corresponding to the PCR amplicon generated with the control sample (Cas9 (−) Control).

Cotyledon protoplasts of the soy germplasm A3555 were co-transformed with a vector containing an expression cassette for a soy codon-optimized Cas9 (SEQ ID NO:77) and one or two single guide RNA (sgRNA) constructs driven by a soy U6i (SEQ ID NO:80) or U6c (SEQ ID NO:81) promoter. The sgRNA were designed to one of the 6 identified Rps1 target sequences (TS) represented by SEQ ID NO:21 through SEQ ID NO:32. For each of the six Rps1 target sequences, there were two variants differing by 1 nucleotide (see Table 4). A *Renilla* luciferase construct was used as a transformation control. Following a two-day incubation period, total genomic DNA was isolated from the transformed protoplasts. Recombinant Rps1 paralogs were identified using a PCR assay as described in Example 1 that utilizes sequence length-polymorphism among individual Rps1 paralogs. While Rps1 paralogs are fairly conserved, there is significant length polymorphism among them due to multiple short indels distributed along their lengths. Therefore, PCR amplicons between two conserved primers will vary in size over a broad range. For example, the PCR amplicons generated between two highly conserved regions in 21 separate Rps1 paralogs of the soybean Williams 82 (W82) reference soy genome each have a unique PCR amplicon length. To assay the DNA extracted from the soybean protoplasts of this Example, 35 PCR primers (SEQ ID NO:33-67) were used in PCR amplification of the DNA extracted from the transformed soy protoplasts. These PCR primers represented 163 different primer pairs, with 73 unique primer combinations (Unique Primer Combo) as detailed in Table 1. Using capillary electrophoresis of the PCR reactions, 24 novel amplicons were identified. Examples of sequence length variation results are illustrated by the electrophoretic profiles from capillary electrophoresis analysis of PCR amplicons presented in FIGS. 6, 7, and 8. The sequence length variants are expected to represent recombinant Rps1 loci. Novel Rps1 variants are identified by sequence analysis of the PCR amplicons.

TABLE 1

Rps1 protoplast assay primer matrix.

| PCR Mix # | Primer 1 | Primer 1 SEQ ID NO | Primer 2 | Primer 1 SEQ ID NO | Target Sequence | Unique Primer Combo |
|---|---|---|---|---|---|---|
| 1 | EN1890 | 61 | EN1858 | 35 | TS1 | 1 |
| 2 | EN1892 | 62 | EN1858 | 35 | TS1 | 2 |
| 3 | EN1893 | 63 | EN1858 | 35 | TS1 | 3 |
| 4 | EN1894 | 64 | EN1858 | 35 | TS1 | 4 |
| 5 | EN1896 | 65 | EN1858 | 35 | TS1 | 5 |
| 6 | EN1897 | 66 | EN1858 | 35 | TS1 | 6 |
| 7 | EN1890 | 61 | EN1859 | 36 | TS1 | 7 |
| 8 | EN1892 | 62 | EN1859 | 36 | TS1 | 8 |
| 9 | EN1893 | 63 | EN1859 | 36 | TS1 | 9 |
| 10 | EN1894 | 64 | EN1859 | 36 | TS1 | 10 |
| 11 | EN1896 | 65 | EN1859 | 36 | TS1 | 11 |
| 12 | EN1897 | 66 | EN1859 | 36 | TS1 | 12 |
| 13 | EN1898 | 67 | EN1859 | 36 | TS1 | 13 |
| 14 | EN1890 | 61 | EN1860 | 37 | TS1 | 14 |
| 15 | EN1892 | 62 | EN1860 | 37 | TS1 | 15 |
| 16 | EN1893 | 63 | EN1860 | 37 | TS1 | 16 |
| 17 | EN1894 | 64 | EN1860 | 37 | TS1 | 17 |
| 18 | EN1896 | 65 | EN1860 | 37 | TS1 | 18 |
| 19 | EN1897 | 66 | EN1860 | 37 | TS1 | 19 |
| 20 | EN1898 | 67 | EN1860 | 37 | TS1 | 20 |
| 21 | EN1856 | 33 | EN1864 | 41 | TS2 | 21 |
| 22 | EN1857 | 34 | EN1864 | 41 | TS2 | 22 |
| 23 | EN1861 | 38 | EN1864 | 41 | TS2 | 23 |
| 24 | EN1862 | 39 | EN1864 | 41 | TS2 | 24 |
| 25 | EN1863 | 40 | EN1864 | 41 | TS2 | 25 |
| 26 | EN1866 | 42 | EN1871 | 46 | TS3 | 29 |
| 27 | EN1866 | 42 | EN1872 | 47 | TS3 | 30 |
| 28 | EN1866 | 42 | EN1873 | 48 | TS3 | 31 |
| 29 | EN1866 | 42 | EN1874 | 49 | TS3 | 32 |
| 30 | EN1866 | 42 | EN1875 | 50 | TS3 | 33 |
| 31 | EN1866 | 42 | EN1876 | 51 | TS3 | 34 |
| 32 | EN1866 | 42 | EN1877 | 52 | TS3 | 35 |
| 33 | EN1866 | 42 | EN1878 | 53 | TS3 | 36 |
| 34 | EN1866 | 42 | EN1879 | 54 | TS3 | 37 |
| 35 | EN1866 | 42 | EN1880 | 55 | TS3 | 38 |
| 36 | EN1866 | 42 | EN1881 | 56 | TS3 | 39 |
| 37 | EN1866 | 42 | EN1882 | 57 | TS3 | 40 |
| 38 | EN1866 | 42 | EN1883 | 58 | TS3 | 41 |
| 39 | EN1866 | 42 | EN1884 | 59 | TS3 | 42 |
| 40 | EN1866 | 42 | EN1885 | 60 | TS3 | 43 |
| 41 | EN1867 | 43 | EN1871 | 46 | TS3 | 44 |
| 42 | EN1867 | 43 | EN1872 | 47 | TS3 | 45 |
| 43 | EN1867 | 43 | EN1873 | 48 | TS3 | 46 |
| 44 | EN1867 | 43 | EN1874 | 49 | TS3 | 47 |
| 45 | EN1867 | 43 | EN1875 | 50 | TS3 | 48 |
| 46 | EN1867 | 43 | EN1876 | 51 | TS3 | 49 |
| 47 | EN1867 | 43 | EN1877 | 52 | TS3 | 50 |
| 48 | EN1867 | 43 | EN1878 | 53 | TS3 | 51 |
| 49 | EN1867 | 43 | EN1879 | 54 | TS3 | 52 |
| 50 | EN1867 | 43 | EN1880 | 55 | TS3 | 53 |
| 51 | EN1867 | 43 | EN1881 | 56 | TS3 | 54 |
| 52 | EN1867 | 43 | EN1882 | 57 | TS3 | 55 |
| 53 | EN1867 | 43 | EN1883 | 58 | TS3 | 56 |
| 54 | EN1867 | 43 | EN1884 | 59 | TS3 | 57 |
| 55 | EN1867 | 43 | EN1885 | 60 | TS3 | 58 |

TABLE 1-continued

Rps1 protoplast assay primer matrix.

| PCR Mix # | Primer 1 | Primer 1 SEQ ID NO | Primer 2 | Primer 1 SEQ ID NO | Target Sequence | Unique Primer Combo |
|---|---|---|---|---|---|---|
| 56 | EN1868 | 44 | EN1871 | 46 | TS3 | 59 |
| 57 | EN1868 | 44 | EN1872 | 47 | TS3 | 60 |
| 58 | EN1868 | 44 | EN1873 | 48 | TS3 | 61 |
| 59 | EN1868 | 44 | EN1874 | 49 | TS3 | 62 |
| 60 | EN1868 | 44 | EN1875 | 50 | TS3 | 63 |
| 61 | EN1868 | 44 | EN1876 | 51 | TS3 | 64 |
| 62 | EN1868 | 44 | EN1877 | 52 | TS3 | 65 |
| 63 | EN1868 | 44 | EN1878 | 53 | TS3 | 66 |
| 64 | EN1868 | 44 | EN1879 | 54 | TS3 | 67 |
| 65 | EN1868 | 44 | EN1880 | 55 | TS3 | 68 |
| 66 | EN1868 | 44 | EN1881 | 56 | TS3 | 69 |
| 67 | EN1868 | 44 | EN1882 | 57 | TS3 | 70 |
| 68 | EN1868 | 44 | EN1883 | 58 | TS3 | 71 |
| 69 | EN1868 | 44 | EN1884 | 59 | TS3 | 72 |
| 70 | EN1868 | 44 | EN1885 | 60 | TS3 | 72 |
| 71 | EN1866 | 42 | EN1871 | 46 | TS4 | 29 |
| 72 | EN1866 | 42 | EN1872 | 47 | TS4 | 30 |
| 73 | EN1866 | 42 | EN1873 | 48 | TS4 | 31 |
| 74 | EN1866 | 42 | EN1874 | 49 | TS4 | 32 |
| 75 | EN1866 | 42 | EN1875 | 50 | TS4 | 33 |
| 76 | EN1866 | 42 | EN1876 | 51 | TS4 | 34 |
| 77 | EN1866 | 42 | EN1877 | 52 | TS4 | 35 |
| 78 | EN1866 | 42 | EN1878 | 53 | TS4 | 36 |
| 79 | EN1866 | 42 | EN1879 | 54 | TS4 | 37 |
| 80 | EN1866 | 42 | EN1880 | 55 | TS4 | 38 |
| 81 | EN1866 | 42 | EN1881 | 56 | TS4 | 39 |
| 82 | EN1866 | 42 | EN1882 | 57 | TS4 | 40 |
| 83 | EN1866 | 42 | EN1883 | 58 | TS4 | 41 |
| 84 | EN1866 | 42 | EN1884 | 59 | TS4 | 42 |
| 85 | EN1866 | 42 | EN1885 | 60 | TS4 | 43 |
| 86 | EN1867 | 43 | EN1871 | 46 | TS4 | 44 |
| 87 | EN1867 | 43 | EN1872 | 47 | TS4 | 45 |
| 88 | EN1867 | 43 | EN1873 | 48 | TS4 | 46 |
| 89 | EN1867 | 43 | EN1874 | 49 | TS4 | 47 |
| 90 | EN1867 | 43 | EN1875 | 50 | TS4 | 48 |
| 91 | EN1867 | 43 | EN1876 | 51 | TS4 | 49 |
| 92 | EN1867 | 43 | EN1877 | 52 | TS4 | 50 |
| 93 | EN1867 | 43 | EN1878 | 53 | TS4 | 51 |
| 94 | EN1867 | 43 | EN1879 | 54 | TS4 | 52 |
| 95 | EN1867 | 43 | EN1880 | 55 | TS4 | 53 |
| 96 | EN1867 | 43 | EN1881 | 56 | TS4 | 54 |
| 97 | EN1867 | 43 | EN1882 | 57 | TS4 | 55 |
| 98 | EN1867 | 43 | EN1883 | 58 | TS4 | 56 |
| 99 | EN1867 | 43 | EN1884 | 59 | TS4 | 57 |
| 100 | EN1867 | 43 | EN1885 | 60 | TS4 | 58 |
| 101 | EN1868 | 44 | EN1871 | 46 | TS4 | 59 |
| 102 | EN1868 | 44 | EN1872 | 47 | TS4 | 60 |
| 103 | EN1868 | 44 | EN1873 | 48 | TS4 | 61 |
| 104 | EN1868 | 44 | EN1874 | 49 | TS4 | 62 |
| 105 | EN1868 | 44 | EN1875 | 50 | TS4 | 63 |
| 106 | EN1868 | 44 | EN1876 | 51 | TS4 | 64 |
| 107 | EN1868 | 44 | EN1877 | 52 | TS4 | 65 |
| 108 | EN1868 | 44 | EN1878 | 53 | TS4 | 66 |
| 109 | EN1868 | 44 | EN1879 | 54 | TS4 | 67 |
| 110 | EN1868 | 44 | EN1880 | 55 | TS4 | 68 |
| 111 | EN1868 | 44 | EN1881 | 56 | TS4 | 69 |
| 112 | EN1868 | 44 | EN1882 | 57 | TS4 | 70 |
| 113 | EN1868 | 44 | EN1883 | 58 | TS4 | 71 |
| 114 | EN1868 | 44 | EN1884 | 59 | TS4 | 72 |
| 115 | EN1868 | 44 | EN1885 | 60 | TS4 | 73 |
| 116 | EN1866 | 42 | EN1871 | 46 | TS5 | 29 |
| 117 | EN1866 | 42 | EN1872 | 47 | TS5 | 30 |
| 118 | EN1866 | 42 | EN1873 | 48 | TS5 | 31 |
| 119 | EN1866 | 42 | EN1874 | 49 | TS5 | 32 |
| 120 | EN1866 | 42 | EN1875 | 50 | TS5 | 33 |
| 121 | EN1866 | 42 | EN1876 | 51 | TS5 | 34 |
| 122 | EN1866 | 42 | EN1877 | 52 | TS5 | 35 |
| 123 | EN1866 | 42 | EN1878 | 53 | TS5 | 36 |
| 124 | EN1866 | 42 | EN1879 | 54 | TS5 | 37 |
| 125 | EN1866 | 42 | EN1880 | 55 | TS5 | 38 |
| 126 | EN1866 | 42 | EN1881 | 56 | TS5 | 39 |
| 127 | EN1866 | 42 | EN1882 | 57 | TS5 | 40 |
| 128 | EN1866 | 42 | EN1883 | 58 | TS5 | 41 |
| 129 | EN1866 | 42 | EN1884 | 59 | TS5 | 42 |

TABLE 1-continued

Rps1 protoplast assay primer matrix.

| PCR Mix # | Primer 1 | Primer 1 SEQ ID NO | Primer 2 | Primer 1 SEQ ID NO | Target Sequence | Unique Primer Combo |
|---|---|---|---|---|---|---|
| 130 | EN1866 | 42 | EN1885 | 60 | TS5 | 43 |
| 131 | EN1867 | 43 | EN1871 | 46 | TS5 | 44 |
| 132 | EN1867 | 43 | EN1872 | 47 | TS5 | 45 |
| 133 | EN1867 | 43 | EN1873 | 48 | TS5 | 46 |
| 134 | EN1867 | 43 | EN1874 | 49 | TS5 | 47 |
| 135 | EN1867 | 43 | EN1875 | 50 | TS5 | 48 |
| 136 | EN1867 | 43 | EN1876 | 51 | TS5 | 49 |
| 137 | EN1867 | 43 | EN1877 | 52 | TS5 | 50 |
| 138 | EN1867 | 43 | EN1878 | 53 | TS5 | 51 |
| 139 | EN1867 | 43 | EN1879 | 54 | TS5 | 52 |
| 140 | EN1867 | 43 | EN1880 | 55 | TS5 | 53 |
| 141 | EN1867 | 43 | EN1881 | 56 | TS5 | 54 |
| 142 | EN1867 | 43 | EN1882 | 57 | TS5 | 55 |
| 143 | EN1867 | 43 | EN1883 | 58 | TS5 | 56 |
| 144 | EN1867 | 43 | EN1884 | 59 | TS5 | 57 |
| 145 | EN1867 | 43 | EN1885 | 60 | TS5 | 58 |
| 146 | EN1868 | 44 | EN1871 | 46 | TS5 | 59 |
| 147 | EN1868 | 44 | EN1872 | 47 | TS5 | 60 |
| 148 | EN1868 | 44 | EN1873 | 48 | TS5 | 61 |
| 149 | EN1868 | 44 | EN1874 | 49 | TS5 | 62 |
| 150 | EN1868 | 44 | EN1875 | 50 | TS5 | 63 |
| 151 | EN1868 | 44 | EN1876 | 51 | TS5 | 64 |
| 152 | EN1868 | 44 | EN1877 | 52 | TS5 | 65 |
| 153 | EN1868 | 44 | EN1878 | 53 | TS5 | 66 |
| 154 | EN1868 | 44 | EN1879 | 54 | TS5 | 67 |
| 155 | EN1868 | 44 | EN1880 | 55 | TS5 | 68 |
| 156 | EN1868 | 44 | EN1881 | 56 | TS5 | 69 |
| 157 | EN1868 | 44 | EN1882 | 57 | TS5 | 70 |
| 158 | EN1868 | 44 | EN1883 | 58 | TS5 | 71 |
| 159 | EN1868 | 44 | EN1884 | 59 | TS5 | 72 |
| 160 | EN1868 | 44 | EN1885 | 60 | TS5 | 73 |
| 161 | EN1861 | 38 | EN1869 | 45 | TS6 | 26 |
| 162 | EN1862 | 39 | EN1869 | 45 | TS6 | 27 |
| 163 | EN1863 | 40 | EN1869 | 45 | TS6 | 28 |

Example 4: Recombination at the Target Locus in Planta

To achieve recombination in planta, site-specific genome modification enzymes designed for specific target sequence(s) identified in the protoplast assay are cloned into transformation vectors containing expression cassettes with plant-specific expression elements and codon optimization for plant expression, as described in Example 2. The expression cassettes are incorporated into *Agrobacterium* transformation vectors. Plant transformation methods using *Agrobacterium* are known in the art. Alternatively, transformation vectors are introduced to the plant cells by biolistic transformation methods, which are also well known in the art. Following transformation, stable plants are selected using methods well known in the art.

Expression cassettes containing a tissue-specific promoter and/or a chemically inducible promoter, such as an alcohol inducible promoter, may be used to regulate expression of the site-specific genome modification enzyme. Where a chemically inducible promoter is used, expression of the site-specific genome modification enzyme can be induced at a desired growth stage after application of the chemical inducer. Optionally, expression cassettes with both a tissue-specific and chemically inducible promoter may be used so that expression of the site-specific genome modification enzyme occurs only in the desired tissue (for example, pollen) at the time and growth stage of application of the chemical inducer.

In planta targeting of selected genomic loci may be conducted such that the site-specific genome modification enzyme induces a genome modification, for example, a double strand break (DSB), a single-strand break, a transposase-mediated DNA exchange reaction or a recombinase-mediated DNA exchange reaction, within at least one target sequence within the genomic locus of interest. Introduction of a genome modification will increase the rate of recombination within the genomic locus of interest. Recombination events may be symmetric or unequal and may occur between conserved or divergent regions within the genomic locus of interest. Plant cells used for transformation are obtained from plants identified as described in Example 1. Further, the germplasm of the plant selected for transformation may be based, at least in part, on advantageous regeneration properties. Plant cells selected for transformation may be either homozygous or heterozygous at the genomic locus of interest. For example, corn plants comprising parental genomes which are non-identical at the Rp1 locus or soybean plants comprising parental genomes which are non-identical at the Rpp1 locus may be selected. Within a genomic locus of interest, whether the genomic locus of interest is homozygous or heterozygous, target sequences for site-specific genome modification enzymes may be selected to induce recombination between non-identical regions of the genomic locus of interest.

Figure 4:
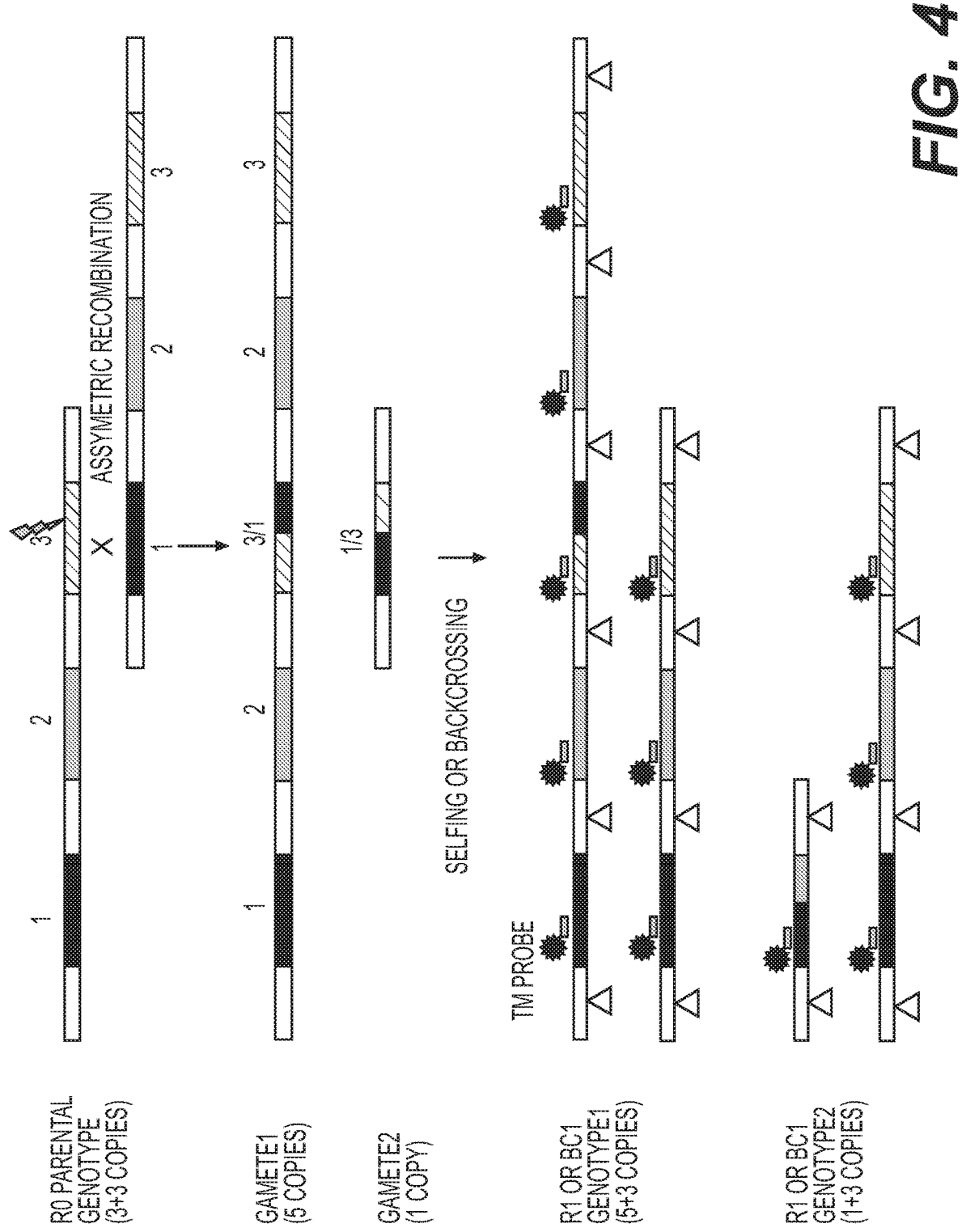
FIG. 4 illustrates high-throughput genetic screening for transformants that underwent induced asymmetric recombination in homologous gene arrays. In this example, gene arrays containing 3 genes are present in each of the parental genomes. The assay identifies copy number variations in the R1 or BC1 generation following the induction of a double-stranded break (indicated by the lightening bolt) in target sequence located in a gene array. Genomic DNA isolated from R1 or BC1 plants is cleaved by a restriction endonuclease (triangle) that physically separates the genes. A TaqMan® probe designed to a conserved region of each gene in the array is used to detect new copy number variants.

Following transformation and selection of stable plants, leaf samples are obtained for each plant, genomic DNA is extracted, and a high-throughput assay using the droplet Digital™ PCR (ddPCR) technology is performed to identify individual plants with recombination at the selected genomic locus. The design of the PCR assay is illustrated in FIG. 4.

Unequal recombination events are identified by detection of altered gene copy numbers in the genomic locus. In the example illustrated in FIG. 4, each parental genotype contributes three paralogs, so the cells selected for transformation have six paralogs (see top "R0 Parental" in FIG. 4). In events where recombination occurs, one possible example is illustrated where, following unequal recombination, one gamete has five paralogs in the genomic locus and one gamete has one paralog in the genomic locus (see "gamete 1" and "gamete 2" in FIG. 4). Following backcrossing, the genotype of the progeny from 'gamete 1' will have eight paralogs at the genomic locus; five paralogs on the allele from gamete 1 and three paralogs from the wild-type parent allele. Similarly, the genotype of the progeny from back-crossing 'gamete 2' will have four paralogs at the genomic locus; 1 paralog on the allele from gamete 1 and three paralogs from the wild-type parent allele. Because the PCR probe is designed to a common region in all paralogs within the locus, the ddPCR assay result reflects the number of paralogs. The variation in number paralogs from the parental paralog number is used to detect recombination events at the locus. For example, if the parental alleles each have three paralogs in the genomic locus (as illustrated in FIG. 4), then upon homologous asymmetric recombination, resulting gametes may have five paralogs, four paralogs, three paralogs, two paralogs, or one paralog at the locus. Upon either back-crossing or selfing, these gametes will result in plants with altered copy number, which is detected by the ddPCR technology.

Example 5: Phenotypic Screening of Plants with Recombination to Identify Novel Disease Resistance Trait The plants identified in Example 3 with molecularly confirmed recombination within the selected genomic locus are used for phenotypic screening to identify the plants with new or enhanced tolerance to biotic stress.

For early, high-throughput screening, a leaf disc assay is used. In these assays, leaf discs are collected and placed in a petri dish and inoculated with a pathogen using protocols known in the art. The dish is incubated at appropriate conditions to promote the pathogen growth and visual inspection is used to determine the resistance of the plant disc to damage by the pathogen.

Another high-throughput screening assay to identify plants with enhanced tolerance to a pathogen is the leaf inoculation assay wherein a leaf is removed from the selected plant and is placed in a petri dish, inoculated with the pathogen, and the dish incubated at appropriate conditions to promote pathogen growth. Visual inspection is used to determine the resistance of the leaf to damage by the pathogen.

Another high-throughput screening assay to identify plants with enhanced disease tolerance is a root elongation and hypocotyl elongation assay. In this assay, seed are plated either on agar or in rolled-filter paper and incubated in conditions to allow for root and hypotocytl elongation. The agar or filter paper are inoculated with the pathogen of interest. The length of the root and hypocotyl are measured as an indication of disease tolerance.

Another phenotypic screening assay to identify plants with enhanced pathogen tolerance is to grow individual plants in pots in a greenhouse, inoculation of the plant with a pathogen and monitoring phenotypic parameters of the plant growth. The plant growth parameters which are tracked are plant height, canopy development, root architecture, fresh weight, stalk strength, and any other plant health parameter. Collection of the plant growth parameter data is done manually or with the systems of an automated greenhouse.

Several imaging systems optimized for field or green house conditions are used for quick and accurate phenotyping of massive amounts of plants in a fraction of the time that manual methods require. Examples include 2D or 3D imaging of whole plants or selected organs (e.g. leaves) using a variety of technologies, such as fluorescence, thermal or infrared cameras in automated or traditional greenhouse, or field settings.

Plants having passed the high-throughput leaf disc assay or leaf inoculation assay, and green house assay, are then screened for biotic stress in field trials. For this, seeds from the plants with the identified recombinant alleles are planted in the field in complete block design, the plants may or may not be inoculated with a pathogen and plant growth parameters are scored and yield is determined. Plants with resistance to biotic stress are used in a breeding program to introgress the new allele into elite germplasm.

Example 6. Accelerated Recombination in Rp1 Rust Resistance Locus of Corn

The Rp1 rust resistance locus of corn is one example of an NBS-LRR gene cluster of high agronomic value. In the development of new NBS-LRR alleles, recombination events can be either between matching copies of the NBS-LRR cluster or between mismatched copies of the NBS-LRR cluster. The B73 corn genome was re-sequenced in the Rp1 locus. Using the publicly available Rp1 gene models for annotation, altogether, 16 Rp1 paralogs were identified in the Rp1 locus on chromosome 10. Of the 16 Rp1 paralogs, 14 were clustered together, and the two other paralogs, while also located on chromosome 10, were separated by a larger chromosomal segment.

To identify target sequences useful for *Streptococcus pyogenes* Cas9 mediated double strand break (DSB) induced recombination in the Rp1 locus, the genomic loci encompassing each of the 16 identified Rp1 paralogs were analyzed using bioinfomatic tools. Two representative examples of Rp1 paralogs are presented as SEQ ID NO:1 and SEQ ID NO:2. The Rp1 paralogs were aligned using the Clustal W algorithm for multi-sequence alignment (Higgins et al. 1994). Regions of sequence which were conserved across most Rp1 paralogs were searched for both 'optimal' (G(N)$_{18}$GNGG; SEQ ID NO:78) and 'minimal' ((N$_{21}$)GG; SEQ ID NO:79) CRISPR/Cas9 target sequences (TS). The regions including such target sequences were further prioritized by their degree of conservation to maximize cutting efficiency: as a rule of thumb, at least half of all paralogs had to be cleavable by one, or at most two, homologous guide-RNA (gRNA) constructs. Among the regions that fulfilled all of the above criteria, the regions located in the C-terminal leucine-rich repeat (LRR) domain of the Rp1 paralogs were given preference for targeting to induce double strand breaks with the CRISPR/Cas9 nuclease. The LRR domains tend to be more divergent among paralogs than the NBS domains of NBS-LRR class of genes. Moreover, most determinants of resistance specificities are located in the LRR domain. For this reason, unequal recombination in the LRR domains is expected to accelerate generation of novel disease resistance alleles at a higher frequency than unequal recombination in the NBS domains.

From this analysis, 5 separate consensus sequences were identified. For target sequences (TS) 1 and 2, there were two variants of the consensus sequence that differed by 1 nucleotide. The consensus Rp1 target sequences are presented as SEQ ID NOs:3-9. For the two representative Rp1 paralogs (SEQ ID NO:1 and SEQ ID NO:2), the location of the different CRISPR/Cas9 target sequences is presented in Table 2.

TABLE 2

Position of Rp1 CRISPR/Cas9 target sequences in representative Rp1 paralogs.

| Rp1 | Rp1 Target Sequence | Target Sequence (TS) | TS SEQ ID NO | Start (bp) | End (bp) |
|---|---|---|---|---|---|
| SEQ ID NO: 2 | TS-1a | GCATCTTCAAATTATTGAAAGTGG | 3 | 801 | 824 |
|  | TS2-b | AATCTAGCACATATCCTGGGTGG | 6 | 389 | 411 |
|  | TS-3 | CCTTCTTTAGAGCTAGCACGTGG | 7 | 1204 | 1226 |
|  | TS-4 | GGCTCTTTTGCCATGAGCAGAGG | 8 | 878 | 900 |
| SEQ ID NO: 1 | TS-1b | GCATCTTCAAATCATTGAAAGTGG | 4 | 2766 | 2789 |
|  | TS-2a | GATCTGATACATATCCTGGGTGG | 5 | 2351 | 2373 |
|  | TS-3 | CCTTCTTTAGAGCTAGCACGTGG | 7 | 3169 | 3191 |
|  | TS-4 | GGCTCTTTTGCCATGAGCAGAGG | 8 | 2843 | 2865 |
|  | TS-5 | GCTTTAGCTATTTGCCTTGGTGG | 9 | 2962 | 2984 |

Across the 16 separate Rp1 paralogs evaluated for the presence of conserved CRISPR/Cas9 target sequences, 12 Rp1 paralogs had a CRISPR/Cas9 target sequence for TS-1 (TS-1a: SEQ ID NO:3 or TS-1b: SEQ ID NO:4); 10 of the 16 Rp1 paralogs had a CRISPR/Cas9 target sequence for TS-2 (TS-2a: SEQ ID NO:5, TS-2b: SEQ ID NO:6); 8 of the 16 Rp1 paralogs had a CRISPR/Cas9 target sequence for TS-3 (SEQ ID NO:7); 10 of the 16 Rp1 paralogs had a CRISPR/Cas9 target sequence for TS-4 (SEQ ID NO:8), and 8 of the 16 Rp1 paralogs had a CRISPR/Cas9 target sequence for TS-5 (SEQ ID NO:9).

Plant transformation vectors were designed to deliver CRISPR/Cas9 nuclease components. The Cas9 sequence is derived from Streptococcus pyogenes and the nucleotide sequence was codon optimized for monocot expression. Further, the Cas9 sequence contains a nuclear targeting sequence at both the 5' and 3' ends of the protein (SEQ ID NO:77). In the same transformation vector, there are one or two guide-RNA (gRNA) encoding cassettes: two gRNA cassettes for Rp1 TS-1 (TS-1a and TS-1b); two gRNA cassettes for Rp1 TS-2 (TS-2a and TS-2b); and one gRNA cassette for each vector designed to target Rp1 TS-3, or TS-4, or TS-5. The transformation vectors also contain a selection cassette conferring tolerance to glyposate. The transformation vectors are introduced into plants as described in Example 4.

DNA extraction methods for corn tissue are known in the art. Methods to identify the Rp1 locus, are known in the art by use of genomic markers. Methods of deep sequencing are known in the art and indicates that a region of DNA is sequenced multiple times (hundreds to thousands of times) to detect single nucleotide polymorphism (SNPs) with high accuracy. Non-limiting examples of methods to perform sequencing include Illumina® sequencing platform (Illumina, San Diego, CA), Roche 454 sequencing system (Roche, Branford, CT), single molecule, real-time (SMRT®) sequencing technology (Pacific Biosciences, Menlo Park, CA) sequencing platforms, and others known in the art.

In addition to the molecular screening of R0 and R1 plants, R1 or additional inbred or hybrid progeny plants are screened for disease resistance as described in Example 5.

Example 7: Accelerated Recombination in Rpp1 Soybean Rust Resistance Locus

The Rpp1 resistance locus of soybean is one example of an NBS-LRR gene cluster of high agronomic value. In the development of new NBS-LRR alleles, recombination events can be either "equal" for example, between corresponding regions of the NBS-LRR cluster, or "unequal" for example, between non-corresponding regions of the NBS-LRR cluster. The genome of soybean from different germplasms was sequenced in the Rpp1 locus. Using the publicly available Rpp1 gene models for annotation, altogether, three Rpp1 paralogs were identified in the Rpp1 locus.

To identify target sites useful for Streptococcus pyogenes Cas9 mediated double strand break (DSB) induced recombination in the Rpp1 locus, the genomic regions encompassing each of the identified Rpp1 paralogs were analyzed using bioinfomatic tools. Two representative examples of Rpp1 paralogs identified in Williams 82 germplasm (W82) are presented as SEQ ID NO:10 and SEQ ID NO:11. The Rpp1 paralogs were aligned using the Clustal W algorithm for multi-sequence alignment (Higgins et al. 1994). Regions of sequence which were conserved across most Rpp1 paralogs were searched for both 'optimal' ($G(N)_{18}GNGG$; SEQ ID NO:57) and 'minimal' (($N_{21}$)GG; SEQ ID NO:58) CRISPR/Cas9 target sequences (TS). The regions including such target sequences were further prioritized by the degree of their conservation to maximize cutting efficiency as described in Example 6.

From this analysis, 5 separate consensus sequences were identified. For target sequences (TS) 2 and 5, there were two variants of the consensus sequence that differed by 1 nucleotide. The consensus Rpp1 target sequences are presented as SEQ ID NOs: 12-18. For the two representative Rpp1 paralogs (SEQ ID NO:10 and SEQ ID NO:11), the location of the different CRISPR/Cas9 target sequences is presented in Table 3. Note that the target sequence (TS) position for TS-4 (SEQ ID NO:16, TS-5a (SEQ ID NO:17, and TS-5b (SEQ ID NO:18) are on the reverse strand as indicated by the start and end position of the respective SEQ ID NO:10 and SEQ ID NO:11.

TABLE 3

Position of Rpp1 CRISPR/Cas9 target sequences in representative Rpp1 paralogs.

| Rpp1 | Rpp1 Target Sequences | Target Sequence (TS) | TS SEQ ID NO | Start (bp) | End (bp) |
|---|---|---|---|---|---|
| SEQ ID NO: 10 | TS-1 | GTGGGATCTTCTGGAGGATGAGG | 12 | 837 | 859 |
| | TS-2a | GTGGGTTGTTAAATGGAAAGGGG | 13 | 1661 | 1683 |
| | TS-3 | GGAATGGACAGCTGATCTGGAGG | 15 | 1872 | 1894 |
| | TS-4 | GCTTGTAGATCTCCCAGTGGAGG | 16 | 2171 | 2149 |
| | TS-5a | AAATAGATAAAATAGGTTTGAGG | 17 | 2489 | 2467 |
| SEQ ID NO: 11 | TS-1 | GTGGGATCTTCTGGAGGATGAGG | 12 | 1317 | 1339 |
| | TS2-b | GTGGGTTGTTAGATGGAAAGAGG | 14 | 2102 | 2124 |
| | TS-3 | GGAATGGACAGCTGATCTGGAGG | 15 | 2313 | 2335 |
| | TS-4 | GCTTGTAGATCTCCCAGTGGAGG | 16 | 2612 | 2590 |
| | TS-5b | AAATAGATAAAATAGATTTGAGG | 18 | 2930 | 2908 |

Across the 3 separate Rpp1 paralogs evaluated for the presence of conserved CRISPR/Cas9 target sequences, all 3 Rpp1 paralogs had a CRISPR/Cas9 target sequence for TS-1 (TS-1: SEQ ID NO:12), TS-3 (SEQ ID NO:15) and TS-4 (SEQ ID NO:16). One paralog had a CRISPR/Cas9 target sequence for both TS-2a (SEQ ID NO:13) and TS-2b (SEQ ID NO:14); two of the Rpp1 paralogs had a CRISPR/Cas9 target sequence for TS-5a (SEQ ID NO:17), and one of the paralogs a CRISPR/Cas9 target sequence for TS-5b (SEQ ID NO:18).

Plant transformation vectors were constructed to deliver CRISPR/Cas9 nuclease components. The Cas9 sequence is derived from Streptococcus pyogenes and the nucleotide sequence was codon optimized for monocot expression, and 13 amino acid changes were made to reduce allergenicity (E24D, D54G, V143A, T191I, G205R, K234R, T310S, T593A, E630G, H723Q, V743I, R753, L847I). Further, the Cas9 sequence contains a nuclear targeting sequence at both the 5' and 3' ends of the protein (SEQ ID NO:77). In the same transformation vector, there are one or two guide-RNA (gRNA) encoding cassettes: two gRNA cassettes for Rpp1 TS-2 (TS-2a and TS-2b); two gRNA cassettes for Rpp1 TS-5 (TS-5a and TS-5b); and one gRNA cassette for each vector designed to target Rpp1 TS-1, or TS-3, or TS-4. The transformation vectors also contain a selection cassette conferring tolerance to glyposate.

Plants identified with a genotype with polymorphisms suitable for recombination are crossed to create hybrid populations. The inbred parental germplasm or the F1 hybrid plants, or progeny heterozygous for the entire region of interest, are used as starting material for plant transformation. The plant transformation vectors are introduced into corn cells using methods known in the art, for example with *Agrobacterium* transformation or biolistic transformation. The transformed callus is selected with glyphosate using methods known in the art. The transformation vectors are introduced into plants as described in Example 4.

DNA extraction methods for corn tissue are known in the art. Methods to identify the Rp1 locus, are known in the art by use of genomic markers. Methods of deep sequencing are known in the art and indicates that a region of DNA is sequenced multiple times (hundreds to thousands of times) to detect single nucleotide polymorphism (SNPs) with high accuracy. Non-limiting examples of methods to perform sequencing include Illumina® sequencing platform (Illumina, San Diego, CA), Roche 454 sequencing system (Roche, Branford, CT), single molecule, real-time (SMRT®) sequencing technology (Pacific Biosciences, Menlo Park, CA) sequencing platforms, and others known in the art.

In addition to the molecular screening of R0 and R1 plants, R1 or additional inbred or hybrid progeny plants are screened for disease resistance as described in Example 5.

Example 8: Accelerated Recombination in Rps1 Soybean Pytophthora Resistance Locus The Rps1 Pytophthora resistance locus of soybean is one example of an NBS-LRR gene cluster of high agronomic value. In the development of new NBS-LRR genotypes, recombination events can be either "equal" for example, between corresponding regions of the NBS-LRR cluster, or "unequal" for example, between non-corresponding regions of the NBS-LRR cluster. The genome of soybean from different germplasms was sequenced in the Rps1 locus. Using the publicly available Rps1 gene models for annotation, altogether, 23 Rps1 paralogs were identified in the Rps1 soybean Pytophthora resistance locus.

From this analysis, 6 separate consensus sequences were identified, each with two variants of the consensus sequence that differed by 1 nucleotide. The consensus Rps1 target sequences are presented as SEQ ID NOs: 21-32. For the two representative Rps1 paralogs (SEQ ID NO:19 and SEQ ID NO:20), the location of the different CRISPR/Cas9 target sequences are presented in Table 4. Note that the target sequence (TS) position for TS-6a (SEQ ID NO:31) and TS-6b (SEQ ID NO:32) are on the reverse strand as indicated by the start and end position of the respective SEQ ID NO:19 and SEQ ID NO:20.

TABLE 4

Position of Rps1 CRISPR/Cas9 target sites in representative Rps1 paralogs.

| Rps1 | Rps1 Target Sequence | Target Sequence (TS) | TS SEQ ID NO | Start (bp) | End (bp) |
|---|---|---|---|---|---|
| SEQ ID NO: 19 | TS-1a | GATCTAGCCACATCACTCGGTGG | 21 | 916 | 938 |
|  | TS-2a | CCAAAGTGATGAAGCGTTGGAGG | 23 | 1557 | 1579 |
|  | TS-3a | GGAATATCTTTTGGTTTCAGGGG | 25 | 2526 | 2548 |
|  | TS-4a | ATTGAGTCCTTTCCAAAACGGGG | 27 | 2689 | 2711 |
|  | TS-5a | TGGAGATGTTGGACTGCACAGGG | 29 | 2903 | 2925 |
|  | TS-6a | GCAAACTTCCCTCTAGTTTGGGG | 31 | 2068 | 2046 |
| SEQ ID NO: 20 | TS-1b | GATCTAGCATTATACCTTGGTGG | 22 | 1375 | 1397 |
|  | TS-2b | CAGAAGCAATGAAGCATTGGAGG | 24 | 1926 | 1948 |
|  | TS-3b | GGAATCTCTTTTGGTTTCAGGGG | 26 | 2886 | 2908 |
|  | TS-4b | ATTGAGTCGTTTCCAGAAGGGGG | 28 | 2953 | 2975 |
|  | TS-5b | CTGGAGATGTTGGACTGCACGGG | 30 | 3166 | 3189 |
|  | TS-6b | GCAAATCTCCCCTTAGTTTGGGG | 32 | 2428 | 2406 |

Across the 23 Rps1 paralogs with sequence available, 21 were evaluated for the presence of conserved CRISPR/Cas9 target sequences and 7 Rps1 paralogs had a CRISPR/Cas9 target sequence for TS-1a (SEQ ID NO:21); 8 Rps1 paralogs had a CRISPR/Cas9 target sequence for TS-2a (SEQ ID NO:23); 6 Rps1 paralogs had a CRISPR/Cas9 target sequence for TS-3a (SEQ ID NO:25); 7 Rps1 paralogs had a CRISPR/Cas9 target sequence for TS-4a (SEQ ID NO:27); 1 Rps1 paralogs had a CRISPR/Cas9 target sequence for TS-5a (SEQ ID NO:29); 10 Rps1 paralogs had a CRISPR/Cas9 target sequence for TS-6a (SEQ ID NO:31); 5 Rps1 paralogs had a CRISPR/Cas9 target sequence for TS-1b (SEQ ID NO:22); 4 Rps1 paralogs had a CRISPR/Cas9 target sequence for TS-2b (SEQ ID NO:24); 7 Rps1 paralogs had a CRISPR/Cas9 target sequence for TS-3b (SEQ ID NO:26); 8 Rps1 paralogs had a CRISPR/Cas9 target sequence for TS-4b (SEQ ID NO:28); 12 Rps1 paralogs had a CRISPR/Cas9 target sequence for TS-5b (SEQ ID NO:30); and 4 Rps1 paralogs had a CRISPR/Cas9 target sequence for TS-6b (SEQ ID NO:32).

Plant transformation vectors were constructed to deliver CRISPR/Cas9 nuclease components as described in Example 6.

Plants identified with a genotype with polymorphisms suitable for recombination are transformed as described in Example 6.

DNA extraction methods and methods of identifying the Rp1 locus by use of genomic markers are known in the art. Deep sequencing is used to identify recombination events in the Rp1 locus.

In addition to the molecular screening of R0 and R1 plants, R1 or additional inbred or hybrid progeny plants are screened for disease resistance as described in Example 5.

Example 9: Accelerated Recombination in Rhg1 Soybean Cyst Nematode Locus

The Rhg1 locus mediates nematode resistance in soybean and is one example of a disease resistance gene cluster locus of high agronomic value. The Rhg1 locus has been shown to contain three separate genes, and that susceptible soybean varieties contain only one copy of the Rhg1 locus. In contrast, at least one soybean germplasm line with resistance against soybean cyst nematode has an array of ten tandemly duplicated copies of the Rhg1 locus.

To identify regions of the Rhg1 locus to target for accelerated recombination, the publicly available genomic sequence for the Rhg1 locus in the Williams 82 germplasm (SEQ ID NO: 68) was used to identify target sequences for a double-strand break inducing CRISPR/Cas9 nuclease. From this analysis eight target sequences (TS) were identified, TS1 (SEQ ID NO: 69); TS2 (SEQ ID NO: 70); TS3 (SEQ ID NO: 71); TS4 (SEQ ID NO: 72); TS5 (SEQ ID NO: 73); TS6 (SEQ ID NO: 74); TS7 (SEQ ID NO: 75); and TS8 (SEQ ID NO: 76). Six of the CRISPR/Cas9 target sequences are located within a genic region of the Rgh1 locus, and two of the CRISPR/Cas9 target sequences are located in an intergenic region of the Rhg1 locus (see Table 5).

TABLE 5

Rhg1 target sites and their coordinates in target sequences

| SEQ ID NO | Target Sequence | Sequence | Start (bp) | End (bp) | Genic (G) Intergenic (I) |
|---|---|---|---|---|---|
| 69 | Rhg1_TS1 | ggcaaggcacactgcggatgagg | 4685 | 4707 | G |
| 70 | Rhg1_TS2 | gtacgctggcgtcatgagggagg | 6546 | 6524 | G |
| 71 | Rhg1_TS3 | ggcggccggagacatgccggagg | 6783 | 6805 | G |
| 72 | Rhg1_TS4 | ggaaattgctgaattgtacgagg | 10130 | 10152 | G |
| 73 | Rhg1_TS5 | gatcttaggctctttgaacgagg | 15140 | 15118 | G |
| 74 | Rhg1_TS6 | gggaagcttgcgatcgggtgcgg | 20233 | 20211 | I |

TABLE 5-continued

Rhg1 target sites and
their coordinates in target sequences

| SEQ ID NO | Target Sequence | Sequence | Start (bp) | End (bp) | Genic (G) Intergenic (I) |
|---|---|---|---|---|---|
| 75 | Rhg1_TS7 | gaatcggaaggagttgtcggcgg | 20597 | 20575 | G |
| 76 | Rhg1_TS8 | ggctgattctaccgcgaccgtgg | 22792 | 22770 | I |

Plant transformation vectors are constructed to deliver CRISPR/Cas9 nuclease components as described in Example 1.

Plants identified with a genotype with polymorphisms suitable for recombination are transformed using methods known in the art and as described in Example 6.

DNA extraction methods and methods for identifying the Rhg1 locus are known in the art. Deep sequencing is used to identify modifications within the Rhg1 locus.

In addition to the molecular screening of R0 and R1 plants, R1 or additional inbred or hybrid progeny plants are screened for disease resistance as described in Example 5.

What is claimed is:

1. A method of generating a new gene array of tandemly duplicated genes, comprising
contacting a plant cell with
a first RNA-guided endonuclease of a type II guided CRISPR-Cas system and a first guide RNA that introduce a genome modification in at least one target sequence in a first gene array of tandemly duplicated genes and
a second RNA-guided endonuclease of a type II guided CRISPR-Cas system and a second guide RNA that introduce a genome modification in at least one target sequence in a second gene array of tandemly duplicated genes,
thereby inducing asymmetric recombination between the first gene array and the second gene array of tandemly duplicated genes, and
selecting at least one progeny comprising a new array of tandemly duplicated genes,
wherein the first gene array of tandemly duplicated genes, the second gene array of tandemly duplicated genes and the new gene array of tandemly duplicated genes encode nucleotide-binding site leucine-rich (NBS-LRR) disease resistance proteins,
wherein a genomic locus comprising the target sequence for the genome modification in the first gene array is homologous to at least 100 bp of the second gene array and the regions of homology are in different positions in the first and second gene array,
wherein the cell is a plant cell, wherein the genome modification is a double-strand break (DSB), wherein the duplicated genes are not supplied exogenously, wherein inducing said asymmetric recombination occurs at a frequency that is at least 10-fold higher than the rate of asymmetric recombination in comparator cells, wherein the comparator cells have not been contacted with said first and second RNA-guided endonuclease of a type II guided CRISPR-Cas system and guide RNA, and
wherein the plant is corn and the disease resistance locus is Rp1; or wherein the plant is soy and the disease resistance locus is Rpp1; or wherein the plant is soy and the disease resistance locus is Rps1; or wherein the plant is soy and the disease resistance locus is Rhg1.

2. The method of claim 1, wherein the disease resistance locus is corn Rp1 comprising a nucleotide sequence of SEQ ID NO: 1 or SEQ ID NO: 2 or degenerated nucleotide sequences thereof encoding the same amino acid sequences, soy Rpp1 comprising a nucleotide sequence of SEQ ID NO: 10 or SEQ ID NO: 11 or degenerated nucleotide sequences thereof encoding the same amino acid sequences, soy Rps1 comprising a nucleotide sequence of SEQ ID NO: 19 or SEQ ID NO: 20 or degenerated nucleotide sequences thereof encoding the same amino acid sequences, or soy Rhg1 comprising a nucleotide sequence of SEQ ID NO: 68 or degenerated nucleotide sequences thereof encoding the same amino acid sequences.

3. The method of claim 1, wherein the target sequence comprises a nucleotide sequence selected from
a) SEQ ID NO:3; SEQ ID NO: 4, SEQ ID NO: 5, SEQ ID NO: 6, SEQ ID NO:7, SEQ ID NO: 8 or SEQ ID NO: 9 for corn Rp1;
b) SEQ ID NO: 12; SEQ ID NO: 13, SEQ ID NO: 14, SEQ ID NO: 15, SEQ ID NO: 16, SEQ ID NO: 17 or SEQ ID NO: 18 for soy Rpp1;
c) SEQ ID NO: 21; SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31 or SEQ ID NO: 32 for soy Rps1; or
d) SEQ ID NO: 69; SEQ ID NO: 70, SEQ ID NO: 71, SEQ ID NO: 72, SEQ ID NO: 73, SEQ ID NO: 74, SEQ ID NO: 75 or SEQ ID NO: 76 for soy Rhg1.

4. A method of providing a plant with improved disease resistance, comprising:
a. providing to one or more plant cells an RNA-guided endonuclease of a type II guided CRISPR-Cas system and a guide RNA that introduce a genome modification in at least one target sequence in a first disease resistance locus, wherein the genome modification is a double-strand break (DSB), wherein the first disease resistance locus comprises a gene array of tandemly duplicated genes, wherein the first disease resistance locus comprises a gene array of tandemly duplicated genes encoding NBS-LRR disease resistance proteins, wherein a genomic locus comprising the target sequence for the genome modification is homologous to at least 100 bp of at least one second disease resistance locus comprising a gene array of tandemly duplicated genes on a homologous chromosome, wherein the regions of homology are in different positions in the first and second disease resistance loci, and wherein the second disease resistance locus encodes two or more NBS-LRR disease resistance proteins;
b. screening for asymmetric recombination between the first and second disease resistance loci on homologous chromosomes to identify plant cells comprising a recombinant disease resistance locus, wherein the disease resistance loci on homologous chromosomes are not supplied exogenously, and wherein said asymmetric recombination occurs at a frequency that is at least 10-fold higher than the rate of asymmetric recombination in comparator cells, wherein the comparator cells have not been contacted with said RNA-guided endonuclease of a type II guided CRISPR-Cas system and a guide RNA;
c. testing plants obtained from the plant cells identified in step (b) and their progeny for improved disease resistance; and
selecting the plant with improved disease resistance, wherein the disease resistance locus is corn Rp1 comprising a nucleotide sequence of SEQ ID NO: 1 or SEQ ID NO: 2 or degenerated nucleotide sequences thereof encoding the same amino acid sequences, soy Rpp1 comprising a nucleotide sequence of SEQ ID NO: 10 or SEQ ID NO: 11 or degenerated nucleotide sequences thereof encoding the same amino acid sequences, soy Rps1 comprising a nucleotide sequence of SEQ ID NO: 19 or SEQ ID NO: 20 or degenerated nucleotide sequences thereof encoding the same amino acid sequences, or soy Rhg1 comprising a nucleotide sequence of SEQ ID NO: 68 or degenerated nucleotide sequences thereof encoding the same amino acid sequences.

5. The method of claim 4, wherein the target sequence comprises a nucleotide sequence selected from
a) SEQ ID NO:3; SEQ ID NO: 4, SEQ ID NO: 5, SEQ ID NO: 6, SEQ ID NO:7, SEQ ID NO: 8 or SEQ ID NO: 9 for corn Rp1;
b) SEQ ID NO: 12; SEQ ID NO: 13, SEQ ID NO: 14, SEQ ID NO: 15, SEQ ID NO: 16, SEQ ID NO: 17 or SEQ ID NO: 18 for soy Rpp1;
c) SEQ ID NO: 21; SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31 or SEQ ID NO: 32 for soy Rps1; or
d) SEQ ID NO: 69; SEQ ID NO: 70, SEQ ID NO: 71, SEQ ID NO: 72, SEQ ID NO: 73, SEQ ID NO: 74, SEQ ID NO: 75 or SEQ ID NO: 76 for soy Rhg1.

6. The method of claim 1, wherein the plant is soy and the disease resistance locus is Rpp1 or wherein the plant is soy and the disease resistance locus is Rps1.

7. The method of claim 1, wherein the disease resistance is soy Rpp1 comprising a nucleotide sequence of SEQ ID NO: 10 or SEQ ID NO: 11 or degenerated nucleotide sequences thereof encoding the same amino acid sequences or soy Rps1 comprising a nucleotide sequence of SEQ ID NO: 19 or SEQ ID NO: 20 or degenerated nucleotide sequences thereof encoding the same amino acid sequences.

8. The method of claim 4, wherein the plant is soy and the disease resistance locus is Rpp1 or wherein the plant is soy and the disease resistance locus is Rps1.

9. The method of claim 4, wherein the disease resistance is soy Rpp1 comprising a nucleotide sequence of SEQ ID NO: 10 or SEQ ID NO: 11 or degenerated nucleotide sequences thereof encoding the same amino acid sequences, or soy Rps1 comprising a nucleotide sequence of SEQ ID NO: 19 or SEQ ID NO: 20 or degenerated nucleotide sequences thereof encoding the same amino acid sequences.

* * * * *

SEQUENCE LISTING

<160> NUMBER OF SEQ ID NOS: 82

<210> SEQ ID NO 1
<211> LENGTH: 3885
<212> TYPE: DNA
<213> ORGANISM: Zea maize

<400> SEQUENCE: 1

```
atggcggact tggcgctagt tggcttaagg tgggcagcat cgccgattgt caaggagctt      60
cttactaaag cttcagctta cctcagtgtg gacatggtgc gtgagatcga acgactacaa     120
gacactgtcc tgccacagtt cgagttggtg attcaagcgg cccagaagag cccccatagg     180
ggcaagctgg aatcctggct tcggcgtctc aaagaagcct tctatgatgc cgaggacctg     240
ctggacgagc atgagtacaa cgtccttaag gccaaggcca agagcggaaa aggtcccctg     300
ctccgagagg atgaaagctc ctccactgca accactgtca tgaagccttt tcattctgct     360
atgaacaggg cacgcaactt gctccctggg aacagaaggc taattagcaa gatgaacgag     420
ctcaaagcta tcctgacaga agcccaacaa cttcgagatc ttcttggctt gccacatggc     480
aataccgtcg agtgcccagc tgcagcacct accagtgttc ccacaaccac atcacttccc     540
acttccaagg ttttcggtcg cgacagggat cgtgatcgca tagtaaaatt tcttctcggc     600
aagacaacaa ctgctgaggc aagctcaact aagtactccg gtttggccat tgttggattg     660
ggaggaatgg ggaagtctac cttagcacaa tatgtctata atgacaagag gattgaagaa     720
tgctttgatg tcaggatgtg gatctgtatc tcgcgcaaac ttgatgtgca tcgtcacaca     780
agggagatta tagagtctgc aaaaaaggga gagtgcccac gtgttgataa tctcgatact     840
ctccagtgca aattacgtga tatactacaa gagtcacaga aattcctgct tgtcttggat     900
gatgtttggt ttgaaaaatc tcatagtgag acagagtggg agttattcct tgctccatta     960
gtctctaaac agtcagggag caaagttttg gttacttctc aaagtggaac acttccggcc    1020
gctatttgtt gtgaacaaga acatgtcatt catttggaaa acatggatga tactgagttt    1080
ttggctcttt ttaaacacca tgctttctct ggagcagaaa tcaaagacca actgttacgc    1140
acgaagctgg aagacactgc agaggagatt gctaaaaggc ttggacaatg tcctttggca    1200
gcaaaagttc tgggttctcg attgtgcagg aaaaaggata ttgctgaatg gaaagctgct    1260
ctaaagcttg gagatttaag tgatcccttc acatctctgt tgtggagtta cgagaagtta    1320
```

```
gatccacgtc tgcagaggtg cttcttgtat tgcagcttgt tgccaaaagg tcacagatat   1380
agacctgaag agttggttca cctttgggtg gcagaaggat ttgttggttc atgcaatttg   1440
agtaggagaa cgttagaaga ggttgggatg gattacttca atgatatggt ctctgtatct   1500
ttcttccaat tggtttctca aatgtattgt gattcgtact atgtcatgca tgatatcctt   1560
catgattttg cagagtcact ctctagggaa gactgcttta gattagaaga tgataatgtg   1620
acagaaatac catgcactgt tcgacatcta tctgttcatg ttcaaagtat gcaaaagcat   1680
aagcaaatta tctgcaagct atatcattta cgcactatta tctgcatcga tccgctaatg   1740
gatggtccaa gtgatatttt tgatggcatg ctacggaacc aaagaaaact gcgtgtattg   1800
tctctgtcat tttacagcag cagcaagttg ccagaatcta ttggtgagct gaagcacctc   1860
cggtatttga acctcgtcag gacgttagtt tctgaattgc ctacatcatt atgtactctc   1920
taccacttac aattactttg gttaaaccac atggtggaga atttgcctga caaactatgc   1980
aatttaagaa agctacggca tctaggagcg tacgtgaatg atttcgcgat tgaaaagcct   2040
atttgccaaa ttctgaatat aggtaagtta acgtctctac aacacattta tgtcttttct   2100
gtacagaaga agcaaggcta tgagttgcga cagttgaagg acttgaatga gcttggtggc   2160
agtttaaaag tgaaaaatct tgagaatgtc attggaaagg atgaagccgt agagtcgaag   2220
ctatatctga aaagtcgcct taaagagttg gcatttgagt ggagttccga gaatggcatg   2280
gatgcaatgg atattctaga aggtctaaga ccgccacccc aactgagtaa gctcagaatc   2340
aaaggttaca gatctgatac atatcctggg tggttactag agcgatccta ttttgagaat   2400
ttggaaagtt ttgagcttag taattgcagt ttgctagaag gcctaccacc agatacagag   2460
ctccttcgga attgctctag gttgcgtata aactttgttc caaatttgaa ggaactatct   2520
aatcttccag caggccttac agatttatca attgattggt gcccactgct tatgtttatc   2580
accaacaatg agctaggaca gcatgacttg agggaaaata taataatcaa ggcagacgac   2640
ctggcatcta aacttacatt gatgtgggag gtggattcag gaaaaaaagt taggagtata   2700
ctgtcgaaag actattcatc tctgaagcag ttgatgacat tgatgatgga tgatgatata   2760
tcaaagcatc ttcaaatcat tgaaagtggt ctggaggaaa gagaagataa agtatggatg   2820
aaagaaaaca tcatcaaggc atggctcttt tgccatgagc agaggataag attcatttat   2880
ggaaggacca tggagatgcc attggttcta ccgtcaggac tctgtgaact ttctcttcct   2940
tcatgcagta ttacagatga agctttagct atttgccttg gtggcctcac ttcactgagg   3000
aatttaaaat tgaaatataa tatggcatta actacacttc catcagaaaa ggtgtttgag   3060
catttgacga agcttgacag gttggttgta ataggttgtt tgtgtctcaa atcactgggg   3120
ggcttacgtg ctgctccatc tcttttcctgt tttaactgtt gggattgtcc ttctttagag   3180
ctagcacggg gagcagaact aatgccgttg aaccttgcta gcaatctcag catccttggc   3240
tgcattcttg cagctgattc gttcattaat ggcttgccac atctgaaaca tctttccatt   3300
gatgtctgca gatgctcccc atccttatcg attggccacc tgacctccct tgaatcatta   3360
tgtctaaatg gtctccctga tctttgcttt gttgaaggct tgtcttccct gcaccttaag   3420
cgcctaagtt tagtagatgt tgcaaacctc actgccaagt gcatctcaca gtttcgtgtc   3480
caggaatcgc tcagggttag tagctctgta ttgctcaacc acatgctaat ggctgaaggg   3540
tttacagccc caccaaatct tactcttttta gattgcaagg agccgtcagt ttcatttgaa   3600
gaacctgcaa atctctcatc cgtcaagcac ctgcactttt catgttgcga aacagagtcc   3660
ctgcctagaa atctaaaatc tgtctcaagt ctggagagtc tttctataga acaatgcccc   3720
```

| | |
|---|---|
| aacatagcat ctttaccaga tctgccgtcc tccctccagc gcataactat attgaattgc | 3780 |
| cccgtcttga tgaagaattg ccaagaacct gatggagaaa gctggccaaa gatttcgcac | 3840 |
| gttcgttgga agagctttcc accaaaatcg atctggcttc cttag | 3885 |

<210> SEQ ID NO 2
<211> LENGTH: 1914
<212> TYPE: DNA
<213> ORGANISM: Zea maize

<400> SEQUENCE: 2

| | |
|---|---|
| atggcggaga ggttgcctga caaactttgc aatttaagta agctacgaca tctaagagtg | 60 |
| aacaacaatc aaattcccaa cattggcaag cttacttcat tacaacgaat agagatattt | 120 |
| tccgtgcaaa agaagcaagg atatgagttg caacaactga agtacttgaa tgagcttggt | 180 |
| ggcagtttaa gcgtacaaaa tcttgagaat gtcatcggaa aggatgaagc cttagagtcg | 240 |
| aagctatatc tgaaaagtcg ccttaaagag ttgacacttg tgtggagttc tgataatggc | 300 |
| atggatgcaa tggatattct gcatttggat attctagaag gtctgagacc gccaccccaa | 360 |
| ttgagtaaac tcacaatcga aggctacaaa tctagcacat atcctgggtg gttacttgag | 420 |
| cgatcctatt ttgagaattt agaaagtttt gagctcaata attgcagttt gctagcagtc | 480 |
| ctaccaccag atacagagct cctcggcat tgctctaggc tgcatataaa aaatgttcca | 540 |
| aaattgaagg aactaccgta tcttccagca ggccttacag agttgtcaat ttgtaggtgt | 600 |
| ccattactta tgtttatcac caacaaggag ctaggacaac atgacttgag ggaaaatata | 660 |
| atgaaggcag acgacctgtc gtctaaactt gcatcgatgt gggaggtgga ttcaagatca | 720 |
| catgttacga gcgtactgtc ggaagactat tcatttctga agcagttgat gacattgatg | 780 |
| atggatgatg atatatcaaa gcatcttcaa attattgaaa gtggtctaga ggaaggagga | 840 |
| gatgaagtat ggatgaaaga aaacatcatc aaggcatggc tcttttgcca tgagcagagg | 900 |
| ataagattca tttatggaag gaccatggag atgtcactgg ttctaccgtc aggactctat | 960 |
| aaactttctc tttcttcatg cattattaca gatgaagctt tagctatttg cctcagtggc | 1020 |
| ctcacttcac tgagaacttt ggaattgaaa tataatatga cattaactac acttccgtca | 1080 |
| gaagaggcgt ttcaacaaat gacaaagctg aagtgcttcg ctataagtgg ttgttggtgt | 1140 |
| ctcaaatcac tgggggatt acatgctgct ccatctcttt cggctcttga ttgttgggat | 1200 |
| tgtccttctt tagagctagc acgtggagcc gaactaatgc cattgaacct tgctagctac | 1260 |
| cttgacatcc agggctgcat tcttgcagcc gattcattca ctaattatgt gccagacctg | 1320 |
| aaacaactta ccattattaa ctgcagatgc tccccatcct tatcgattgg ccacctgacc | 1380 |
| tcccttgaat cattacaact aattggtctc cctgatcttt actttgttga aggcttgtct | 1440 |
| tccctgcacc ttaagcgcct aaagttagga gatgttgcaa accttactgc caagtgcttc | 1500 |
| tcacagtttc gtgtcatgga atcgctcacc gttagtagct ccgtattgct caaccagatg | 1560 |
| ctcatggctg aagggtttat ggtcccacca aatcttgaat tcttatattg caaggagccg | 1620 |
| tcgattttat ttgaagagcc tgcaaatctc tcatctgtca agtgcctgaa ttttcgtta | 1680 |
| tgtgaaaccg agtccctgcc aagaaatcta aaatctctat caagtctgga gagtctcgag | 1740 |
| atagggtttt gccccaacat agcatcttta ccagatctgc cgtcctccct cgagcgcata | 1800 |
| actatatggg agtgccctgt cttgaagaag aactgccaag aacctgatgg agaaagctgg | 1860 |
| ccaaagattt cacgcatccg tcggaaggac ataggcttcc aatatttat ttag | 1914 |

<210> SEQ ID NO 3
<211> LENGTH: 24
<212> TYPE: DNA
<213> ORGANISM: Zea maize

<400> SEQUENCE: 3
gcatcttcaa attattgaaa gtgg                                    24

<210> SEQ ID NO 4
<211> LENGTH: 24
<212> TYPE: DNA
<213> ORGANISM: Zea maize

<400> SEQUENCE: 4
gcatcttcaa atcattgaaa gtgg                                    24

<210> SEQ ID NO 5
<211> LENGTH: 23
<212> TYPE: DNA
<213> ORGANISM: Zea maize

<400> SEQUENCE: 5
gatctgatac atatcctggg tgg                                     23

<210> SEQ ID NO 6
<211> LENGTH: 23
<212> TYPE: DNA
<213> ORGANISM: Zea maize

<400> SEQUENCE: 6
aatctagcac atatcctggg tgg                                     23

<210> SEQ ID NO 7
<211> LENGTH: 23
<212> TYPE: DNA
<213> ORGANISM: Zea maize

<400> SEQUENCE: 7
ccttctttag agctagcacg tgg                                     23

<210> SEQ ID NO 8
<211> LENGTH: 23
<212> TYPE: DNA
<213> ORGANISM: Zea maize

<400> SEQUENCE: 8
ggctcttttg ccatgagcag agg                                     23

<210> SEQ ID NO 9
<211> LENGTH: 23
<212> TYPE: DNA
<213> ORGANISM: Zea maize

<400> SEQUENCE: 9
gctttagcta tttgccttgg tgg                                     23

<210> SEQ ID NO 10
<211> LENGTH: 3399
<212> TYPE: DNA
<213> ORGANISM: Glycine max

<400> SEQUENCE: 10
ctcaataatc acttttatca tttcaaacaa agaaagttgt tagtgcttaa cattcctttg    60

```
aatattaaac taagttcaat ttttatttct taccattagc gtgacatgaa aaaataaatt      120
tattaattcc aatatatatt ggtggtataa agcacttcca tatatgattg gtcacaattt      180
ttttttactt agattccatc ttcattgaaa aaagttaaaa cacatgaaaa attaattatt      240
tcagttaaat taattccttt cactttttaa atatattctt tatttgggta aaataattcc      300 ttttgttat gtgtgagttt gaaattcttt taatttaata tatttgtaaa taaattattt       360
tgacctaata tattgtaaat caattcaaaa atagaattta ctgtctaaag actcattatt      420
caaccaaacg agagagttgt gttattctat agtgacggag caacagaaag gttaagaatg      480
tagcataacc aaaacaatga aacaggtgat gtagaagatc atgctgtgaa cggaggtagc      540
aatggcgatg atgctttgac tataaataag ttgctatccg atctagcaag gcaagaagac      600
tactttgata aaagcttaca gtggcgggag ttccagggca agaagcgcaa gagacaagat      660
gacaattggt tggataaact aaaggacctg aaaaaaagag ccattgatgt gaaaaactca      720
ctgcatcagt ctgggtcgac taatgaattc cccaagcctt ctgaattggg tgatgagttt      780
ttttatttat cgatagagaa gcgttgggcg tcgcgagata aaaagtggga gaacatgtgg      840
gatcttctgg aggatgagga agtcttcatt attggcatag atggaatggg gggagttgga      900
aaaacattca tggcaactca tatcaagaat gagattaaaa gaaggggac tttcaaggat       960 gtcttctggg tcactgtttc ccatgatttc accaatttca aattgcaaca tgacattgca     1020
gaaacaatac aggttaagct ttacggagat gagatgacta gagcaacaat tttgacgtca     1080
gagttggaga aaagagaaaa agcactgctt attttggatg atgtttggga atatattgat     1140
ctgcaaaagg tggggattcc tcttaaagtg aatggcatta aattgattat cacaactcgt     1200
ttgaaacatg tgtgtctaca gatggattgc caaccatata atataataac aatattcccc     1260
tttgaagaag aagaagaaga agaagaagaa gaagaagaag aagaaaaaga agaagaagaa     1320
gaagcttggg agttattttt gctaaaactt ggacaccgtg gaacacctgc aagcttccc      1380 cctcatgtac tagagattgc aagatctgtt gtaatgaaat gtgatggttt accacttgga     1440
atcagtgtga tggctcgaac catgaaaggg aaaaatgaga tccattggtg gagacatgca     1500
ttgaataaac ttgacagatt ggaaatggga gaagaggtct taagcgtact aaaacgtagc     1560
tatgacaatt taattgaaaa ggacatccaa aaatgtttct tacagtctgc actgtttcct     1620
aatgctgatg aagggaaatg ggctatgatg attgttgaga gtgggttgtt aaatggaaag     1680
gggagtttgg aggaaatatt tgatgaggca cgtgtcatag tggataaact cataaaccat     1740
tctttgttgt taggttattg gagtttacga atgaatggtc tgttgaggaa gatggcgtgc     1800
aatatcttga acgagaatca cacttacatg ataaaatgtc atgaaaattt gagaaagata     1860
cctcagatgc gggaatggac agctgatctg gaggcagttt cttttggcggg taatgagata     1920 gaagaaatag cagagggcac atcacctaat tgtccacgct tgtccaccctt catcttatct     1980 cgtaattcca tcagtcatat tcccaagtgt tttttcagac acatgaacgc tctaacacaa     2040
cttgatttat catataatcg tagattaaca tctttgccaa agtcgctgtc taagttgagg     2100
tctcttactt ctttagtgct ccgccaatgt tcaaaattga agatatacc tccactggga      2160 gatctacaag cattgtcaag attggacatt tccggttgta attcgctcct cagggtaccg     2220
gaaggcttgc aaaatctaaa aaagttgcaa tggcttagtc tttcccgcaa gctgaattta     2280
tcattagtac cgttatgcgt actgcccggt ttgagcaata tgcaatatct ggatctccgc     2340
ggttggtctg gtataaaagt agaagatgta aagggatga ctatgcttga atgttttgca      2400
```

```
gtaagctttc tcgatcagga ttactacaac cgttctgtgc aagaaattca ggacactggt    2460
tatggacctc aaacctattt tatctatttt ggaaaattta aggattacac acttggattt    2520
tctgagaatc ttatttatgg tgaattcaag catcgaaggg tatgttttgg agattgcgat    2580
ggattacact atttactgcc aagagacctt gcagaattac ttgtaagtgg caatgatcaa    2640
tgggaatgct tatgtgctcc tctgtcatct aatggttctc tatctttaaa gcacattacc    2700
attcgggact gcacaaaatt gaagagttta ttctgtgtat cttgtcccctt atgcactaat    2760 atccaaaacc tcaaatcttt gacacttaat aatttggata gtttaagtgt catctgcaag    2820
gaagatgttg ctggtttaac acaatcttta tctcggaggg gggtgttttc tcatctcaag    2880
gaattgagta tcagtggatg ccatcaaata gagaagttgc tgacgccagg ttagtgcca    2940 caacttcaaa acctgaagtc tatatcggta tcgaactgcc aatcaataaa ggagatattt    3000
gcaggagata gttcccacaa cattgcactt cccaatttaa ccaacttgca actatactgg    3060
ttaccagact taaagacagt gtgcaaagga atttttactca ttaactctga ggatatattg    3120
cacatcaaca attgtcccaa ttatgaaaaa cccagaatta gtcgtgtatg attgattctg    3180
ttgattcaga ttatggtact tatttttatgt ggcttagtct ttgtattcgt aattcttgca    3240
aagaaaaaac aaaatcataa tttgcttttt gaaatatgat actggcttt  attggtacca    3300 ttcataatcg gttcggggaa gaatgtattt ccgggcattg caatttcata tggtggaggg    3360
aggtttggca agtatccaac aactccctct ctggtctcc                          3399

<210> SEQ ID NO 11
<211> LENGTH: 3800
<212> TYPE: DNA
<213> ORGANISM: Glycine max

<400> SEQUENCE: 11
caaagtttga tttttatttt aaaatcctca attttatagt ttgtgtgtga gagagaaaga      60
tttgccctat caaactttc  ttaattgtta gcattattat aagtacccta tcatctttaa     120
gatattaagt tagtattaat agtattagta tgttactatt tgacatattt tttcttgatt     180
ttggttaaag tttgaagatg gtgactatgt tttgttttgt ctatatcttt tgttgcattg     240
aagcggctga aggagacagt aaaatgattg ttggtggttc agttaaccct caaaacaata     300
cacaattctc agctgcttta ttaggaggta cgcattctag ttgccattcc aatatattct     360
taaatcttac cctcaccaat tccattatac tattttcctt cttcacacgg atgagccttt     420 tatttttta tttaggtgat acaacacata gatttttttt ttaattctca ataatcagtt     480
ttatcatttc acacaaaaaa gttgttagtg cttaacattc ctttgaatat taaactaagt     540
tcaattttta tttcttaccg ttagcgtgac atgaaaaagt aaatttatta cattccaata     600
tatattggtg ctataaagca ctttcatata tatatatata tgaatggtta cattttttt      660 tttacttaga ttccacccttc attgaaaaaa gttaaacac  atgaaaaatt aattatttca     720
gttaaattaa ttcctttcag ttttttaaata tattcttttat ttgggtaaaa taattctttt    780
tgttatgtgt gagtttgaaa ttctttttaat ttaatatatt tctaaataaa ttattttgac    840
atataatata ttgtaaatca atttaaaaat agaattttct gtctaaagac tcattattaa     900
aacacacgag agagttgtgt tattctacag tgaaggagca acagaaaaaa tttaagaatg     960
tagcataacc aaaacaatga aacaggtgat gtagaagatc atgctgtgaa cggaggtagc    1020
aatggcgatg atgctttgac tataaataat ttgctatccg atctagcaag ggaagaagac    1080
tactttgata agaattaca gtggcgggag ttccaggcca ttaagcgcaa gagacaagat    1140
```

```
gacgattggt cggataaact aaaggacctg aaaaaaagag ttattgatgt gaaaaactca    1200
ctgcatcagt ctgggtcgac taatgaattg cccaagcctt ctgaattgca tgctaagttt    1260
atttatttat tgatagagaa gctttgggag ttgcgagatg aaaatgtgaa gaagatgtgg    1320
gatcttctgg aggatgagga agtcttcatt attggcatag atggaatggg gggagttgga    1380
aaaacattca tggcaactca tttcaagaat gagattaaaa gaaaggggac tttcaaggat    1440
gtcttctggg tcactgtttc ccatgatttc accattttca aattgcaaca tcacattgca    1500
gaaacaatgc aggttaagct ttacggagat gagatgacca gagcaacaat tttgacgtca    1560
gagttggaga aaagagaaaa aacactgctt attttggatg atgtttggga atatattgat    1620
ctgcaaaagg tggggattcc tcttaaagtg aatggcatta aattgattat cacaactcgt    1680
ttgaaacatg tgtggctaca gatggattgc ctaccaaata atacaataac aatattcccc    1740
tttgatgaac tagaagaaga agcttgggag ttattttgc taaaacttgg acaccgtgga    1800
acacctgcaa gacttccccc tcatgtacta gagattgcaa gatctgttgt aatgaaatgt    1860
gatggtttac cacttggaat cagtgcgatg gctcgaacca tgaaagggaa aaatgagatc    1920
cattggtgga gacatgcatt gaataaactt gacagattgg aaatgggaga agaggtctta    1980
agcgtactaa aacgtagcta tgacaattta attgaaaagg catccaaaa atgtttctta    2040 cagtctgcac tgtttcctaa tcatattttt aaagaggaat gggttatgat gcttgttgag    2100
agtgggttgt tagatggaaa gaggagtttg gaggaaacat ttgatgaggg acgtgtcata    2160
atggataaac tcattaacca ttctttgttg ttaggttgtt tgatgttacg aatgaatggt    2220
ctggtgagga agatggcgtg ccatatcttg aacgacaatc acacttactt gataaaatgt    2280
aatgaaaaat tgagaaagat gcctcagatg cgggaatgga cagctgatct ggaggcagtt    2340
tctttggcgg gtaatgagat agaagaaata gcagagggca catcacctaa ttgtccacgc    2400
ttgtccacct tcatcttatc tcgtaattcc atcagtcata ttcccaagtg ttttttcaga    2460
cgcatgaacg ctctaacaca acttgattta tcatttaatc ttagattaac atctttgcca    2520
aagtcgctgt ctaagttgag gtctcttact tctttagtgc tccgtcaatg ttcaaaattg    2580
aaagatatac ctccactggg agatctacaa gcattgtcaa gattggacat ttcaggttgt    2640
gattcgctcc tcagggtacc ggaaggcttg caaaatctaa aaaagttgca atgccttaat    2700
ctttcccgcg atttgtattt atcattgtta cccggatgcg cactgcccgg tttgagcaat    2760
atgcaatatc tggatctccg gggttcgtca ggtataaaag tagaagatgt aaaagggatg    2820
actatgcttg aatgttttgc agtaagcttt ctcgatcagg attactacaa ccgttatgtg    2880
caagaaattc aggacactgg ttatggacct caaatctatt ttatctattt tggaaatttt    2940
gatgattaca cacttggatt tcctgagaat cctatttatc tttgtcttga attcaagcgt    3000
cgaagggtat gttttggaga ttgcgatgaa ttaccctatt tactgccaag agaccttacg    3060
gaattacttg taagtggcaa tgatcaatgg gaatgcttat gtgctcctct gtcatctaat    3120
ggtcctctat ctttaaagga cattaacatt aaacactgta caaaattgaa gagtttattc    3180
tgtgtatctt gttccttatg cactaatatc caaaacctca aatctttgaa acttgataat    3240
ttgggtagtt taagtgtcct ctgcaaggaa gatgttgctg gtttaacaca atctttatct    3300
cggagtgggg tgttttctca tctcaaggaa ttgagtatcg agaaatgcca tcagatagag    3360
aagttgctga cgccagggtt agtgccacaa cttcaaaacc tggcgtctat atcggtagag    3420
gactgcgaat caataaagga gatatttgcg ggagatagtt ccgacaacat tgcacttccc    3480
```

```
aatttaacca aattgcaact acgctattta ccagaattac agacagtgtg caaaggaatt    3540
ttactctgta actctgagta tatattctac atcaaggatt gtcccaatta tgaaacaccc    3600
agaattggtg gtcgtgtatg attgattctg ttgattcaga ttatggtact tattttatgt    3660
ggcttactct ttgtattcgt aattcttgta aagaaaaaac aaaatcataa tttgcttttt    3720
gaaatagtat actcgctttt attggtacca ttcatagtcg gttcggggaa gaatgtattt    3780
ccgggcattg caatttcata                                                3800

<210> SEQ ID NO 12
<211> LENGTH: 23
<212> TYPE: DNA
<213> ORGANISM: Glycine max

<400> SEQUENCE: 12
gtgggatctt ctggaggatg agg                                              23

<210> SEQ ID NO 13
<211> LENGTH: 23
<212> TYPE: DNA
<213> ORGANISM: Glycine max

<400> SEQUENCE: 13
gtgggttgtt aaatggaaag ggg                                              23

<210> SEQ ID NO 14
<211> LENGTH: 23
<212> TYPE: DNA
<213> ORGANISM: Glycine max

<400> SEQUENCE: 14
gtgggttgtt agatggaaag agg                                              23

<210> SEQ ID NO 15
<211> LENGTH: 23
<212> TYPE: DNA
<213> ORGANISM: Glycine max

<400> SEQUENCE: 15
ggaatggaca gctgatctgg agg                                              23

<210> SEQ ID NO 16
<211> LENGTH: 23
<212> TYPE: DNA
<213> ORGANISM: Glycine max

<400> SEQUENCE: 16
gcttgtagat ctcccagtgg agg                                              23

<210> SEQ ID NO 17
<211> LENGTH: 23
<212> TYPE: DNA
<213> ORGANISM: Glycine max

<400> SEQUENCE: 17
aaatagataa aataggtttg agg                                              23

<210> SEQ ID NO 18
<211> LENGTH: 23
<212> TYPE: DNA
<213> ORGANISM: Glycine max

<400> SEQUENCE: 18
```

```
aaatagataa aatagatttg agg                                            23

<210> SEQ ID NO 19
<211> LENGTH: 3135
<212> TYPE: DNA
<213> ORGANISM: Glycine max

<400> SEQUENCE: 19
atgggtgggg ttgaaaaaac tactttggcc caattggtgt acaatgatga gaatttgaaa      60
cagatatttg attttgattt taaggcatgg gtttgtgttt ctcaagaatt tgatgttctc     120
aaggtcacaa aaactataat agaggcggtg actggaaagg cttgtaaatt gagtgatctg     180
aatctacttc atcttgaatt gatggacaag ctgaaagata aaaaattctt aattgttttg     240
gatgatgttt ggacagagga ttatgttgat tggcgtcttc ttaagaaacc atttaaccgt     300
gggattatta ggagaagtaa aattcttcta acaacccgca gtgaaaaaac agcatctgta     360
gtccaaactg ttcacaccta tcatctaaac caattgtcga atgaagattg ttggtcagtg     420
tttgcgaacc atgcatgtct ttccacggaa tctaacgaga acacagcaac actagaaaaa     480
attggaaagg agattgttaa aaagtgcaac ggactgcctt tagcagcaga gtcgcttgga     540
ggcatgttga aagaaagca tgacattggg gattggaata atattctcaa tagtgacatt     600
tgggaacttt ctgaaagtga gtgtaaagtt attccagcac tgagacttag ttatcattat     660
ctccctccac atttaaaacg atgctttgtt tattgttcgt tgtatccaca agattacgaa     720
tttgaaaaaa atgaattaat cttgttgtgg atggctgaag atcttttgaa gaaaccaagg     780
aaaggtagga ctttagaaga ggttggtcat gagtattttg atgatttggt ttcgagatca     840
tttttccaac gttcaaacac aagtagaagt agttggcctt atggcaaatg ttttgtgatg     900
catgacctca tgcatgatct agccacatca ctcggtggag atttttactt tagatcagaa     960
gaacttggga agaaacaaa gatcaacacc aagactcgtc atttgtcatt tgccaaattc    1020
aattcttcag tcttggacaa ctttgatgtt gttggtagag caaaatttct gagaactttc    1080
ttgtccatta taaattttga agctgctcca ttcaacaatg aggaggcaca atgtatcata    1140
atgtcgaagc ttatgtactt gagagtttta tcattttgtg acttccaaag tctggattct    1200
ttgcctgact caataggtaa attgatccat ctgcgctatt tagatctctc tttttcaagt    1260
gtagaaacac tgccaaagtc attatgtaat ttatacaatc tgcaaacttt gaagttgtgt    1320
agttgcagaa agctgactaa gttgcctagt gacatgtgca atcttgttaa cttgcgtcat    1380
cttgagatac ttggaactcc tataaaagag atgccgagag gaatgagtaa attaaatcat    1440
ttacaacatc tggatttctt tgctgtgggc aagcacgaag agaatggaat caagaattg    1500 ggagcacttt caaatcttcg tggtcaactt gaaattagga acttggagaa tgtttcccaa    1560
agtgatgaag cgttggaggc aaggatgatg gataaaaaac acattaatag tttacagttg    1620
gaatggtctg gatgtaacaa caacagtacc aacttccaac ttgaaataga tgtgctttgc    1680
aagttacagc ctcactttaa cattgaatcg ttgtatataa aaggctataa aggaaccaga    1740
tttccagatt ggatgggaaa ttcttcctac tgcaatatga tgagtctaaa attgcgtgat    1800
tgtgacaact gtagtatgct tccttcactt ggacaactac cttctctcaa ggtccttaag    1860
attgcacgat tgaataggct gaagactatt gatgcaggtt tttacaagaa cgaagattgt    1920
cgttctggga cgcccttttcc ctcccttgaa tctctggcca ttcatcacat gccttgtttgg   1980 gaggtgtgga gttccttcga ttcagaagct tttcctgtgc ttgaaattct tgaaatacgt    2040
```

-continued

| | |
|---|---|
| gactgcccca aactagaggg aagtttgccg aatcaccttc ctgctctgaa aacacttaca | 2100 |
| attagaaatt gtgagctgct tggctcttct ctcccaacgg ctcccgccat tcaaagtttg | 2160 |
| gagataagta aaagcaataa agtagcactg catgcgtttc ctctcttgct agagactata | 2220 |
| gaagtagaag gaagcccaat ggtggagtcc atgatggagg ccatcacaaa catccaacca | 2280 |
| acttgtctcc ggtctttaac attaagggat tgctcgtcag ccatgtcatt tccgggtggt | 2340 |
| cgtttacctg aatcactgaa gagtctgtat atcgaggatc ttaaaaaact ggaattcccg | 2400 |
| acgcaacaca aacatgagtt actggaaaca ctgtcaatag aaagcagttg tgattcactc | 2460 |
| acatctcttc cattggttac ctttccaaat ctcagagatg tcacaatcgg aaagtgtgaa | 2520 |
| aatatggaat atcttttggt ttcaggggca gagtcattta agagtctgtg ttctttgagt | 2580 |
| atttaccaat gccccaactt tgtatcattc gggagagaag gattgcctga agagatgagt | 2640 |
| actcttctcc caaagttaga agatctttac atatccaact gcccagaaat tgagtccttt | 2700 |
| ccaaaacggg gtatgccacc taacctgaga acagtttgga ttgtgaattg tgagaaacta | 2760 |
| ctgagcggcc tagcatggcc atccatgggc atgcttactc atctcaatgt tgggggtcga | 2820 |
| tgtgatggca tcaagtcctt ccctaaagag ggtttgctgc ctccctccct tacgtctctg | 2880 |
| tatctattta gttttcaaa tctggagatg ttggactgca cagggcttct ccatctcaca | 2940 |
| tccctgcaag aattaaccat gagggagatgt ccttgctgg agaatatggc tggagaaagg | 3000 |
| cttcctgact ctctaataaa attaaccata tgggaatgtc ctttgctgga aaacgatgc | 3060 |
| cgcatgaagc accctcaaat ttggcctaaa atttcccaca tccctggcat taaggttgac | 3120 |
| gatagatgga tttag | 3135 |

<210> SEQ ID NO 20
<211> LENGTH: 3399
<212> TYPE: DNA
<213> ORGANISM: Glycine max

<400> SEQUENCE: 20

| | |
|---|---|
| atggctgagg cagttggtgg tgcattcctc tctgctttcc ttgatgttgt gttcgacaag | 60 |
| ctgtctacag atgaggttgt tgacttcatc cgtggaaaga agcttgacct caatttgctt | 120 |
| gaggacttga agaccactct gagagtggtt ggagctgtgc ttgatgatgc tgagaagaaa | 180 |
| caaatcaaac tctccagtgt ccaccagtgg ctcatcgaac tcaaagatgc tctctatgat | 240 |
| gccgatgact tgctggatga aatttctacc aaatctgcaa ctcgaaagaa ggtatgtaaa | 300 |
| gtgctttctc gctttactga taggaaaatg gccagtaagt tggaaaaaat agttgacaaa | 360 |
| ttagataaag ttttaggagg catgaagggt cttcctttgc aagtgatggc aggggagatg | 420 |
| aacgagtcat ggaatactca gccaacgaca tcactggaag atggatatgg catgtatggt | 480 |
| agggatacag acaaggaggc cataatgaag ttgttgttgt cagatgatag cagtgatggt | 540 |
| gtactagtgt ctgtgatcgc tattgtaggc atgggtgggg ttggaaaaac cactttagcc | 600 |
| cgttctgtgt tcaacaatga gaatttgaag cagatgtttg atttaaatgc atgggtttgt | 660 |
| gtttctgatc aatttgatat tgttaaggtc acaaaaaacta tgatagagca aatcacgcaa | 720 |
| gagtcatgta aattgaatga tctaaacttg cttcaacttg aattgatgga caaactgaaa | 780 |
| gttaaaaaat tcttaattgt cttggatgat gtatggatcg aggattatga gaattggagt | 840 |
| aatcttacaa aaccatttct acatggaaaa aggggaaatt gttggctagt gtttgcaaac | 900 |
| catgcatttc ccccttaga atcaagtggg gaggatagaa gagctttaga agaaattgga | 960 |
| agggagattg ttaaaaagtg taatggattg cctttagcag cacggtcact tggaggtatg | 1020 |

```
ttgagaagaa agcatgctat tagggattgg aataatatac ttgaaagtga catttgggaa    1080
cttcctgaaa gtcagtgtaa aattattcca gccctgagaa ttagttatca atatctccct    1140
ccacatttaa aacggtgctt tgtttattgt tcattatacc ctaaagatta tgaatttcga    1200
aagaaggact tgatcttgtt gtggatggct gaagatcttt tgaagcttcc aaacagagga    1260
aaggcattag aagttggtta tgagtatttt gatgatttag tttcgagatc atttttcaa     1320 cgttcaagta atcaaacttg gggcaattat tttgtaatgc atgacctcgt gcatgatcta    1380
gcattatacc ttggtggaga attctatttc agatcagaag aacttggaaa agaaaccaag    1440
attggtataa agactcgtca tttgtcagtt acagagttca gtgatccaat ctcagatatt    1500 gaagttttg acagactaca atatttgaga actttattgg caattgattt taaagattct      1560
tcattcaaca aggaaaaggc accaggtaaa ttgatccatt tgcgttattt aaatctctct    1620
catacaagta taaaaacact gccggagtca ttgtgtaatt tgtacaatct acaaactctg    1680
gcgttgtctc gttgcgaaat gttgaccagg ttgcctactg acatgcaaaa tcttgtaaac    1740
ttgtgtcatc ttcatattga tcatactccg ataggagaga tgcctagagg aatgggaatg    1800
ttaagtcatt tgcagcattt ggatttcttt attgtgggca agcataaaga gaacggaatc    1860
aaagaactgg ggacactttc aaatcttcat ggttcgcttt ctattaggaa tttggagaat    1920
gtaaccagaa gcaatgaagc attggaggct aggatgatgg ataagaagaa cattaatcat    1980
ttatcgttga aatggtctaa tggcaccgac ttccaaactg aattagatgt actgtgcaaa    2040
ttaaaacctc acccaggcct ggaatctcta tcgatatcgg gttataatgg aaccatattt    2100
ccagagtggg tgggaaattt ttcctaccac aacatgacaa gtctaagttt acgtggttgt    2160
aataactgtt gtgtgcttcc ttcgcttggg caactaccat ctcttaagca gctctatatt    2220
tcaagattga agtcagtgaa gactgttgat gcagggtttt acaaaaatga agattgtcct    2280
tcttctgtga caccttttc ttcccttgaa acgctataca ttggtcacat gtgttgctgg      2340
gagttgtgga gtatccctga gtcagacgcc tttcctctac tcaagtctct tacaatagag    2400
gattgcccca aactaagggg agatttgcca aatcaccttc ctgctctgga aacactcaat    2460
attacaagat gccagcttct tgtctcttcc ctcccaaggg ctcccaccct taacatatta    2520
gtgatatgga aaagtaacaa tgtatcgttg catgtgtttc ctcttttgtt ggaatggata    2580
gatgtagaag gaagcccaat ggtggagtcc atgatcgagg ccatctccag catcgagcca    2640
acttgcctcc aacgtttaag attgagggat tgttcgtcag ccatatcttt tccgggtggt    2700
cgtctacctg catctctgaa ggatctgcat atcagcaatc ttaaaaatct ggaattcccg    2760
acccaacaca aacacgattt actggaatca ctgtcactat acaatagttg tgattctctc    2820
acgtctcttg cattggctac cttttccaaat ctcaaaagtc tcggaatcga taactgtgaa   2880
catatggaat ctcttttggt ttcaggggca gagtcattta agatctttct ccaaatatcc    2940
aactgcccag aaattgagtc gtttccagaa ggggtatgc cacctaacct gagaacagtt      3000
tcgattgaga attgtgagaa actaatgagc ggcctagcat ggctatccat gggcatgctt    3060
actgatctca ctgtttgggg tcgatgtgat ggcatcaagt cattccctaa ggagggtttg    3120
ctgcctccct cccttacgtt tctgtatcta tatggattct caaatctgga gatgttggac    3180
tgcacggggc ttctccatct cacatccctg caagaattaa ccataaggga atgtcctttg    3240
ctggagaata tggtgggaga aaggcttcct gtctctctaa taaaattaac cataagcgga    3300 tgtccttttgc tggaaaaaca atgccgcagg aagcaccctc aaatttggcc taaaatatcc    3360
```

```
cacatccgtc acattaaagt tgacagtaga ttgatttag                        3399

<210> SEQ ID NO 21
<211> LENGTH: 23
<212> TYPE: DNA
<213> ORGANISM: Glycine max

<400> SEQUENCE: 21
gatctagcca catcactcgg tgg                                         23

<210> SEQ ID NO 22
<211> LENGTH: 23
<212> TYPE: DNA
<213> ORGANISM: Glycine max

<400> SEQUENCE: 22
gatctagcat tataccttgg tgg                                         23

<210> SEQ ID NO 23
<211> LENGTH: 23
<212> TYPE: DNA
<213> ORGANISM: Glycine max

<400> SEQUENCE: 23
ccaaagtgat gaagcgttgg agg                                         23

<210> SEQ ID NO 24
<211> LENGTH: 23
<212> TYPE: DNA
<213> ORGANISM: Glycine max

<400> SEQUENCE: 24
cagaagcaat gaagcattgg agg                                         23

<210> SEQ ID NO 25
<211> LENGTH: 23
<212> TYPE: DNA
<213> ORGANISM: Glycine max

<400> SEQUENCE: 25
ggaatatctt ttggtttcag ggg                                         23

<210> SEQ ID NO 26
<211> LENGTH: 23
<212> TYPE: DNA
<213> ORGANISM: Glycine max

<400> SEQUENCE: 26
ggaatctctt ttggtttcag ggg                                         23

<210> SEQ ID NO 27
<211> LENGTH: 23
<212> TYPE: DNA
<213> ORGANISM: Glycine max

<400> SEQUENCE: 27
attgagtcct ttccaaaacg ggg                                         23

<210> SEQ ID NO 28
<211> LENGTH: 23
<212> TYPE: DNA
<213> ORGANISM: Glycine max

<400> SEQUENCE: 28
```

```
attgagtcgt ttccagaagg ggg                                              23

<210> SEQ ID NO 29
<211> LENGTH: 23
<212> TYPE: DNA
<213> ORGANISM: Glycine max

<400> SEQUENCE: 29
tggagatgtt ggactgcaca ggg                                              23

<210> SEQ ID NO 30
<211> LENGTH: 24
<212> TYPE: DNA
<213> ORGANISM: Glycine max

<400> SEQUENCE: 30
ctggagatgt tggactgcac gggg                                             24

<210> SEQ ID NO 31
<211> LENGTH: 23
<212> TYPE: DNA
<213> ORGANISM: Glycine max

<400> SEQUENCE: 31
gcaaacttcc ctctagtttg ggg                                              23

<210> SEQ ID NO 32
<211> LENGTH: 23
<212> TYPE: DNA
<213> ORGANISM: Glycine max

<400> SEQUENCE: 32
gcaaatctcc ccttagtttg ggg                                              23

<210> SEQ ID NO 33
<211> LENGTH: 21
<212> TYPE: DNA
<213> ORGANISM: Artificial Sequence
<220> FEATURE:
<223> OTHER INFORMATION: Synthetic

<400> SEQUENCE: 33
atgagtattt tgatgatttg g                                                21

<210> SEQ ID NO 34
<211> LENGTH: 24
<212> TYPE: DNA
<213> ORGANISM: Artificial sequence
<220> FEATURE:
<223> OTHER INFORMATION: Synthetic

<400> SEQUENCE: 34
ggttacgagt attttgatga ttta                                             24

<210> SEQ ID NO 35
<211> LENGTH: 22
<212> TYPE: DNA
<213> ORGANISM: Artificial sequence
<220> FEATURE:
<223> OTHER INFORMATION: Synthetic

<400> SEQUENCE: 35
cattatgata cattgtgcct cc                                               22
```

<210> SEQ ID NO 36
<211> LENGTH: 20
<212> TYPE: DNA
<213> ORGANISM: Artificial sequence
<220> FEATURE:
<223> OTHER INFORMATION: Synthetic

<400> SEQUENCE: 36
ctacaatacc tggtgccttt                                                        20

<210> SEQ ID NO 37
<211> LENGTH: 21
<212> TYPE: DNA
<213> ORGANISM: Artificial sequence
<220> FEATURE:
<223> OTHER INFORMATION: Synthetic

<400> SEQUENCE: 37
attacaatac ctggtgcttt t                                                      21

<210> SEQ ID NO 38
<211> LENGTH: 22
<212> TYPE: DNA
<213> ORGANISM: Artificial sequence
<220> FEATURE:
<223> OTHER INFORMATION: Synthetic

<400> SEQUENCE: 38
atggaatcaa agaattggga gc                                                     22

<210> SEQ ID NO 39
<211> LENGTH: 22
<212> TYPE: DNA
<213> ORGANISM: Artificial sequence
<220> FEATURE:
<223> OTHER INFORMATION: Synthetic

<400> SEQUENCE: 39
atggaatcaa agaattggga gg                                                     22

<210> SEQ ID NO 40
<211> LENGTH: 22
<212> TYPE: DNA
<213> ORGANISM: Artificial sequence
<220> FEATURE:
<223> OTHER INFORMATION: Synthetic

<400> SEQUENCE: 40
acggaatcaa agaactgggg ac                                                     22

<210> SEQ ID NO 41
<211> LENGTH: 23
<212> TYPE: DNA
<213> ORGANISM: Artificial sequence
<220> FEATURE:
<223> OTHER INFORMATION: Synthetic

<400> SEQUENCE: 41
agtgaggctg taacttgcaa agc                                                    23

<210> SEQ ID NO 42
<211> LENGTH: 22
<212> TYPE: DNA
<213> ORGANISM: Artificial sequence
<220> FEATURE:
<223> OTHER INFORMATION: Synthetic

<400> SEQUENCE: 42
acwaacatcc aaccaacttg tc                                              22

<210> SEQ ID NO 43
<211> LENGTH: 22
<212> TYPE: DNA
<213> ORGANISM: Artificial sequence
<220> FEATURE:
<223> OTHER INFORMATION: Synthetic

<400> SEQUENCE: 43
ctccagcatc gagccaactt gc                                              22

<210> SEQ ID NO 44
<211> LENGTH: 22
<212> TYPE: DNA
<213> ORGANISM: Artificial sequence
<220> FEATURE:
<223> OTHER INFORMATION: Synthetic

<400> SEQUENCE: 44
cttcagcatt gatccaactt gc                                              22

<210> SEQ ID NO 45
<211> LENGTH: 22
<212> TYPE: DNA
<213> ORGANISM: Artificial sequence
<220> FEATURE:
<223> OTHER INFORMATION: Synthetic

<400> SEQUENCE: 45
ttgggagaag astactcatc tc                                              22

<210> SEQ ID NO 46
<211> LENGTH: 21
<212> TYPE: DNA
<213> ORGANISM: Artificial sequence
<220> FEATURE:
<223> OTHER INFORMATION: Synthetic

<400> SEQUENCE: 46
tccagcaaag gacatcccct c                                               21

<210> SEQ ID NO 47
<211> LENGTH: 20
<212> TYPE: DNA
<213> ORGANISM: Artificial sequence
<220> FEATURE:
<223> OTHER INFORMATION: Synthetic

<400> SEQUENCE: 47
cgtcaacctt aatgccaggg                                                 20

<210> SEQ ID NO 48
<211> LENGTH: 21
<212> TYPE: DNA
<213> ORGANISM: Artificial sequence
<220> FEATURE:
<223> OTHER INFORMATION: Synthetic

<400> SEQUENCE: 48
agatgcagag acgtaaggga g                                               21

<210> SEQ ID NO 49

```
<211> LENGTH: 21
<212> TYPE: DNA
<213> ORGANISM: Artificial sequence
<220> FEATURE:
<223> OTHER INFORMATION: Synthetic

<400> SEQUENCE: 49
attagagaga caggaagcct g                                              21

<210> SEQ ID NO 50
<211> LENGTH: 21
<212> TYPE: DNA
<213> ORGANISM: Artificial sequence
<220> FEATURE:
<223> OTHER INFORMATION: Synthetic

<400> SEQUENCE: 50
acatcccatt atggttaatt g                                              21

<210> SEQ ID NO 51
<211> LENGTH: 21
<212> TYPE: DNA
<213> ORGANISM: Artificial sequence
<220> FEATURE:
<223> OTHER INFORMATION: Synthetic

<400> SEQUENCE: 51
tttccagcaa aggacattcc a                                              21

<210> SEQ ID NO 52
<211> LENGTH: 21
<212> TYPE: DNA
<213> ORGANISM: Artificial sequence
<220> FEATURE:
<223> OTHER INFORMATION: Synthetic

<400> SEQUENCE: 52 tcccctttatg gttaatttta c                                             21

<210> SEQ ID NO 53
<211> LENGTH: 22
<212> TYPE: DNA
<213> ORGANISM: Artificial sequence
<220> FEATURE:
<223> OTHER INFORMATION: Synthetic

<400> SEQUENCE: 53
aggaagactt tctccagcca tt                                             22

<210> SEQ ID NO 54
<211> LENGTH: 21
<212> TYPE: DNA
<213> ORGANISM: Artificial sequence
<220> FEATURE:
<223> OTHER INFORMATION: Synthetic

<400> SEQUENCE: 54
cccaaatgcc agggatgtgg c                                              21

<210> SEQ ID NO 55
<211> LENGTH: 20
<212> TYPE: DNA
<213> ORGANISM: Artificial sequence
<220> FEATURE:
<223> OTHER INFORMATION: Synthetic

<400> SEQUENCE: 55
```
tttgagggtg cttcatgcag                                      20

<210> SEQ ID NO 56
<211> LENGTH: 20
<212> TYPE: DNA
<213> ORGANISM: Artificial sequence
<220> FEATURE:
<223> OTHER INFORMATION: Synthetic

<400> SEQUENCE: 56
tgacggatgt gggatatttg                                      20

<210> SEQ ID NO 57
<211> LENGTH: 20
<212> TYPE: DNA
<213> ORGANISM: Artificial sequence
<220> FEATURE:
<223> OTHER INFORMATION: Synthetic

<400> SEQUENCE: 57
tttccagcaa aggacatccg                                      20

<210> SEQ ID NO 58
<211> LENGTH: 20
<212> TYPE: DNA
<213> ORGANISM: Artificial sequence
<220> FEATURE:
<223> OTHER INFORMATION: Synthetic

<400> SEQUENCE: 58
tctccagcaa aggacatcta                                      20

<210> SEQ ID NO 59
<211> LENGTH: 20
<212> TYPE: DNA
<213> ORGANISM: Artificial sequence
<220> FEATURE:
<223> OTHER INFORMATION: Synthetic

<400> SEQUENCE: 59
caaaggacat ctctctatga                                      20

<210> SEQ ID NO 60
<211> LENGTH: 20
<212> TYPE: DNA
<213> ORGANISM: Artificial sequence
<220> FEATURE:
<223> OTHER INFORMATION: Synthetic

<400> SEQUENCE: 60
aagcctttct ccagccatac                                      20

<210> SEQ ID NO 61
<211> LENGTH: 20
<212> TYPE: DNA
<213> ORGANISM: Artificial sequence
<220> FEATURE:
<223> OTHER INFORMATION: Synthetic

<400> SEQUENCE: 61
ggaaaggctt gtaaattgag                                      20

<210> SEQ ID NO 62
<211> LENGTH: 22
<212> TYPE: DNA

```
<213> ORGANISM: Artificial sequence
<220> FEATURE:
<223> OTHER INFORMATION: Synthetic

<400> SEQUENCE: 62
acagaggatt atgttgattg gc                                              22

<210> SEQ ID NO 63
<211> LENGTH: 20
<212> TYPE: DNA
<213> ORGANISM: Artificial sequence
<220> FEATURE:
<223> OTHER INFORMATION: Synthetic

<400> SEQUENCE: 63
ggcatgggtt tgtatttcta                                                 20

<210> SEQ ID NO 64
<211> LENGTH: 22
<212> TYPE: DNA
<213> ORGANISM: Artificial sequence
<220> FEATURE:
<223> OTHER INFORMATION: Synthetic

<400> SEQUENCE: 64
gatattctga aggtcacaaa ag                                              22

<210> SEQ ID NO 65
<211> LENGTH: 20
<212> TYPE: DNA
<213> ORGANISM: Artificial sequence
<220> FEATURE:
<223> OTHER INFORMATION: Synthetic

<400> SEQUENCE: 65
aatagaggcg gttactggac                                                 20

<210> SEQ ID NO 66
<211> LENGTH: 20
<212> TYPE: DNA
<213> ORGANISM: Artificial sequence
<220> FEATURE:
<223> OTHER INFORMATION: Synthetic

<400> SEQUENCE: 66
acaagctgaa agataaaaag                                                 20

<210> SEQ ID NO 67
<211> LENGTH: 20
<212> TYPE: DNA
<213> ORGANISM: Artificial sequence
<220> FEATURE:
<223> OTHER INFORMATION: Synthetic

<400> SEQUENCE: 67
gaattgatgg acaagctaag                                                 20

<210> SEQ ID NO 68
<211> LENGTH: 31243
<212> TYPE: DNA
<213> ORGANISM: Glycine max

<400> SEQUENCE: 68
ttttctcttg aactgataat caaatagtta ttgagatttt taattgagct gcatttgtta     60
agaagtcacg gctaaaagag ttacctagtt gtcagttata ctattttcat gactaagcag    120
```

```
caagcacaga tattgcagtg atacacaacc gagagcatat tctccaaaag gcaaattgcc    180
ttgatgcaat ttgctagttt gtacactgat agaattgctt atttatcaat agtgttccaa    240
tgtataggta tctcatggca ctgattaagg ataaaacatg gtgatttatt cctttctaaa    300
atcttttgtc cctgcacaag ttgtttatat taaacattgt ttaccttact tttgctcaca    360
agatgaaaga aggaagaaga tagttgagat gggtggagct caagaactct taaatatgtt    420
aagcactgct aaagacgacc gtacacggaa agaagcattg catgctcttg atgcactgtc    480
acaatcaggt gaaatcataa tttttaatatt tttttaaata gttattatca tgctggtgga    540
gaggtagatt attgtgatca attagtacct ttgtggttct aaatagtaaa ccagaaatgc    600
ccaaccactt atggaatttg ttaatttatt tgtataatat tgagctggaa atcaattta    660 tgagcaaagt gtgataagaa gcatatgaaa cttttatatg tttccagttt ctgttatcct    720
tattcaatag atatgggctt gtaaagatga aaatgaacat aaattgtttt gtgcattaat    780
tttgggacat attatacgtg cacaagctta tgtgtaacaa tatctatacc tgctactttc    840
cctgtcaaca tattgatttt taagaatcca gttcaagtaa tatttatgag gttgaaagat    900
atgcaacagt acaaccaaat tagtagtgct agctagtact agccttttct gttctctttc    960
gattgagata agctacttca atgttataga tgaagctctt gcatccttgc atcatgctgg    1020
ggccatttca gtaattaggt ctgcaccaaa ttcacttgag gatgcagaag ttgagggatt    1080
caagttgagc ttgatgaaaa gatttcaaga tctcagatat gatgtgccat catgacttga    1140
ggtgcatgcc tccttttgct ttatgttttt ggttggttgg agcatgaaat aacatgatat    1200
gagaaattaa gctggcaacc aaagcttttg tggggaagag tacttgaaat tactgtgtat    1260
catttgacca aatctaatgg aagattatag ttctattgtc attttagttt ttttcacttg    1320
tcaaatgcga tttgtcgctc attgttctgt caatcataat aaaatggaaa agatttatgt    1380
gcatgtcaat ttttattttt tgaaatatgt gtttagaaga taaagatta caacaaacta    1440 gtattgaagt tgtaagtgtt tagatactgt aattgtatat ttggttaaca ctactagatt    1500
aaatttaagc ctcaactttc aaatgtgatt gatcatataa tgtcataaaa tgtgtgtaat    1560
tataggttga tgctttaatt gttatttaca tatgcctcaa ctctcaaccg tatgtcatca    1620
tcaggcttct tgtttaggtt cagctggcgc cttgctcgtt ctattttgtt cgtattcctt    1680
tgttcattcg atgtttttttt aggaaaatat gttcgttgaa agaaaaatc agtcaacaga    1740 agatacatgc ccttactttt ctctactcca cgtctccacc taccctaacc cttggagtta    1800
cttttcaatt gagcacgtta acaagcctaa ctaaacgtgg ttctgtggag ataatatact    1860
aaaaaaatat tatttttat ttaatttaat aagacttgtg cgcgtaactc ttttcaaagt    1920
gctagctttc ttttttggtg aattttcaaa gtgctaggtg aatatgcgta tttgagata    1980 gaaagctttt ttttttggga cacaaaagct tgtttaacat gtgataaact taaaactaat    2040
aatcattttt tttaattatc cctattcaat gttttagttt taaaaatacc ccatttggga    2100
aaatagccca tctgtggatg taaaaattac tagagtacaa gttaattagg gttagttgtt    2160 tttttttct ttcttcttttt cctacgagat caagaggaac ggagcaaaat catgttttttt    2220 cttccaccaa ataatgtaa aatttaaaa caaaatacta aataataagg ttataatata    2280
tttcttttcc ttcatttat acttagtctt ttattttttt taaaaatatc attctagtta    2340
tttaactctc acatttgagt taatgttata cttttgaaac ttcagtcatt tttatttat    2400 tttggatacg attttgagcc tttttttctttt tactaattaa agatataaaaa tttgtctcat    2460
```

```
taaattaaac tatgaatcca attaatgttc aaacaaaaca taaatcctta acatgatgaa    2520
aattgaatga aaaatgaatt tcataagcaa ttggaaaact gaaaaaaaaa atctaataac    2580
aatatttgaa aatctattaa caatgagcag taggcttctt tggaacttga atgaagaat     2640 aaaagagtca ttggaaataa atctcaatta attgaaagat attttttaga aaatgtcatt    2700
aaatagaata aaaataatca aaatttgctt atatttgaat ctaataaaaa aattgttaat    2760
tactcttttt gtctcgaata taaacaaaaa atactttgag tattagtctc aaataaaagt    2820
aaaatttaac tattgttact ttatttaatg agatattcct aaattatatt ttatttaatt    2880 aaagtttat tacttattat ctctcttttt tattttgat atgaactttc aagaaagtgt      2940
agtttagaag aagaattttt tttaataaga aaggtgtaat taaataatct aattatctaa    3000
ctactaactt tttgaataaa ccgtaagtta atttcttta tatagaaaga agggattaaa     3060
ttaattttaa aagagttcct cttcatttta atcattaatt tttttgaaat tcaataatca    3120
atacctactc attacaataa taaaatacaa aaacttcttc acgaaataaa ttgattcctt    3180
gtgttatata tatatatata tatatatata tatatatata tatatatata tatatatata    3240
tatatatata tatatattca gtatataatt tagtgtagct ggacacatat tagtgccccg    3300
tggccgtgtg ttgtgctttt ttgttgggcg aaacaacggc caaagcgacg aatcacttcc    3360
ttacgtgaca cacctctgtc taatagacga taggccaaag tcacaaatac tttttgattg    3420 agtattttt aatgccacat atcatatctg tcagcgtcac atgttcaaat aaatccctag     3480 taaaacgcc agaaaacaaa tgcatgagca attttggac tttggactag ttacaatttt      3540
tcaacgtcac atctttaaat gatttcgtct ctatttagta gttgttttta atgcggccat    3600
gcccactttc tcgttacaaa gcatgcattt tattatttga acgaaaatat ttaatattgt    3660
gtattactcg ttttacacaa ttgcttttat tctttttttt ttatttttta aatacagtca    3720
tctttaaaaa caaaatcttc gatcattcca tttcattgtt cacaaaacat tatcctatca    3780
catgcaccct atgtaatata atacacggtt gtggataaaa taattctgca cctgcccaac    3840
ttttgtattg atatcatttt tttatttcct ctatattttc catatttata tattaattct    3900
atcactttcc tgcaccccaa taagtcatgc tccaaatatt attgttttgg ataagtatat    3960
tgcacaatct attcttggct tcttcatgac catgacacgg caatggagac gaacgataat    4020
gaaaggcgcg taaatcattt gaaaggttga attatgtacc aaatgctatt atattagcat    4080
ttcatacgcc attctaacaa taatgagaac gagttgcccc acaattgatc aatatttgta    4140
tccttgcacg gcacaaactt gtaagatatg gccccaactt cgtcacccca tcaagttgat    4200
ttcatttctt taatatttgg tattttacat agaaatgctg ccacaagaca tgaattctac    4260
aataaacaac aagggatcca aaatacaaaa gtaacacaat cgccacagca accaaatgcc    4320
tctagaatct ccccagccat accctctctc cccaaataaa attttctata catataaaaa    4380
aaacaataga aggggagaaa tgagagaacc agcttgtatt tatgacttgc tactaaaagc    4440
attatatatg ttggtggaaa tggcaagcac acttgtaacc acagctagta taatcattat    4500
cagtgcaata attttgtctc ttctcgttga tatacccttta acatccctgt catcagaaac    4560
aatgaaaatt aagagactaa tttatttatt tattcaattc aattttcaac ttgagctcta    4620
ctttatcaga agtcaataag tctatgctag attaccttaa aacaatagag ccggggaaaa    4680
tgaaggcaag gcacactgcg gatgaggatc ccaggaactg aaagaagtac caaatatctg    4740
ggattgctat agctgcaagg taggagaata caagcagcac cagagtgagg atcataaatc    4800
ttttgttgtc tgtggctagc ataggcttct tagggaagag aacttcatct atgttggttc    4860
```

```
tcaaagagaa gttcaagaga ggaaacacca gcatgatgtg gagggcatag cttacacgga      4920
ccaaactatt gagcaaggaa ccaactgctg aaccagcatt ctggtcaaaa ttgatgagaa      4980
tgtctgactg ggttgaatcc ccaaataaca tgtacccaaa taagcctatt gcaaggtaga      5040
tcacagcaca aagcaataat gctaatcgaa ctgctgttgt catttgggat gccttggcaa      5100
gctcaaaccc aatggggtgc actgaaagta aaatcaacca tcagcacaga aattttctag      5160
gcatacccct aaaaaaaatg agcaaatcca ttaggccaat taccattaaa gtgaaatgtg      5220
aaggctgtga caacaacagg aactgcagtg aacagatcaa agaatgaggt ttggtagtct      5280
agccgaggaa acaatctagg agtttgtgtt tttccttgca ccagagctgt gatagccaac      5340
ccacaacata tgccaacaaa tgccactgca agaagagttg acactgcaga gctgtacttc      5400
aaggactcta ccaattccaa aacaccaaga ggaagaaccc atgttagtta ctgaaactct      5460
tcaattccaa atacacaaga aagcatgtta tataacaaaa tattcaattg taacactcac      5520
ctacacgttt gtacaatacc aatggaagca taacaaagac caaggtgaaa agcaaagcaa      5580
attcccggga attccaccag tgaattccaa accactgttg caaaatgccc aaatgcactt      5640
cccctccatt ttgctttcca gatagcacat ctcctgttgt tcaacaaaag gtaattatta      5700
aaatacatct atttttttct ttcatcttct ttctactaca ttttcttctt atatttctct      5760
ttatttcctg tcatttcact ttttttttttc ctgtctttct tctacccatt acatagacca      5820
aaaattgagg tgtgcattgc ggaaacagat tccccacatt cacttttttt ttcatgaatc      5880
agaactatta gattgaatat cgaaggttat atttggaata catattttaa gagtatgttt      5940
ggatacaaag ttagaagtgc atttgacaac ttttgggagc tcctctaatg gaaaaagatt      6000
aatattttta gtagaaaact ctcaaaaaca cttctagttt gtatcgaaac aggcctaagt      6060
tagattcatt gagataagtt atgagtaata caatctgtat ttaacagtga attcccagcg      6120
gtaggaaatc ccgatcctta catttccatt atcttgttaa attaattacc atacacaaac      6180
attaaagaaa acgacttact acatatattt tttcaaaaaa tgaacctttc tatttatagt      6240
aaaaaaaata aaaacaaat ttcacttatt attagcaaca atttcaccaa tcaaaatgaa      6300
tctgactgaa aacccggcaa aactcagaac aagcatacca aaccaaaaac atgaaaaaat      6360
ctacattttt ttttcctttt ttacgaattc agtagaaagg aaattaaaaa aaagggaaa      6420 agttccgtta cgttaccgat gatgataagg tagagaatta aaccccaac gttggtgatg      6480 atgacgcaaa cttgcgcggc taatgctcca cccgatccga acgcctccct catgacgcca      6540
gcgtacgtcg tcgtttcgcc ggagtgcgtg aaccgcatca ggaagtccac ggacagttcc      6600
gccagcacgg ccaccacgag aatcatcgcg aaagcgggaa ctacgccgag aaccttcatg      6660
atcgccggaa tcgacatgat tccggcgccg actatgctgg tggccacgtt gaacaccgcg      6720
ccggggacgg aagccggcgg cggcgttcct ttggaatccc ccaggagggg gacgctgact      6780
ccggcggccg gagacatgcc ggaggcaaaa ttgtgaggat cggagaaagt gcggtggcgg      6840
tgtgcggtgc ctggcagcct actatctttg aattgaatgg ttttgtgttttt gttgtctctc      6900 acgaaaattt cacttcctct ctctttataa atgatacaag tggatttggg aagttaagaa      6960
aacaaaaaat gaagttataa taagtaagat tttattttat aagttttgta ggatgaaaag      7020
aaatatagtt gaatgaggaa atttcattga aaatagttag ctagatttta taatagagat      7080
taaacaataa taaaatctgc agatacttca acatgagtat gataataata ataataaaaa      7140
attgttgttt tctattttta ctccaacatg gactgaaatt catatgaatt ttttttgaata      7200
```

```
gtctatttttt tttatttaa tttaatattc atatcaaagt tatttcatac tgaaaaaaat    7260
attaaatact agcattctat tattaccatt tggaggaatg attgaaagag tgttaaagtg    7320 cacctttca gtcaacagtt aaaataagg cgtttaattc aattcaatat acaaagtta     7380 agttggctgt ataataataa cagtggtagt aagtagtaga gtgaaagaaa aatttttttg    7440
gtcaaaatat ttaaatcaag actagaagat atgcaaatca gagattacat tggatgatac    7500
ggtcgaccaa taaaaataa aagaaaaaac ataaattggg atgttcaaat actaataata    7560
ataactctaa acaaacatta acacgtgagt tttctttccc acgttgtaat cattttgaat    7620
ttttaaaatg ttatgacaca aataataagt taataataat tataatttaa catttgaatt    7680
gataaaagtg tttagtttta ttgtagatta aactaatctt tcttcgagta aaaataacat    7740
taaattccta cacaacaggt ttatcagttt atagagtaat aacactctta ttcttaatcg    7800 ttttctttc tggaagaaaa aataaatctt agtcttgtta tttttttgag aatgtaaaat    7860
ataccttaaa aaattccctt aaagtttgta taatttttg gtatgtaaat atatttataa    7920
ataaaaaaat gtttgcgaaa agtaatattt acataacaaa cactatttac agaacattga    7980
tgaaattatt tttagatata taattattaa tacgaatata tgaatatgtt attaaagtaa    8040
tcaatagtta tgttaaaact gatctgttga ctagacagtt tgtcaattta ttttttattc    8100
acttaattgc tattttttc taggtttgtt ctttcgttaa aaaaccttgc attggaggaa    8160
ggccaatgct agttataaaa atataaacca tgatttgaat ataaaattat ttttagtcga    8220
aaaacaatga attatgttgc aagtatcact attgaaaaaa tgccaacgga gcccaagaag    8280
gtgaggccca aactgaaagc gtgaagcggc ccaagactga gtgaggaaat aaataattat    8340
ccagaaaatc ggaaatggac aatccttctt gttacgcaat tctgaatttg cgggttttgg    8400
atttggactt ggtcgtcaac acagtctaat taatatctttt ttgctccttc gcttatgaat    8460
cttcttcttc ttcttcttgt tcctgcaacg cactgaattc gatcaatcaa tccatcttca    8520
attgctttgt ttcgatcgga ggaaaatggc cgatcagtta tcgaagggag aggaattcga    8580
gaaaaaggct gagaagaagc tcagcggttg gggcttgttt ggctccaagt atgaagatgc    8640
cgccgatctc ttcgataaag ccgccaattg cttcaagctc gccaaatcat gttttcctc     8700 tttctctcta ctttttttaa attccatttc gtgtctcctc aaaatgctga tttagtgtca    8760
taaatcataa ttattattct cttctattgt tgttattttta ttgttattac ttcaatcgac    8820
gagtgtgttg agttttgagg tgtccgattt cccgattaat tgaagtatag ttttaatctg    8880
attttactgg aaaatatttt ttgcctgatt ttttttttt ggaacaatta ctagcatata    8940
aattagaatt gtggatgaag tacgacaatc aactctgtgt tgtttgtgac tgcgctcact    9000
ttcaatttga cgactaatct ctttattttg ttgaaagtga cgaactttga aattgatgtt    9060
ggaatagttc tgtttattgt tcttgatttg atctatgtgg cattttaggg gacaaggctg    9120
gagcgacata cctgaagttg gcaagttgtc atttgaaggt aacattcatc agacttgggg    9180
ttttggagtg ggctgaatct cttttgcatc ctttagttct ctattaagcc tgcatgacat    9240
tgttgtgttc tgtttccatt tagttggaaa gcaagcatga agctgcacag gcccatgtcg    9300
atgctgcaca ttgctacaaa aagactaata taaacggtat gcatgtgtct cagttgttac    9360
cactacatgc actacaatac tttctcattt atgatttgtg ctttaaatgc tgctcttgct    9420
tccatgcagc aaggccaatt ccttttagcc tcaatgtttc tctgtataac tttaatgtaa    9480
atcatataaa acaattgcta ccttttttgca tgaacaaatt atataaagca aatctctttg    9540
tttaatcttt acatatgtgt aaatcaaata ctgggcttca tatcgataag gtctaagtag    9600
```

```
gggttcagtc tttttatttgg attagtttaa gtcagaaatt gaagttaatt tgtgcttgca   9660
taagttgctt ccatctgatt gctttctttt tatggctgtc tgtatgtcat agccttattt   9720
tgatttgtta tttgctgact attattagat tggaactcat gatcatatcc ctaagcagga   9780
gcaaattatt ttgctgtctt gcttgtctta gtatgtccca cttgcattag gaagaactaa   9840
gacaattaaa gttacctttt ctttctttga atacagagtc tgtatcttgc ttagaccgag   9900
ctgtaaatct tttctgtgac attggaagac tctctatggc tgctagatat ttaaaggtat   9960
attatgttta tgatattgat atctcttctc ctgggtatga tttttaattt attctcttgt  10020
ccatatccca gattttagat attgatcctg caataaaatg cgttgaagta tactaagtta  10080
tctgaatccc cattaacatg ttttaactgg gttcactatt ttatacacag gaaattgctg  10140
aattgtacga gggtgaacag aatattgagc aggctcttgt ttactatgaa aaatcagctg  10200
atttttttca aaatgaagaa gtgacaactt ctgcgaacca atgcaaacaa aaagttgccc  10260
agtttgctgc tcagctagaa cagtaagata ttgtcctttc tgcatatatt atctctttta  10320
ttatgctgat gaattgatca atatttcttc aacttgggtt tattctttaa ttggttagta  10380
atttcttctg agaactttct ttctggcctt tattttgttc agtacccttt ctctaaccca  10440
ctctcctcag gttaacatta gcttaggtca gtgtaggttg tttgacactg agttttatt   10500 ggtatggatg tatggtctat tatgatctca atggaaatct agcatatttt ttttccacaa  10560
tccataatat gatgacttgt gtacatggtg tgaataaaag tcagtccatt gctgcatttg  10620
gtattggtta cgtgttactg tactttctgc atatattatc tcttttatca tgtcgatgat  10680
ttgattaata tttcttcaat ttggatttat tctttaattg gttagtaatt tcttctgtga  10740
acttctagtt agagcatgaa ctgctaaaga aatccaaaac tttatttttt acatggaagg  10800
aactttatca gagtttttatt tatttattta tttttatgtt aaattgaact ttaactgttt  10860
ctatgttatg ataactcttc ttcagatatc agaagtcgat tgacatttat gaagagatag  10920
ctcgccaatc cctcaacaat aatttgctga agtatggagt taaggacac cttcttaatg    10980 ctggcatctg ccaactctgt aaagaggacg ttgttgctat aaccaatgca ttagaacgat  11040
atcaggtcta agttttttca atagttcact tctggagact ggacagctta tttgttgcta  11100
aattattcag atatgttttt attttgcagg aactggatcc aacattttca ggaacacgtg  11160
aatatagatt gttggcggta ggtcactggt tttgaaattt cgttatgaat ttttttatgac 11220 caagtaaatt ggattagaat atttgaactt cttttgtagct gtctcctggg tcataatgtt  11280
ttattatatt tttgtatttta tcatagcatt gtgatagccc tgttactact ttgtttgctg  11340
atttactcat acatttgcca gatgaaactg acattttttt ttaatcctgg tggataggac  11400
attgctgctg caattgatga agaagatgtt gcaaagttta ctgatgttgt caaggaattt  11460
gatagtatga cccctctggt aagctccaaa agttgttaaa taggataact tctagtggtg  11520
tttaacaaaa aaaaaaattc cacttgtatt ttttatccac atttataac agaataatca   11580 taacctttca caacttaatt ctcaattttc acagtaatta aatgtgtaat tttaaaaaaa  11640
tattttcctt aacttaaacc tgattgaaat ttcccctga aatttaagtt ctatttgatt   11700
acctagagtg taatttccgt gttttgtcac ttaatcactg tgtaaagtta attttttgc   11760 ttacaaaggt gtcttgtttg gaatgctaaa ataacaagta cacgtgtcac caaatttagt  11820
aggattaaca tttgttgttt tttgccataa taaacggttg aacttaacat tgttgtacg   11880 tgtcatcaaa ttctacaaat tgtgagctgc ttagtgggtt ggacaaacat tttagcaggt  11940
```

```
ggtttcgatt gcctgttgaa tacgtgaaat taaaccaagg caaaattata atttgtttct   12000
tttgtctgtg tttcactcat acacattgaa tcttgatgat acacagcctt gttaattgtt   12060
atccttccaa ttttttttag tgttttgag catctattct tgttggtcat gtgttttctt   12120
cactcatgta cctggttctt ttcctacaac gataaatatg tatcctttgt tttttttttc   12180
caactaaata tgtaatttca aatttctaat caatcattgc ttccaaaata ctctctctgt   12240
ttcaaaataa gtattatcct atattgtttt acaagaccaa gaaaagctaa tatatagatg   12300
aaagaaatta gtaattttac aaaactaacc ttagtattaa tattatactg aaaaactaaa   12360
ttgacactta ttaggggtgt tagtgtaaaa aagcaattaa tattcattg aaaagctaac   12420 atgatactta ttttgggaca acttttttct ttcaaatgca acacttgttt tggaacggag   12480
ggaatactag atattgtgct cccttgtatg ccctggacat aacgtattta actggtctgg   12540
atgagtttat gaatgtcatt aatttagggg gagtcattta gaatagctta cctataagta   12600
ctttctaact tttctcaatt agtttcacag tgcaattat taaaaatgtc tgtatctaat   12660
caacattgtc tgtgtgcttg tgcaggattc ttggaagacc acacttctct taagggtgaa   12720
ggaaaagctg aaagccaaag aacttgagga ggatgatctt acttgaattg tacctttaat   12780
attcctggtg gttggaccta ttgtttgatg atttacattg tactactatg tgtgtctgtc   12840
cagttgttcg tcttacacat ccacttacag agtgtacctg ctttggtttt aattgaattg   12900
gtctgactga attcaaaaaa tgagttttta atgaggttgc tggagtctga tcttatctac   12960
attattatga attgaattac tatctatact tgttttacac caggtttatg cgaacctgtt   13020
agcaatacta atccatgtta ctttatgcgg ataatccata aaacagaaa gaattaacca   13080 tcacaattta ttgataagta tatgatagca tattttaccg agagttgaaa tttgaaaata   13140
agtcgtttct gtatgatttt tgcttatttt gaccgacatt aaatacctac ctggtaaaga   13200
aggatggaac atatcaaggt agggtatttc ttattacaag acaaacaaaa aatatagtaa   13260
caaactgggt gttaaaaaag tcgtgtaatg aatggacggt ccgcaaccgc aaattatacc   13320
tttgaactag aaaagtctat agcttccttt cttttctttt ttccgttcc tagactgttc   13380 tacttttgt aaaggaaaag attcaaaaga gagaacgcaa aataccacgc ggcaatttt   13440 tactttttg cttgattatc ttatcgtgga attccttttc caatctcaat aacttttat   13500 tttcaaatgt gttttagat tttatacttt tgtcaatcag gttcacctac tttattatat   13560
tgataaactt ggtcctcaaa ttttaataa cctgaaaaat tattttcaat tcattaagaa   13620
atcatgattt ttcaaaatta gaagtgactg aattcacata ttttttaaag tttgagaact   13680
aaatttaaca atttaaaaat agagattcat catgtttcac aaaaaatata aggactagaa   13740
atattttttc ttcttcaaca atttactctt aacattaggc taaaatagaa tatttgttct   13800
tacggtttgc cactttagga acaaaattta acttaaaata caaataaagg attaaaaatc   13860
cattttaact tattttaat aaaatactgt atgatcatta atctaattaa tatgtttttt   13920
tcttgatgaa agtatgactt tgttaatcat aataatctaa ttatacgaag aatcgcgtga   13980
ccttatactc gtgcttggaa ataaaagaga gacatttgat aaaattgcttt aacttttgat   14040 cttctttctt acgtagtagt ttttttgtccc acaaaatgaa ttttgcatgt attcagtgct   14100
tccttcttcg gcttcacttt ttctggccgg tggcagccgg taaccagtag tcatatttgg   14160
atgttaaaga gacagaaaat cttaatcacc gctcattgtt tgactgcatt gttacctgcg   14220
actgcgagta cgtggattca ttcttgtttc gccaagtgta tgagtgcgtg tcagtgtgac   14280
tcttttttgt aacttttcc tttgtattag cgcttagact tttgattcca aaccatttt    14340
```

```
cttttctttg tttctgaaat tttatcaatc aaacataact ctgaggaaat cacacttccc    14400
cggccgtcat gagtcagcta attaattggt atgtctaatt ttcaccacca ccttatcggg    14460
tcttcaaaat ttaatgctat tattctcaga tttcttttct tgttcctaca ttctgacttt    14520
gcatctgtca ctgttctgag aactgaattt tgttgaatta ttagaaaaat agaaatagat    14580
tctgggtttt catttctagt tttaaaattg tttattaagc atatgaacac cgtcaccact    14640
caccatagct caattctctg tctttatttt tttatttatt tgctttgata ctttccccgg    14700
tgcttatatg gatgcataga aatagaaaat ttgctacaga cttgtaacct tggcatagtt    14760
tcttcatgtc ttcttcgcag tattttctg tacctatatc attgatgata cggttctgat    14820
ttgatcgaga aagctcagtt ttttatcaga atggtttcgg ttgatgatgg gattgtgaat    14880
cccaatgatg aaattgagaa atctaacggg agtaaagtga atgagtttgc atctatggat    14940
atttcagcaa ctcaaaaatc atatctgaac agtgaagatc ctcagagaag gcttcaggga    15000
accttaataa gttcttctgt tactaatagg ataaactttc ttaaatttgg ttctgcatct    15060
gccaaattca aaaggcttgc tactgagaga gaccaggttt ctatatctgt gccttctcct    15120
cgttcaaaga gcctaagatc acgtttcagt ggcatgtttg ctcagaaact tgactgggct    15180
tcagtcaaga aaatgtgcat ggaatggatt agaaatccag tgaacatggc ccttttttgtg    15240 tggatcattt tgtcgcggt ttcgggtgct attctgttcc ttgtcatgac aggcatgttg    15300
aatggtgtgc taccaagaaa gtctaagaga aatgcatggt ttgaagtaaa caaccaaata    15360
ctcaatgcag tgtttacact catgtgtttg taccaacacc ctaagagatt ctaccacctt    15420
gttcttctga ccagatgaag accaaatgac atctctagcc ttaggaaggt atattgcaag    15480
aatgtcactt acaagcccca tgagtggaca catatgatgg tagttgtcat tctccttcat    15540
gttaactgtt ttgctcaata tgcactttgt ggtctaaact tagggtataa aaggtccgag    15600
agacctgcca ttggagttgg aatatgcata tcttttgcaa ttgctggttt gtacaccatt    15660
cttagcccac ttgggaagga ctatgattgt gagatggatg aagaagcaca ggttcaaatt    15720
acagcttctc aagggaaaga gcagctgaga gagaaaccaa ctgagaagaa atattcattt    15780
gcatccaaag atcaacaaag ggttgttgaa aatagaccaa agtggagtgg aggaatactt    15840
gacatttgga acgatatttc cttagcatat ctctcacttt tctgcacctt ttgtgtgctt    15900
gggtggaata tgaagaggct tggctttgga aacatgtatg ttcacattgc cattttatg    15960 ctgttctgta tggctccttt ctggattttt cttttggctt ccgttaacat agatgatgac    16020
aatgttaggc aggctctagc agctgttgga atcattcttt gttttcttgg tttattgtat    16080
ggtggatttt ggaggatcca aatgagaaag aggttcaatt taccagccta tgacttctgt    16140
tttggcaaac cttcagcttc tgattgcaca ctttggctac cctgttgctg gtgctctctc    16200
gctcaagaag cgcgtaccag gaataactat gatcttgtag aagataaatt ctcaaggaaa    16260
gaaactgata ctagtgatca accatcaatt tcacctttgg ctcgtgaaga tgtagtgtca    16320
accagatctg gcacaagttc tcctatgggt agcactagca actcttcccc ttatatgatg    16380
aaaacatcta gttctccaaa ttcaagcaat gtcttaaagg gatattacag tccagataag    16440
atgctatcaa ctttgaatga agacaattgt gaaagaggtc aagatggaac aatgaacccc    16500
ttatatgcac aaaaataata tcaaaatact atagacatta actctgtctt atcatctttt    16560
atgaatctca atatatttct gtgcatatat cagcatcagc gtcactgaat tccttggaca    16620
ttgacactga acactcatgt atgagctgga gatatttatt gtctttattg aacaaattca    16680
```

```
agaaaaagaa gaagaaataa gcctcgaact ttgattctta aaaatgtgta tttcatttta    16740
atatctaatt ctctaaaact tttactttaa tttctaattt gatatgttgt catataataa    16800
aatataattt agttttctc  atttcatttt tattggtata aaaaattaaa aagaataata    16860
ttttataata ccttacacat caacaaacaa agtgaagatt tttatgcaat aaaaaaatta    16920
agccattaat acttatacta aaatgaaggt ttactcaaac aaattataaa aaaaaaataa    16980
ataagtaaga cattaatata atgtagatac ccaacaacat aaatggtcga cgtgtcacgg    17040
cacacaatcc aattttcttt gctaaaatac tataaagtat aaacaaaaga gtatatgatt    17100
agcattacca atgaacgtta aaaaaaaaaa aaaagcatta ccaatgaagt tggggccata    17160
cttcccttag taccaaaaag aaaagcatat gaagttgggt ttaacagaaa agagttagtt    17220
ctactgtgaa atttgtctaa atttaatatc cggtcatatt taaaatagaa ttacctttaa    17280
aaaaaataca tgtgagaaac taagaaaaa  ttgtttaaca ttaaaaccat cgacactcta    17340
taaatgatgc cctatccaca gaccactctt tagtgttttt aatacccyga ctcagcaagc    17400
aatataatcc acttactccc caaacctaaa aaatatacaa aagtcaaaca aaatgctatt    17460
tatgtgacca ttttaaatac aaggaaattg gagtttcaga tcttttttc  tttgcaaact    17520
tgccaccttt gaagtgaaac ataagacgaa atagatagtg acacactgac agtgacacct    17580
aaatagtagc tacattgatg cattgtgtct agtgtaattc catgactcat tgaggagctt    17640
ttccatagat gaatagcatg tttatggtat gggactgtag agtagtggag agttgcttct    17700
gggggagtgc ttatttggag cattggcaaa tggcaattgc catccaaaac aatacaatac    17760
attacacata ctgataaaat agtacagtgg atatgataga ccatgcttat gtcttatgtg    17820
attcggattg attgcattcc atattagaac agttgctatt gttactatgt catttgaatt    17880
taaatttgag aaagagttag tagtgaaatt acatgtcatt taagcacaat cattatatat    17940
taaatttatt aattttata  ataattatat ttaaaatcat ataagtaatg attcataatt    18000
atatgacaat ctaaaatcaa tacataatca tcaaattatt taaattttac tgtcaatatg    18060
agaattttgc caataattaa tatataaaat ctcagggatt ttaatttatt gagtttgtaa    18120
tttttaaatt tgaacctgac cgatgattaa aattaactca tatttttctc ttccatttag    18180
tttggattga tccagtcatc tggtagatct agatatgggt tcactcttat gtgtattaac    18240
tcgttatcat tcattttttc ttttgagaa  aatgatatgc tgaataatta tacgcgaaac    18300
ctcctttttc ttatatggta ccatttgaaa tatgagttag tcataaaaga aatttgaatt    18360
ataagttgat aaaataagca tgctttcttt tttcttaaat ttttaatcat tattattatg    18420
atgatggttt ttgtttggaa tcttagtcgg tgccgtcagt tgaatccgaa aagaatgaat    18480
agacagaagt gctttccgac ccagagaacc aaacagtagc taactttgcg cttcttgttg    18540
gtgttgttcg ttgagatgca tagatggtgt gaaaattcat ttttgctttt tttacgaatg    18600
aatgaaaaca gattatcttt ttttaattta aatttcttt  tgccttgttt cctgcaatgc    18660
atctttttt  tttttttac  gaagaaatgg aaacagatta acttttttt  tataatttaa    18720
atcgtttcc  cttgtttcct gcaatacatc taattgcgta caagatacaa ctacatttgt    18780
aattaacttt ttttttttat   attatatgt cactttaaaa atatagagta ttatgaacgg    18840
cgtcttaca  tttttcaat  taaatgacct tggaaaatta tgtacattat caacgtataa    18900
cctatttct  cattattgtt ttatacactt gccataaaat ttgataataa attgtttcat    18960
attaagcaaa ataggctata attgaagtaa ttttctaact cattttaat  attaagcaaa    19020
atttaagtga aatttattag atcactaaat cctattattt attacatatt ggtttacgtg    19080
```

```
agttatcgaa aaaaaaaagg ttacgtaatt ttgcaatatt cttttcccac attaattagc   19140
actaagacaa aaaaaaaaaa aaacattgtt tttgggagtg aaaactgaaa agtctaaatt   19200
gccaaaactt gtaataccta ctatggttct acctagctta ccttgtggat tgtagttaag   19260
ctaaacccgt taaagactta atgcaactaa gtaaccaaaa aacaaagaca agcgaacgca   19320
tttgtatata catgctttca cttatcactt ttttttata aaaaagaaa agatagcaac    19380 aaggtttgaa catatgatca tgtataaaaa atatgttttt tatttattat tttaccttaa   19440
atatgaagga aataaaaata tactttatt gaagaatatt tattaatgat ataactaaaa    19500
atatgtcaat catagtattg taatgaataa taatttaatt gactaaaaaa ttaatgatat   19560
aacaaattgt atccagtaaa agaaactaaa aatgtagtat caatcattaa taaatgataa   19620
aatcaaaatt tacaaaacaa catattttag aattaccaag gtatcaaaat gttactattt   19680
cctcctccgt ttcaaattat atgatatttt aaaagaaaa aaattgttca aaaatagata    19740
ttattttaca aaattaatgt aatattaaat atatatttt aaattattct taatcaatat    19800
tcagtgaaaa taatatatag aaagaataaa ttaattgtta attaaagaga taaatattat   19860
attaaaaatt acttaatatt tatttgaaat taatcgtatt tattattatt aagtgtgctt   19920
tcaattcttt aacgtggaca aatacttatt tctgcataat aagaatatta aaggtgaaga   19980
gaatatccga tccacatatt tttggtcaaa ctccttcaga catcagtgaa gtccttaaaa   20040
actcaaatta agtcaaaaaa gtaggcttga ctactatcat caatttgaac actcatgacg   20100
ttgcaacatt taaacccgc ctactatttc catcttactc cacttctatt ccatcgccca    20160
atcaaaaccc aacacgtcat caaatcaaaa aatattcaaa ctagtaccgc ccgcacccga   20220
tcgcaagctt cccggtacgg aattcctata taaaccctc ttccttccca ttttaagaca    20280
caactccaac aaggcattgt ttggtttggt ttggttactt gaaaatctcg aatcgcttaa   20340
ttttgattta gttttccacc gcaacgcgga acctctttct cgaactggct aactctcagg   20400
caagtggctc ggacgctgat tccagcaaca cgcggctggt ggttgcactg tatgacgccc   20460
taaactccgg cgactccaac gccgtcgtca agatcgtcgc cgccgatctc gagtggtggt   20520
tccatggtcc gccctctcac cagttttga tgcgcatgct caccggcgac tccgccgccg    20580
acaactcctt ccgattcgtt ccgcagtcca tcgccgcctt cggctccacc gtcatcgtcg   20640
agggctgcga ctccgcccgc aacattgcct gggtccacgc ctggaccgtc actgatggga   20700
tgatcactca aatcagagag tacttcaaca ccgccctcac cgtcactcgc atccacgatt   20760
ccggcgagat tgttccggcc agatccggcg ccggccgttt gccctgcgtc tgggagagca   20820
gcgtctccgg tcgggtcggg aaatccgtcc ccggtttggt tctcgcaata taaaatataa   20880
aataagtaat tagggaagga cgaggtcacg tgttgccgtt gctataataa ttaaataagg   20940
gacttgtgca cgtggcggtg actggatcga tcggtttcag ggaacattga tactttgtgt   21000
tagtattgga ggtagggag atgtgagagc tttgttgtta ttggtgtggt ttgttttgtt    21060
tgcttgtgtg tttttcacca ctatgggcgt attcaggtgg ttgtatcttt cttttgttat   21120
ttggagtgtt gatgatgatg caataagaat atctatggac tatgctttta agagttgggt   21180
tgtgatgatg ccaaatattc tatttcgtct ttgtcttctc attgttccaa gttaattaat   21240
tgggtaatgt gattttaaa tctaactgct cttggacacc cagatgatcc aagtcatctc    21300
cttctcttct atatactaaa aaacatttg ctttctctaa aatgaggatt tgtattttag    21360
agaacaaaaa aactaaattt gatgacaatt tcaattatta atttcgtaat tgatagttat   21420
```

```
tattatattt tatcctctaa aatgtcattt cctcatttta catgaaccaa atccagaaaa   21480
ataaggattt tttacttgca ttaaatccaa atatggatat aagattatta cataactttt   21540
tggtactaat tcctcgcgga tcatgtgtca ttttagttag cataattccg acatttggat   21600
ataaggattt attttatttt attttctatc ttcaataatt tgtataaagt ttgagagaga   21660
ccattttgca catatgtctt tctcttttc tcttttcttt taatttaagg gaaaataatc    21720
gatccaaaca attaaattaa ataataagaa ttatataatt ttggtaatta caataattct   21780
aagtcacgaa cagaaaatgt tagactcatt tttttaactt tttggaagtg gtggggctaa   21840
gatccttcag gaaaattcca aaagggatgc aactgaaaga gggattagca aaattcctct   21900
tcgataattt aagaaagtga aagataaatt tggttctact atatgatgtg atgttgcgct   21960
ttacatatgc tcgttgcttg gtgcatactt gattgaaaag actcaatttt agggcataaa   22020
caatacaata ccctttaca ttacatcaaa acttctaata agttgtttca attcgtgcgt    22080
gtattgtcta tttatcaaat tgccaacaac cctaaattat gatttaattg gtctaagaga   22140
ttatgtcaat ggtgtaatcg gaattgaggt agagatgcgc ctggtatatt gtctaaccaa   22200
taaaccaatt gaatttggca acttgaatca aatttcaaat atcatctttg taagctcagc   22260
tactaaaaat aagtagaatg catctgtttt tgttttgtcc tctaatattg gtctgaaata   22320
tctattaatt ttgttattat taattaattt ttgttaaaaa atttaattga ttattttgt    22380 tgaaatattt cttattaatt atattttttt atttacagaa cttaaatctc ttgtttaaaa   22440
agaagattaa gatccaacac cttgtttaaa gagattaaaa aatttgatat cactaccaat   22500 tgacttttg gtaaatatgt aggatgtata ataatgataa ttagagtttt tatgaaaaat    22560
cttttagggg caaaaaatta ttttaagaa atatatatac gacttttcta gaatacgtgg    22620
aggcacagct aacaggaagc tggagtaagg tccaccatgt cttgggctaa tacaacataa   22680
acctcttcac ttcctttaa attgcaataa tcacatgcat cgcatcgtaa cgcatggtct    22740 tgtttttgt tagatgattg gtcactttcc cacggtcgcg gtagaatcag ccaccaccat    22800
ttcttttttc ttctaggacc catttgtcag accaggattc gtggactcaa gatattcact   22860
gtactatgtg cattcattt gctacatgtt taggaacaaa agagaagaga atctctatgt    22920
taagtgctaa ttacacataa ccagccagat agggcatcc attgatatct ttgttttcc     22980 ctctcatatt gtcacgtttt tatatattct tttacatctt aggaaggaac tataaattaa   23040
aaacacccat gtgcgtgtcc cttttaaact taataattta ggtggatgca tgatctggaa   23100
ctcaattaag tatagcttaa tttatagttt tattttggag cgtgctaaat aaaataatta   23160
aactccatgc agagcaggat tttattcctt cgggataatt gtgtttactg attagtgtgc   23220
atgaacaaaa gctgcggctc tttgttttat acatttgttt gatactttga ctagataaaa   23280
gattaaaaaa aagttacagc agaaaataat aaatgtatct gtgaatggaa ttataattat   23340
attgtttcaa aaaagaagca aagggtcaaa ttttcctata caacacaaca atttaacatc   23400
tatctccttg catcagacac caaaccacaa atccggcact ggttattcat tgatcaattc   23460
gaactcaaac aagaagacac aaataattca ccgtctctta tggatgactt cgcaaatcca   23520
agacgtaact tatttattgg aatttgagtt cagacagaaa gacacaaaca aatgattac    23580 aagcctcatt attccgtcag gaaaaaaat aggtggtttt gtttttctct tttcactatg    23640
tctagtagag tccacaccac atactccacta gtacaaagat aacaagataa acagttgaac  23700
acccgtacta tttcaacgaa aaaaataata aacgatccaa atttaacaac taatattgtg   23760
gagttgttaa atcatagcta taggtcaatt tgcacaagga atgagagatc cattagaacc   23820
```

```
aattagtgtt ttccactagt ttatgacatc tagttctcat agaacttttaa actagttgta    23880 actaatttca caaatctaaa gataaagtta ttaaagctta aattttagac ttattaataa    23940
aaaaaatacc acatatattg ataaaaaaaa aagcccaaca tatacatctt tcattttaag    24000
tagaggagtg cttcccccaa aaaccctaga aacaataaca ccctaggaat cctagtaaca    24060
gaacacgaca acacgtaccc tttaattttta aggggacttc tccctcctcc ttggagagct    24120
tctacctcca ttggaagact tctctcccat ctcaggaggt tttcttttcc aacatcacgc    24180 tcccccctcaa tccaccacct cttttcctca tctttctttt ttccttttttc agttgctatt    24240 ctcatctctt ctctagcttt ataattttttt tgtttgtttt tttaacattc ccattatttt    24300
ttattcctat cacatttctc ctttacgatg gagcttgtta gaggcctata tattgcagat    24360
ggatctaaca gaatgaaaga tcgatagaaa atattagaaa aaatgtcatt aacattgaaa    24420
aaaaaacatt tcttaaaaat tatttttaag tctcactttt gctagctaac ctcgagatca    24480
caaattatat ataacttttt ttttatcgtg ctctgttgca atttcatctc aaattttattt    24540 tgataattaa tttaattttt aattatgatt tttatttgtc tatgaatatt gatatatcaa    24600
tacgacttta aacattaaac taattgctca aatagtttac acaagtacta atgaggtcaa    24660
ggttgaacaa ctaaccttga tcgaattcta gattgctcta atggttcgtt tagaagggat    24720
gaaaatgcat tttctatgga ttaagatttg ggatgtttag atgacggtgc tgctttcaac    24780
acacctgaaa cattgtgaat atatttttaa aaaaatctca ttatatagtt aataaaaaat    24840
attaacgtca tcatttaaat aaacatttaa taaaagaata tgaagaattt gacataaata    24900
ttttcacttg gtgcatgttt ggtaacatgt gagttgaact cgatacgatt ttttaaaatg    24960 gttttttgtat ttatttattt ttaaaatata ttttttacca ccaattcaaa aacactatac    25020
tatccaacaa cacgtgcatt aactaacatg ggatttgtta agtttgatat gtgatcttga    25080 gttttttgaga cctcactatt tagttatatt aaatatttga agaggaaaaa ataatttgca    25140
atccataata atcttacaaa agtgaagtaa aattattttt ttataaaaga tacatgtgac    25200
aatgttccaa aacacactat tataattatt attatctaac tcatatgcat tgacaatttg    25260
attcagtgga gaggagagag aagttatcac gttaagtggg gattagttaa ttaagtgcac    25320
aaatacgtca ccttcgtttt caatatgcca ttctgctttt cctcccacgt tttttcaagc    25380
cgttcgattt gttttctgta attgttttca accaaggaag agaataaatc caataaaagg    25440
acatactgtc ggggtagtga tcgtttgatg atgatattga taacattggc atcttggaga    25500
atatcgcata aacacaattt tgattttctc tttataggag tttccctgaa ctttgatcat    25560
tatacgtatt cacataacag aatccatttt ttttttaaaa aaaaaaggat ccatatttca    25620
tttcctctta attatttgct tccttttccc atgtaggtga ctaggtggtg ttttggccag    25680
ggtcccagac ttgctaaatt gcacagttaa ggaatatttt catcattgga ttccactaac    25740
aaaccctgaa gagtcttatc aatatgaatt atttactatg ccaccatata tgatatatgt    25800
taaacactaa ttagtgatct gatgctaatt gtgaagtgct gagaaattt aagctacgaa    25860 agcgatcgta tgaaagataa gtggtttttca gcataaaaat taaacatat tataaaaaaa    25920 taataacaca tgaatcattc cttaattttaa atattttatc gacaattctt attttttttat    25980 tttttttctca catcataaat ttcattatat ttatattttt tttctctctt tctaaacgta    26040
ggaattaaga taatatatgc tatgtatatc aaacactttc gattataaag aaaaatattt    26100 gagatatttta gaaaagtttg tacaatgatt tagaatggga gaactacttc accgaattct    26160
```

```
gtggtaaaga agggtgacct cagttttttc tttgcttatt tcttcagtta attattacta    26220
ctgttattat tgcatgtaca cccaataagt acttaaatta aagaggcaaa aaataaagaa    26280
aatctaattt tattaatgta atatttttat ttttaatttt tagaaggtta caggacacat    26340
cagttaaaag agtggatgtc atgattttta gaacaaaaaa agagaaaaga ggaaaacctt    26400
aaataacatt gaaaacactc attaaaaaag acttgagact ttgaaaataa ttcttaaacc    26460
ttaattttta actgtgttaa atgatgtcat gtgatttata taattgattt cacttaataa    26520
taagactttt gctgttattg ttgtttattt attttgttta ttttaacttg cacagttggt    26580
gcgtagaata aaaagaaat taatcgttat aactatagct atcaatacaa gtagatcaag     26640
ctacaagaag tttttatcat agaattgaat tagttactag ttgggtgtgt ttggttcacg    26700
cattaataac atagttttca tatctggata tatggaagtg atctcttata gctttttgca    26760
tcttttattc aatgaatatg atcaatcact gcacaatgca tttccgaaca cttggttagt    26820
ggttggagga atctagtctc cgaaattgtc catgacttta atttaaatta ggtgttacgt    26880
tgttatcatt tatcaagcac ccgttcccgt cacttctggt taaaatccat tagcctttgc    26940
tgctaaaaaa acttagaatt tatcttagtg gggaacattt tgatacaacc taaagtaagc    27000
attcaagttt tgaagacagt aagcaactta aattttatgg ctctctttac taatgacgcc    27060
attagttaac cacacgactc aaaatttaag ttatttgata tttacgttta ataacataac    27120
actacctcat cccaatagcc aaatatgtat atatatatat atatataaaa ttgagagaaa    27180
ttttactatt ttcacgtctt ggtcagttcc attcttgtag aaagtcattt cctttgtttt    27240
ttctgcggct tccacatcac tgtcgacatt tttccacgac ctttactttt ttttctctag    27300
cttatgagat aagataagag gcagcctatt catatcacat tatcatatac caccactgat    27360
atatgaattt ttaagcctgt gttgcgtcct tatcataaat ttcatataa ccctacgtgt    27420 gttatctata ttagaaactg aaatatgtta ttaacattaa tatacaccac tgcataggat    27480
aagtactact ttcgactttc aaagattaag aaaaatgagg tgtccatatc aaaacagtgg    27540
gataaaatta tatattaaga ctaattcaaa atgaatttaa atcgggctta gttttcacat    27600
gcttaaatat ttccatttct atatcttaga cttccaattc caatgttgaa ttgtggaagt    27660 aaaтттagcат atataggaac татттттаagg gatgaaggcg agcatactac tcctaataat    27720
aaaggtatct gaatgaactc aaatgaagaa taagagataa cttgtaaaaa aaaactatta    27780 gаатттgаgаg aatattattt tatcaaataa tataagtat ттттттаттат ttatatattt    27840

tctataacta ccataacaga aaactaatta cttctaactc attataacaa acttagttta    27900
gttaggtatc ACtaactcaa attacactcg gatgggtaat acctcaagac atcaattggc    27960
gtaatgtcat agtcatagtc atataattct cagatcttga gaacaataca agcaagattc    28020
tgaaatgaca tcggatcggt atcttattcc atggctagcc ттттттааттg gttaaactga    28080

agaagaaaaa aatagcacaa gaaataaaga gagagatgga atcagatcgc gtatatgctc    28140

attgctgtaa gagaataaaa ttcataaacg tgctagtttt taagaatatt cgtagatcag    28200

ttggaatgtg acaatcgtgg ttgctgaaag ttttggaata atggtctaaa atggccaatt    28260

ttatggcaga gctaagatgc tttagtctac сgggгтgтcа agacaatcta gtacttcagt    28320

tggttgatta agcstgtgta aattattata aaatttgtaa tattatcttt aattcttatg    28380

aaaaaaaaat aagaatatat tgggagtgga ttaacacatc attcagctta ттттттттаааa    28440 tgaaattaga taaagataca тттттттааgа aaattaggta аттттаааtаа tatcatctat    28500 aaaagtactt gccтттттттт atgtattcat gtatcttact tatttgatga atgatgataa    28560
```

```
atgttaaatt aatattttct ctttgttaat tcaagaaata ttaaaacatt gagatatata    28620
aaaatcatta ctattaaaat attattttta ttaattaaat atctttatat ttaaaatttt    28680
aaacgtatgc aattcttatg ttttatcatc aaaatctttt ctaaagttaa atcaatcttt    28740
tctgcgtatt tttatttata tttaagatac cttatattta aaagtacgta ttactcatgc    28800
ataaaatact ttctactttt tttaaataaa atacttttta tttttttataa tttttttata    28860
tctataataa tagtctaaag tattcattaa ttttattgat aactaattct tactgtagaa    28920
tctgatcaat catctttagt gtctttcaaa ttacatttaa tttattcgta agactaaaac    28980
atgagatttt gtttaattag atcaaactca ataccacttg aataaattac ttgttagtat    29040
tacttttcat attatgttcg caagctaaaa attatagcat tagttgaatt tcatctagcc    29100
atttacaaac tttattcaat gggccaattt ctatgaaaaa aatattttta tcctctaaat    29160
gttgtatata ttttggaatt tgagagaaac aaaaaaaaag agaaagattg tgaatgtgat    29220
agatgatata ataaaaatat aaaaaaaaaa tagaaaatga tataaaatag atgtaaattt    29280
tagggtgccc aaaataattg aatctatgtg tagtaataat aatggaaaaa taatataaaa    29340
atattataaa aagtgcaaca atttcttaac tatagtctat aggttactta aagtagggtt    29400
gttaaaatga gtagatccgt ttaactgagt cagctaatta aaatgtgttg attgaatttg    29460
aaaattttga actcaatta attttgattt tactttattc actccaaaga tttgtttgaa    29520
cgtaaagttg taatgagact agttcgttag tccattttct tcttaagcaa atatatatca    29580
cccattcatt aaattgagct aggttttgaa ttaaatttta caaaatttga aatagtcaaa    29640
tttgtcaatc caacttgatt agaaattctc atttaatgaa tgaggggaac tagcctgaat    29700
tgctacttgc tatatacctg aagtcttact ttcattgtca tattataatt atggagtgag    29760
aaacaaatta ttttaaaaca atcattaatt taatgtttta atgtaatatt aattattttt    29820
tatttatatc tcttataata ttaataataa acatcaaaat ttataaataa attaataata    29880
atataagatt aattttataa aattattatt ttttaatttg tataaaataa cttaagatta    29940
gtattatttt aaaagggatg gagtatgata tgcaatataa agcaataaaa tcatatatat    30000
ctgccatgtc agcatgtata atgacatcta aattaaaatg gctggtggat aagatttttt    30060
gaacttcgct tcttatctct caacaactgg aggctattat gtccactttc tacgacatca    30120
aacacatgtt aggtgcattt ggttgcaatt tgcaatctat aggattagga gggtgtttgg    30180
tatgtagctt acaagactat ttgctttgaa ttttcaagtg accgtatcca gagttttgc     30240
taatatctca tcagatatta gacatttagt tttcattagt atctatctcc gcgcaatgca    30300
agagacttga cgttaagaat ttatgagaac cacaggtgga actgcattag catccttcaa    30360
ttttcacgaa aatgatatct attactcaaa ctaaagtggc attttaagct ggaattttaa    30420
gaatcataaa ttttttgagc tttgtttgtg tggagtaaag actcaaatga gaatacttat    30480
tttatctcac ttatttaagt agaaagaggt caattaagga aaaaaaaac tcatttgaaa     30540
ggaaaaaaat aattacaaat tattgagaga gaaatgagag agaaaatcat tgtgattttc    30600
gtacactcac cgatttttag attacaactg cggattcttt ggattaggtt gattgttaga    30660
cagcaggttc tacatatata atacttcaaa ttgtttgatg agatcgttaa aaagatattt    30720
gaagagagag ataaatgttt ttcattttct gttttatatt ttgggatttc atcttcttgt    30780
ctctattgta tcaattgggg gtctgttttg atttggctgt ttgtagcacg tttcgatgca    30840
cttgttgaag actttcttgt aacttttattg attatagtga aattatttct ttggtataaa    30900
```

-continued

```
tgatccgtga ttttaccct tgcattaagg gattttcac tttaaacaaa ttgtgtctct      30960
tgtgcgcttt taatttctat tttgctctct ttatatttta gcctgctccc caagtttgga    31020
ccaatttatt tctgctgcct atattacttt gttattgtgt tggtatattt tcttcatcaa    31080
aaaatatcca tttgtgcttt aaattttggg tagttttgtt tcttgctcca caaatttttg    31140
cagttttagt ggaaaggccc aaccaatatt ctcaacattt tgggccttcc tcgaacaagg    31200
acccgtaaga atagaagttt ctaaaatgga cttgtaattg gtg                      31243
```

<210> SEQ ID NO 69
<211> LENGTH: 23
<212> TYPE: DNA
<213> ORGANISM: Glycine max

<400> SEQUENCE: 69

```
ggcaaggcac actgcggatg agg                                            23
```

<210> SEQ ID NO 70
<211> LENGTH: 23
<212> TYPE: DNA
<213> ORGANISM: Glycine max

<400> SEQUENCE: 70

```
gtacgctggc gtcatgaggg agg                                            23
```

<210> SEQ ID NO 71
<211> LENGTH: 23
<212> TYPE: DNA
<213> ORGANISM: Glycine max

<400> SEQUENCE: 71

```
ggcggccgga gacatgccgg agg                                            23
```

<210> SEQ ID NO 72
<211> LENGTH: 23
<212> TYPE: DNA
<213> ORGANISM: Glycine max

<400> SEQUENCE: 72

```
ggaaattgct gaattgtacg agg                                            23
```

<210> SEQ ID NO 73
<211> LENGTH: 23
<212> TYPE: DNA
<213> ORGANISM: Glycine max

<400> SEQUENCE: 73

```
gatcttaggc tctttgaacg agg                                            23
```

<210> SEQ ID NO 74
<211> LENGTH: 23
<212> TYPE: DNA
<213> ORGANISM: Glycine max

<400> SEQUENCE: 74

```
gggaagcttg cgatcgggtg cgg                                            23
```

<210> SEQ ID NO 75
<211> LENGTH: 23
<212> TYPE: DNA
<213> ORGANISM: Glycine max

<400> SEQUENCE: 75
```

```
gaatcggaag gagttgtcgg cgg                                              23
```

<210> SEQ ID NO 76
<211> LENGTH: 23
<212> TYPE: DNA
<213> ORGANISM: Glycine max

<400> SEQUENCE: 76

```
ggctgattct accgcgaccg tgg                                              23
```

<210> SEQ ID NO 77
<211> LENGTH: 1387
<212> TYPE: PRT
<213> ORGANISM: Artificial sequence
<220> FEATURE:
<223> OTHER INFORMATION: Synthetic
<220> FEATURE:
<221> NAME/KEY: MISC_FEATURE
<222> LOCATION: (1)..(10)
<223> OTHER INFORMATION: nuclear localization sequence
<220> FEATURE:
<221> NAME/KEY: MISC_FEATURE
<222> LOCATION: (1378)..(1387)
<223> OTHER INFORMATION: nuclear localization sequence

<400> SEQUENCE: 77

```
Gly Ser Lys Lys Arg Arg Ile Lys Gln Asp Met Asp Lys Lys Tyr Ser
 1               5                  10                  15

Ile Gly Leu Asp Ile Gly Thr Asn Ser Val Gly Trp Ala Val Ile Thr
            20                  25                  30

Asp Asp Tyr Lys Val Pro Ser Lys Lys Phe Lys Val Leu Gly Asn Thr
        35                  40                  45

Asp Arg His Ser Ile Lys Lys Asn Leu Ile Gly Ala Leu Leu Phe Gly
    50                  55                  60

Ser Gly Glu Thr Ala Glu Ala Thr Arg Leu Lys Arg Thr Ala Arg Arg
65                  70                  75                  80

Arg Tyr Thr Arg Arg Lys Asn Arg Ile Cys Tyr Leu Gln Glu Ile Phe
                85                  90                  95

Ser Asn Glu Met Ala Lys Val Asp Asp Ser Phe Phe His Arg Leu Glu
            100                 105                 110

Glu Ser Phe Leu Val Glu Glu Asp Lys Lys His Glu Arg His Pro Ile
        115                 120                 125

Phe Gly Asn Ile Val Asp Glu Val Ala Tyr His Glu Lys Tyr Pro Thr
    130                 135                 140

Ile Tyr His Leu Arg Lys Lys Leu Ala Asp Ser Thr Asp Lys Ala Asp
145                 150                 155                 160

Leu Arg Leu Ile Tyr Leu Ala Leu Ala His Met Ile Lys Phe Arg Gly
                165                 170                 175

His Phe Leu Ile Glu Gly Asp Leu Asn Pro Asp Asn Ser Asp Val Asp
            180                 185                 190

Lys Leu Phe Ile Gln Leu Val Gln Ile Tyr Asn Gln Leu Phe Glu Glu
        195                 200                 205

Asn Pro Ile Asn Ala Ser Arg Val Asp Ala Lys Ala Ile Leu Ser Ala
    210                 215                 220

Arg Leu Ser Lys Ser Arg Arg Leu Glu Asn Leu Ile Ala Gln Leu Pro
225                 230                 235                 240

Gly Glu Lys Arg Asn Gly Leu Phe Gly Asn Leu Ile Ala Leu Ser Leu
                245                 250                 255
```

```
Gly Leu Thr Pro Asn Phe Lys Ser Asn Phe Asp Leu Ala Glu Asp Ala
            260                 265                 270

Lys Leu Gln Leu Ser Lys Asp Thr Tyr Asp Asp Leu Asp Asn Leu
            275                 280                 285

Leu Ala Gln Ile Gly Asp Gln Tyr Ala Asp Leu Phe Leu Ala Ala Lys
            290                 295                 300

Asn Leu Ser Asp Ala Ile Leu Leu Ser Asp Ile Leu Arg Val Asn Ser
305                 310                 315                 320

Glu Ile Thr Lys Ala Pro Leu Ser Ala Ser Met Ile Lys Arg Tyr Asp
                325                 330                 335

Glu His His Gln Asp Leu Thr Leu Leu Lys Ala Leu Val Arg Gln Gln
            340                 345                 350

Leu Pro Glu Lys Tyr Lys Glu Ile Phe Phe Asp Gln Ser Lys Asn Gly
            355                 360                 365

Tyr Ala Gly Tyr Ile Asp Gly Gly Ala Ser Gln Glu Glu Phe Tyr Lys
            370                 375                 380

Phe Ile Lys Pro Ile Leu Glu Lys Met Asp Gly Thr Glu Glu Leu Leu
385                 390                 395                 400

Val Lys Leu Asn Arg Glu Asp Leu Leu Arg Lys Gln Arg Thr Phe Asp
                405                 410                 415

Asn Gly Ser Ile Pro His Gln Ile His Leu Gly Glu Leu His Ala Ile
            420                 425                 430

Leu Arg Arg Gln Glu Asp Phe Tyr Pro Phe Leu Lys Asp Asn Arg Glu
            435                 440                 445

Lys Ile Glu Lys Ile Leu Thr Phe Arg Ile Pro Tyr Tyr Val Gly Pro
            450                 455                 460

Leu Ala Arg Gly Asn Ser Arg Phe Ala Trp Met Thr Arg Lys Ser Glu
465                 470                 475                 480

Glu Thr Ile Thr Pro Trp Asn Phe Glu Glu Val Val Asp Lys Gly Ala
                485                 490                 495

Ser Ala Gln Ser Phe Ile Glu Arg Met Thr Asn Phe Asp Lys Asn Leu
            500                 505                 510

Pro Asn Glu Lys Val Leu Pro Lys His Ser Leu Leu Tyr Glu Tyr Phe
            515                 520                 525

Thr Val Tyr Asn Glu Leu Thr Lys Val Lys Tyr Val Thr Glu Gly Met
            530                 535                 540

Arg Lys Pro Ala Phe Leu Ser Gly Glu Gln Lys Lys Ala Ile Val Asp
545                 550                 555                 560

Leu Leu Phe Lys Thr Asn Arg Lys Val Thr Val Lys Gln Leu Lys Glu
                565                 570                 575

Asp Tyr Phe Lys Lys Ile Glu Cys Phe Asp Ser Val Glu Ile Ser Gly
            580                 585                 590

Val Glu Asp Arg Phe Asn Ala Ser Leu Gly Ala Tyr His Asp Leu Leu
            595                 600                 605

Lys Ile Ile Lys Asp Lys Asp Phe Leu Asp Asn Glu Glu Asn Glu Asp
            610                 615                 620

Ile Leu Glu Asp Ile Val Leu Thr Leu Thr Leu Phe Glu Asp Arg Gly
625                 630                 635                 640

Met Ile Glu Glu Arg Leu Lys Thr Tyr Ala His Leu Phe Asp Asp Lys
                645                 650                 655

Val Met Lys Gln Leu Lys Arg Arg Tyr Thr Gly Trp Gly Arg Leu
            660                 665                 670

Ser Arg Lys Leu Ile Asn Gly Ile Arg Asp Lys Gln Ser Gly Lys Thr
```

-continued

```
              675                 680                 685
Ile Leu Asp Phe Leu Lys Ser Asp Gly Phe Ala Asn Arg Asn Phe Met
        690                 695                 700
Gln Leu Ile His Asp Asp Ser Leu Thr Phe Lys Glu Asp Ile Gln Lys
705                 710                 715                 720
Ala Gln Val Ser Gly Gln Gly His Ser Leu His Glu Gln Ile Ala Asn
                725                 730                 735
Leu Ala Gly Ser Pro Ala Ile Lys Lys Gly Ile Leu Gln Thr Val Lys
                740                 745                 750
Ile Val Asp Glu Leu Val Lys Val Met Gly His Lys Pro Glu Asn Ile
                755                 760                 765
Val Ile Glu Met Ala Arg Glu Asn Gln Thr Thr Gln Lys Gly Gln Lys
        770                 775                 780
Asn Ser Arg Glu Arg Met Lys Arg Ile Glu Glu Gly Ile Lys Glu Leu
785                 790                 795                 800
Gly Ser Gln Ile Leu Lys Glu His Pro Val Glu Asn Thr Gln Leu Gln
                805                 810                 815
Asn Glu Lys Leu Tyr Leu Tyr Tyr Leu Gln Asn Gly Arg Asp Met Tyr
                820                 825                 830
Val Asp Gln Glu Leu Asp Ile Asn Arg Leu Ser Asp Tyr Asp Val Asp
                835                 840                 845
His Ile Val Pro Gln Ser Phe Ile Lys Asp Asp Ser Ile Asp Asn Lys
        850                 855                 860
Val Leu Thr Arg Ser Asp Lys Asn Arg Gly Lys Ser Asp Asn Val Pro
865                 870                 875                 880
Ser Glu Glu Val Val Lys Lys Met Lys Asn Tyr Trp Arg Gln Leu Leu
                885                 890                 895
Asn Ala Lys Leu Ile Thr Gln Arg Lys Phe Asp Asn Leu Thr Lys Ala
                900                 905                 910
Glu Arg Gly Gly Leu Ser Glu Leu Asp Lys Ala Gly Phe Ile Lys Arg
        915                 920                 925
Gln Leu Val Glu Thr Arg Gln Ile Thr Lys His Val Ala Gln Ile Leu
        930                 935                 940
Asp Ser Arg Met Asn Thr Lys Tyr Asp Glu Asn Asp Lys Leu Ile Arg
945                 950                 955                 960
Glu Val Lys Val Ile Thr Leu Lys Ser Lys Leu Val Ser Asp Phe Arg
                965                 970                 975
Lys Asp Phe Gln Phe Tyr Lys Val Arg Glu Ile Asn Asn Tyr His His
                980                 985                 990
Ala His Asp Ala Tyr Leu Asn Ala Val Val Gly Thr Ala Leu Ile Lys
        995                 1000                1005
Lys Tyr Pro Lys Leu Glu Ser Glu Phe Val Tyr Gly Asp Tyr Lys
        1010                1015                1020
Val Tyr Asp Val Arg Lys Met Ile Ala Lys Ser Glu Gln Glu Ile
        1025                1030                1035
Gly Lys Ala Thr Ala Lys Tyr Phe Phe Tyr Ser Asn Ile Met Asn
        1040                1045                1050
Phe Phe Lys Thr Glu Ile Thr Leu Ala Asn Gly Glu Ile Arg Lys
        1055                1060                1065
Arg Pro Leu Ile Glu Thr Asn Gly Glu Thr Gly Glu Ile Val Trp
        1070                1075                1080
Asp Lys Gly Arg Asp Phe Ala Thr Val Arg Lys Val Leu Ser Met
        1085                1090                1095
```

Pro Gln Val Asn Ile Val Lys Lys Thr Glu Val Gln Thr Gly Gly
    1100                1105                1110

Phe Ser Lys Glu Ser Ile Leu Pro Lys Arg Asn Ser Asp Lys Leu
    1115                1120                1125

Ile Ala Arg Lys Lys Asp Trp Asp Pro Lys Tyr Gly Gly Phe
    1130                1135                1140

Asp Ser Pro Thr Val Ala Tyr Ser Val Leu Val Ala Lys Val
    1145                1150                1155

Glu Lys Gly Lys Ser Lys Lys Leu Lys Ser Val Lys Glu Leu Leu
    1160                1165                1170

Gly Ile Thr Ile Met Glu Arg Ser Ser Phe Glu Lys Asn Pro Ile
    1175                1180                1185

Asp Phe Leu Glu Ala Lys Gly Tyr Lys Glu Val Lys Lys Asp Leu
    1190                1195                1200

Ile Ile Lys Leu Pro Lys Tyr Ser Leu Phe Glu Leu Glu Asn Gly
    1205                1210                1215

Arg Lys Arg Met Leu Ala Ser Ala Gly Glu Leu Gln Lys Gly Asn
    1220                1225                1230

Glu Leu Ala Leu Pro Ser Lys Tyr Val Asn Phe Leu Tyr Leu Ala
    1235                1240                1245

Ser His Tyr Glu Lys Leu Lys Gly Ser Pro Glu Asp Asn Glu Gln
    1250                1255                1260

Lys Gln Leu Phe Val Glu Gln His Lys His Tyr Leu Asp Glu Ile
    1265                1270                1275

Ile Glu Gln Ile Ser Glu Phe Ser Lys Arg Val Ile Leu Ala Asp
    1280                1285                1290

Ala Asn Leu Asp Lys Val Leu Ser Ala Tyr Asn Lys His Arg Asp
    1295                1300                1305

Lys Pro Ile Arg Glu Gln Ala Glu Asn Ile Ile His Leu Phe Thr
    1310                1315                1320

Leu Thr Asn Leu Gly Ala Pro Ala Ala Phe Lys Tyr Phe Asp Thr
    1325                1330                1335

Thr Ile Asp Arg Lys Arg Tyr Thr Ser Thr Lys Glu Val Leu Asp
    1340                1345                1350

Ala Thr Leu Ile His Gln Ser Ile Thr Gly Leu Tyr Glu Thr Arg
    1355                1360                1365

Ile Asp Leu Ser Gln Leu Gly Gly Asp Gly Ser Lys Lys Arg Arg
    1370                1375                1380

Ile Lys Gln Asp
    1385

<210> SEQ ID NO 78
<211> LENGTH: 23
<212> TYPE: DNA
<213> ORGANISM: Artificial sequence
<220> FEATURE:
<223> OTHER INFORMATION: Synthetic
<220> FEATURE:
<221> NAME/KEY: misc_feature
<222> LOCATION: (2)..(19)
<223> OTHER INFORMATION: n is a, c, g, or t
<220> FEATURE:
<221> NAME/KEY: misc_feature
<222> LOCATION: (21)..(21)
<223> OTHER INFORMATION: n is a, c, g, or t

<400> SEQUENCE: 78

```
gnnnnnnnnn nnnnnnnnng ngg                                             23
```

<210> SEQ ID NO 79
<211> LENGTH: 23
<212> TYPE: DNA
<213> ORGANISM: Artificial sequence
<220> FEATURE:
<223> OTHER INFORMATION: Synthetic
<220> FEATURE:
<221> NAME/KEY: misc_feature
<222> LOCATION: (1)..(21)
<223> OTHER INFORMATION: n is a, c, g, or t

<400> SEQUENCE: 79

```
nnnnnnnnnn nnnnnnnnnn ngg                                             23
```

<210> SEQ ID NO 80
<211> LENGTH: 300
<212> TYPE: DNA
<213> ORGANISM: Artificial sequence
<220> FEATURE:
<223> OTHER INFORMATION: Synthetic

<400> SEQUENCE: 80

```
aagctaaaag ttgcaaaaga aatggcaggg ctataaggct cacctactcc tggatttacc      60
aaattttggt tcgtccctat actcgaaaaa taaaacaaaa taaatttcag tatcttcgtt     120
tttgtatgct ttgactgtga ggcgaggcca actttcttct tctgtctgag atgaattttg     180
tttgcctcct gtgaaggatg tatcattcaa agtgaatgtt ttgcaactgc cagtagtccc     240
acatcgacca aatattctta ttacagtgtg tttatatagc acctggagaa ggaatgggtt     300
```

<210> SEQ ID NO 81
<211> LENGTH: 300
<212> TYPE: DNA
<213> ORGANISM: Artificial sequence
<220> FEATURE:
<223> OTHER INFORMATION: Synthetic

<400> SEQUENCE: 81

```
aaatggtaaa atgtcaaatc aaaactaggc tgcagtatgc agagcagagt catgatgata     60
ctacttacta caccgattct tgtgtgcaga aaaatatgtt aaaataattg aatctttctc    120
tagccaaatt tgacaacaat gtacaccgtt catattgaga gacgatgctt cttgtttgct    180
ttcggtggaa gctgcatata ctcaacatta ctccttcagc gagttttcca actgagtccc    240
acattgccca gacctaacac ggtattcttg tttataatga aatgtgccac cacatggatt    300
```

<210> SEQ ID NO 82
<211> LENGTH: 84
<212> TYPE: DNA
<213> ORGANISM: Artificial sequence
<220> FEATURE:
<223> OTHER INFORMATION: Synthetic

<400> SEQUENCE: 82

```
gttttagagc tagaaatagc aagttaaaat aaggctagtc cgttatcaac ttgaaaaagt      60
ggcaccgagt cggtgctttt tttt                                            84
```